United States Patent

McGill et al.

[11] Patent Number: 6,085,772
[45] Date of Patent: Jul. 11, 2000

[54] SMART AUTOMATIC SAFETY VALVE HAVING REMOTE ELECTROMAGNETIC SHUT-OFF PROTECTION AND RESET CONTROL FROM SEISMIC OR OTHER SENSORS

[76] Inventors: James C. McGill, 5312 Lisa Dr., Union City, Calif. 94587; Douglas P. Arduini, 549 Jesse James Dr., San Jose, Calif. 95123-4848

[21] Appl. No.: 08/965,014

[22] Filed: Nov. 5, 1997

Related U.S. Application Data

[60] Provisional application No. 60/030,284, Nov. 5, 1996.

[51] Int. Cl.⁷ .................................................. F16K 17/36
[52] U.S. Cl. .............................. 137/39; 137/553; 251/65; 251/129.14
[58] Field of Search ........................ 137/39, 553; 251/65, 251/129.14

[56] References Cited

U.S. PATENT DOCUMENTS

| | | |
|---|---|---|
| 613,990 | 11/1898 | Guyenot . |
| 2,017,274 | 10/1935 | Breitenstein . |
| 2,206,067 | 7/1940 | Waltamath . |
| 2,215,044 | 9/1940 | Kammerdiner . |
| 2,637,331 | 5/1953 | Sullivan . |
| 2,927,982 | 3/1960 | Slough . |
| 3,747,616 | 7/1973 | Lloyd . |
| 3,768,497 | 10/1973 | Mueller . |
| 3,783,887 | 1/1974 | Shoji . |
| 3,805,818 | 4/1974 | Yamada . |
| 3,842,852 | 10/1974 | Bair . |
| 3,878,858 | 4/1975 | Yamada . |
| 4,007,643 | 2/1977 | Matsushita . |
| 4,028,510 | 6/1977 | Yamaura et al. . |
| 4,098,284 | 7/1978 | Yamada . |
| 4,165,758 | 8/1979 | Douce . |
| 4,185,507 | 1/1980 | Domyan . |
| 4,207,912 | 6/1980 | Ichikawa . |
| 4,245,814 | 1/1981 | Shimizu . |
| 4,261,379 | 4/1981 | Berry . |
| 4,331,171 | 5/1982 | Novi . |
| 4,349,042 | 9/1982 | Shimizu . |
| 4,382,449 | 5/1983 | Nelson . |
| 4,475,565 | 10/1984 | Keller et al. . |
| 4,485,832 | 12/1984 | Plemmons et al. . |
| 4,603,591 | 8/1986 | Sibley et al. . |
| 4,640,303 | 2/1987 | Greenberg . |
| 4,688,592 | 8/1987 | Tibbals, Jr. . |
| 4,782,848 | 11/1988 | Sibley et al. . |
| 4,785,842 | 11/1988 | Johnson, Jr. . |
| 4,799,505 | 1/1989 | Nowell . |
| 4,817,657 | 4/1989 | Kovacs . |
| 4,844,113 | 7/1989 | Jones . |
| 4,903,720 | 2/1990 | McGill . |

(List continued on next page.)

FOREIGN PATENT DOCUMENTS 57-12172   1/1982   Japan .

OTHER PUBLICATIONS

Sentinel Valves brochure (undated).

*Primary Examiner*—Gerald A. Michalsky
*Attorney, Agent, or Firm*—Wenderoth, Lind & Ponack, L.L.P.

[57] ABSTRACT

A seismic safety valve has a housing with a fluid inlet, a fluid outlet and a fluid passageway interconnecting the inlet and outlet. A recess is formed inside the housing along the fluid passageway, with a valve seat located adjacent to and below the recess. A valve member, made of a magnetic material, is in the fluid passageway and movable between a first position in the recess and a second position on the valve seat. The valve member closes the fluid passageway in the second position and opens the fluid passageway in the first position. The recess supports the valve member so that the valve member is movable from the recess upon the housing being subjected to a predetermined amount of seismic activity under forces generated by the predetermined amount of seismic activity and gravity. At least one electromagnet is on the housing outside of the fluid passageway. The electromagnet can be used to automatically activate the valve by moving the valve member, or may be used to reset the valve after the valve has been activated.

52 Claims, 57 Drawing Sheets

U.S. PATENT DOCUMENTS

| | | |
|---|---|---|
| 4,920,999 | 5/1990 | Asbra et al. . |
| 4,960,146 | 10/1990 | Morris . |
| 5,029,601 | 7/1991 | Reschke et al. . |
| 5,050,629 | 9/1991 | Willoughby . |
| 5,052,429 | 10/1991 | Yoo . |
| 5,074,327 | 12/1991 | Reid . |
| 5,078,172 | 1/1992 | Gonzalez . |
| 5,115,829 | 5/1992 | Franzke . |
| 5,119,841 | 6/1992 | McGill . |
| 5,143,110 | 9/1992 | Simpson . |
| 5,209,454 | 5/1993 | Engdahl et al. . |
| 5,325,881 | 7/1994 | Hunter et al. . |
| 5,351,706 | 10/1994 | Banks . |
| 5,409,031 | 4/1995 | McGill et al. . |
| 5,584,465 | 12/1996 | Ochsenreiter ............................. 251/65 |

SMART AUTOMATIC SAFETY VALVE HAVING REMOTE ELECTROMAGNETIC SHUT-OFF PROTECTION AND RESET CONTROL FROM SEISMIC OR OTHER SENSORS

This is a utlility application claiming benefit of priority on provisional application No. 60/030,284, filed Nov. 5, 1996.

BACKGROUND OF THE INVENTION

1. Field of the Invention

The present invention relates to a safety protection apparatus for automatically interrupting the flow of a fluid, in particular a gas or fuel line, upon the occurrence of a catastrophic fault or alarm condition, including smart sensors, alarms and control systems, such as a seismic disturbance or earthquake or other catastrophe, or from other catastrophic fault conditions such as a gas leak, carbon monoxide, fuel smoke, and other needs (flood, tornado, hurricane, utility emergency or other necessary control).

2. Description of the Prior Art

Various devices are known in the art for shutting off fuel systems in the event of a seismic disturbance or the like. For example, U.S. Pat. No. 4,311,171 to Novi requires a first ball to close a fuel line and at least a second ball, wherein the second ball is mounted within the casing in such a manner that a tremor would cause the second ball to dislodge the first ball from its pedestal. The patent also requires the ball for closing the fuel line to be mounted in a concave cup which is supported by a plurality of ball bearings and includes a concave member, as well as a resilient means (a spring or the like) for biasing the cup against the concave member.

U.S. Pat. No. 4,565,208 to Ritchie requires the inclusion of a track and at least a ball riding in the track, and in addition requires the inclusion of "an obstruction" which causes the ball to leave the track when a seismic disturbance causes the ball to contact the obstruction with sufficient energy, and further requires the obstruction to include an inclined surface which extends over the track and has a height which decreases across the width of the track.

U.S. Pat. No. 4,475,565 to Keller et al. discloses a magnetically actuable shock responsive unit. This unit includes a valve mechanism for shutting off the flow in a fluid line and is operable upon shock induced horizontal displacement of a weight relative to a support to actuate the valve. An electromagnet is provided for providing a separate actuation of the weight. Movement of the weight from its support to the side of the housing causes the weight to engage a movable tube that releases a mechanism that closes the valve.

U.S. Pat. No. 4,903,720 to McGill, one inventor of the present invention, discloses a safety shutoff device usable in any position. An inertia ball engages a first member so as to move the first member from a first position to a second position in response to vibrations or shocks imparted to the housing.

U.S. Pat. No. 5,119,841 discloses another safety shutoff apparatus in which an inertia ball normally rests on an indented surface, and a lever is pivotably mounted, with a permanent magnet mounted beneath the free end of the lever. When a shock or vibration causes the inertia ball to jump onto the lever and roll to ward its free end, the inertia ball is attracted to the permanent magnet so as to cause the lever to be pivoted downwardly.

A further seismic safety valve is described and claimed in U.S. Pat. No. 5,409,031, which together with U.S. Pat. Nos. 4,903,720 and 5,119,841, are incorporated herein by reference.

SUMMARY OF THE INVENTION

An object of the present invention is to provide an easy way of remotely electronically activating and resetting a seismic safety valve that can be mounted either above or below the ground. The valve is typically employed for the flow of gas and is shut off during an earthquake, after a gas leak may have been detected, if a carbon monoxide build up has been detected or during any other type of emergency.

The present invention contemplates that remote activation may be desirable in order to provide valve closure triggered by natural gas sensitive devices, thus providing protection from gas leaks as well as carbon monoxide. Valve closure may also be triggered by seismic events in accordance with a programmed time and amplitude relationship. The valve can then be set or adjusted for automatic (or mechanical) closure at higher levels of seismic activity, and the programmed remote activation feature can be employed for lower levels of seismic activity, but having a defined seismic motion. Remote activation would allow the valve to be closed for any emergency that might require gas to be shut off. The invention preferably provides a way of remotely resetting the valve after it has been activated.

Valve closure may also be triggered by seismic events in accordance with a programmed time, amplitude and frequency amplitude. Important features include manual resetting or turn-on capabilities, which manual reset or turn-on capability can be provided as either a primary or an alternate feature. Manual reactivation or turn-off capability can also be provided as an alternate feature.

Applicant's prior U.S. Pat. No. 5,409,031 is directed to one type of safety shutoff valve. The present invention may be applied to the safety shutoff valve of this type, and reference may be had to this patent for further details of the safety shutoff valve. U.S. Pat. No. 5,409,031 is incorporated herein by reference, accordingly.

Thus, the purpose of the present invention is to provide an easy way of remotely electronically activating and resetting a seismic valve that can be mounted above or under the ground to shut off the gas flow during an earthquake, after a gas leak is detected, carbon monoxide buildup or during any type of emergency. The remote activation is a desirable feature for at least the following reasons:

A. Valve closure triggered by a natural gas sensitive device providing protection from gas leaks as well as carbon monoxide and other hazards.

B. Valve closure can be triggered by programmed time, amplitude and frequency amplitude. The valve would then be adjusted for mechanical closure at higher levels and the programmed remote activation feature used for lower level but more refined, seismic motion.

C. Valve closure by remote activation can be for any emergency that may require the gas to be shut off.

D. A means for remotely resetting the valve can be employed after it has been activated.

E. A means of changing.the mechanical closure level (trip level) can be provided without entering the gas chamber.

F. A non-penetrating means for detecting the valve position (on/off), both visually and remotely, can be provided.

G. A non-penetrating means for remote control of a valve shut-off or turn-on electromagnetic method using a motor or solenoid coil with an intermittent low power and low voltage pulse for use with long life battery operation or other local remote power source, with complete isolation between the inside of the valve cavity area for intrinsic safety for personnel from hazardous environments, either inside or outside of the valve.

In order to achieve the objects of the present invention, the present invention provides a seismic safety valve that comprises a housing having a fluid inlet and a fluid outlet interconnected by a fluid passageway. A recess is formed inside the housing along the fluid passageway, and a valve seat is in the fluid passageway adjacent to and below the recess. A valve member comprised of a magnetic material is in the fluid passageway so as to be movable between a first position in the recess and a second position in the valve seat, the valve member closing the fluid passageway in the second position on the valve seat and the fluid passageway being open when the valve member is in the first position in the recess. The recess supports the valve member in the first position thereof so that the valve member is movable from the recess to the valve seat upon the housing being subjected to a predetermined amount of seismic activity under forces generated by the predetermined amount of seismic activity and gravity. At least one electromagnet is on the housing, outside of the fluid passageway, positioned so that when the valve member is in one of the first and second positions, activation of the at least one electromagnet will attract the valve member thereto from the one of the first and second positions, and subsequent deactivation of the at least one electromagnet will release the valve member so that the valve member arrives at the other of the first and second positions.

Preferably the housing comprises a top cover, with at least one electromagnet being mounted on the top cover over the valve seat so that the electromagnet can function to activate the valve.

According to a further feature of the present invention, the housing includes outer side surfaces, with at least one electromagnet being mounted on one of the outer side surfaces at a position vertically above the valve seat so as to enable the valve to be activated. Preferably the electromagnet is horizontally positioned closer to the valve seat than to the recess.

The housing may be further provided with a permanent magnet movably mounted on the outside thereof adjacent to the fluid passageway, with the permanent magnet being movable between a position adjacent to the valve seat and a position adjacent to the recess. Further, the permanent magnet is preferably positioned on one side surface, with the electromagnet being positioned on another side surface. The permanent magnet is preferably located in a groove on the housing that defines a magnet path between the positions adjacent to the valve seat and the recess as well as a manual actuator mounted on the housing that engages the permanent magnet for moving the permanent magnet in the groove. The position for the permanent magnet adjacent to the valve seat is preferably slightly below the valve seat. With this arrangement, manual activation and resetting can be performed, in addition to remote activation and/or resetting by the use of the electromagnet.

According to a further feature of the present invention, the at least one electromagnet can comprise two electromagnets. One of the two electromagnets is positioned adjacent to the recess, and the other of the two electromagnets is positioned adjacent to the valve seat. With this arrangement, both activation of the valve and resetting of the valve can be accomplished with the electromagnets by remotely activating the electromagnets in an appropriate order so as to transfer the valve member from one electromagnet to the other in displacing the valve member between the first and second positions, respectively.

BRIEF DESCRIPTION OF THE DRAWINGS

The above and further features and advantages of the present invention are further discussed below with reference to the accompanying drawings, in which:

FIGS. 77 and 78 illustrate a twenty-fourth embodiment according to the present invention, wherein FIG. 77 shows the valve in the on position and FIG. 78 shows the position in the actuated or off position;

FIG. 82 is a schematic illustration of a magnetic-activation module add-on;

DETAILED DESCRIPTION OF THE PREFERRED EMBODIMENTS

Figure 1:
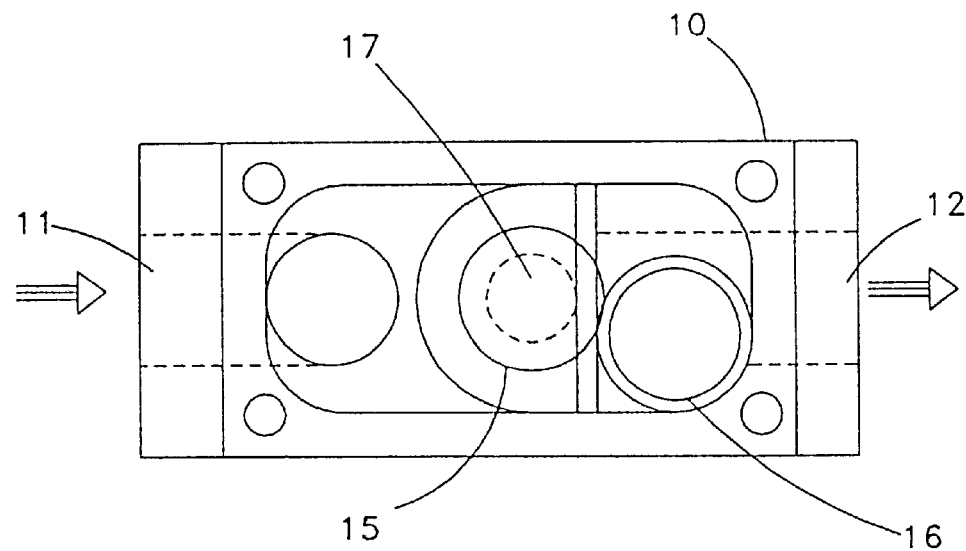
FIG. 1 is a top view of a first embodiment of a safety valve according to the present invention, with a top cover removed.
Figure 2:
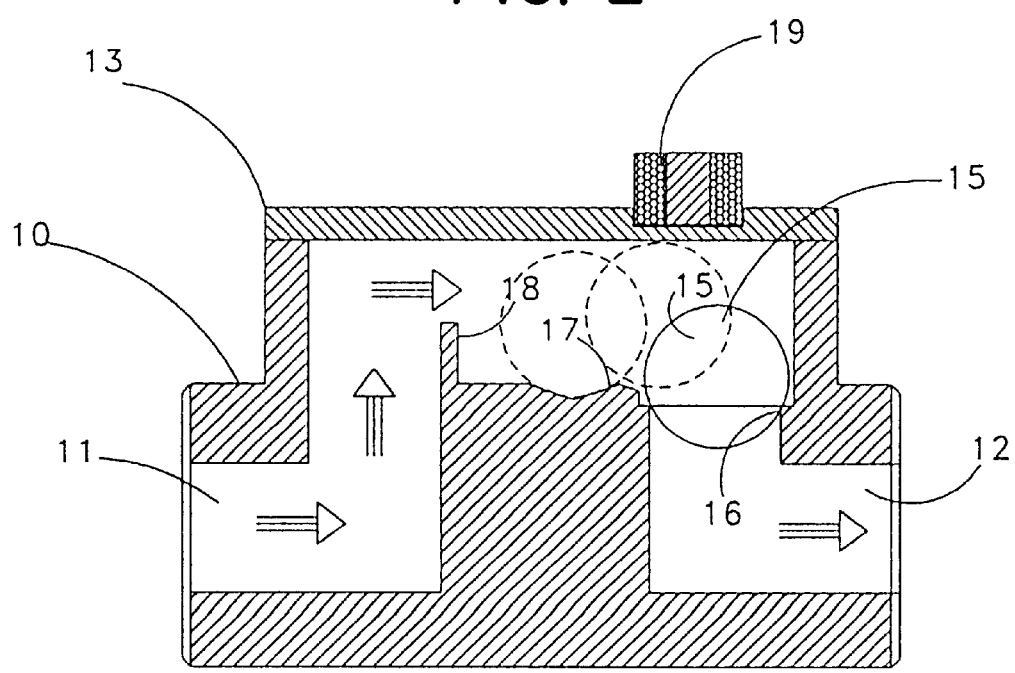
FIG. 2 is a cross-sectional elevational view of the safety valve of FIG. 1 with the top cover in place and illustrating movement of a valve member.

FIG. 1 illustrates a seismic safety valve from the top, while FIG. 2 shows a cross section thereof, according to a first embodiment of the invention. A housing 10 is provided with a fluid inlet 11 and a fluid outlet 12, with a fluid passageway extending therebetween through the housing 10. The direction of fluid flow is indicated by the arrows in FIG. 2. A top cover 13 closes the top of the housing 10, but can be removed for access to the interior of the housing 10.

A valve member formed as a sphere or ball 15 is made of a magnetic material such as steel and is located inside the fluid passageway. A pedestal recess 17, preferably of a conical shape, is provided for receiving the ball 15 and holding the ball 15 therein under normal conditions. A valve seat 16 is provided in the fluid passageway adjacent to the recess 17 for receiving the ball 15 in a closed position of the safety valve. A backstop 18 prevents the ball 15 from traveling too far in the direction toward the fluid inlet 11.

The recess 17 and the ball 15 are designed to interact such that, upon the occurrence of a predetermined amount of seismic activity, or other shock and vibration upon the occurrence of which it is desired to activate the valve, the ball 15 will become dislodged from the recess 17 and fall by gravity into the valve seat 16. Because the ball 15 is traveling in the direction of fluid flow, the fluid pressure will help hold the ball on the valve seat 16. In addition, as disclosed in U.S. Pat. No. 5,409,031, a magnet could be employed to help hold the ball 15 in place on the valve seat 16.

In accordance with the present invention, an electromagnet 19 is provided on the top cover 13 for remote activation of the safety valve. This electromagnet typically comprises a core wound by coils. Brief energization of the electromagnet 19 would cause the electromagnet 19 to attract the ball 15, made of an electromagnetic material, toward it from the recess 17. However, the energization of the electromagnet 19 is brief. After the subsequent de-energization of the electromagnet 19, the ball 15 is released. However, due to its displacement inside the housing 10, the ball 15 will then drop under gravity, and possibly under the influence of an additional magnet as noted above, onto the valve seat 16 to close the fluid passageway.

By the provision of the electromagnet 19, the safety valve could be provided at a remote location having difficult manual access and still allow for activation of the valve in circumstances other than the occurrence of the predetermined seismic activity or other shock and vibration that would ordinarily cause the ball 15 to leave the recess 17. Thus the safety valve could be placed underground, for example.

The electromagnet can be energized from a suitable power source activated for a brief period of time. For example, power could be provided by capacitor discharge, or a short timed circuit. A current pulse would be sent to the electromagnet coil, and would typically be on the order of one-half second or less in order to prevent the magnet coil from overheating.

Remote activation of the electromagnet 19 could take place by a suitable manually operable switch that would connect the power source to the electromagnet 19. Also, the power source could be connected to the electromagnet 19 by a suitable activating mechanism such as a gas leak detector. That is, upon the gas leak detector detecting a gas leak, for example detecting the presence of natural gas, or detecting the presence of carbon monoxide, etc., a switch connected with the device would be operated to connect the power source with the electromagnet 19 to activate the safety valve. A suitable seismic event detection device could also be employed to connect the electromagnet 19 with the power source. For example, a seismic event detection device could be programmed for a particular time and amplitude relationship, upon the occurrence of which the safety valve would be closed by the energization of the electromagnet 19. One advantage of such an arrangement is that the automatic closing feature of the safety valve, having the ball 15 leave the recess 17 upon the occurrence of a predetermined amount of seismic activity or shock or vibration, could be set at a higher level of seismic activity, and the programmed remote activation could be set at a lower level of seismic activity, with the lower level providing for a more refined detection of the type of seismic motion. In other words, the valve could be set off by a particular type of seismic activity at or beyond a first level, and seismic activity of any type beyond a second, higher level.

Figure 3:
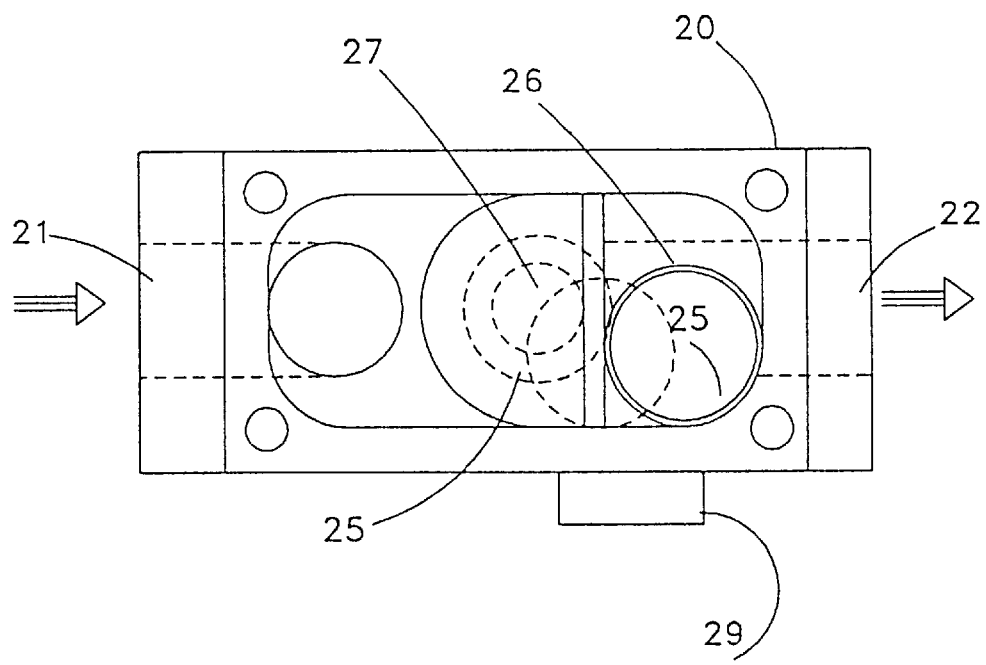
FIG. 3 is a view similar to FIG. 1, but of a second embodiment of the safety valve according to the present invention.
Figure 4:
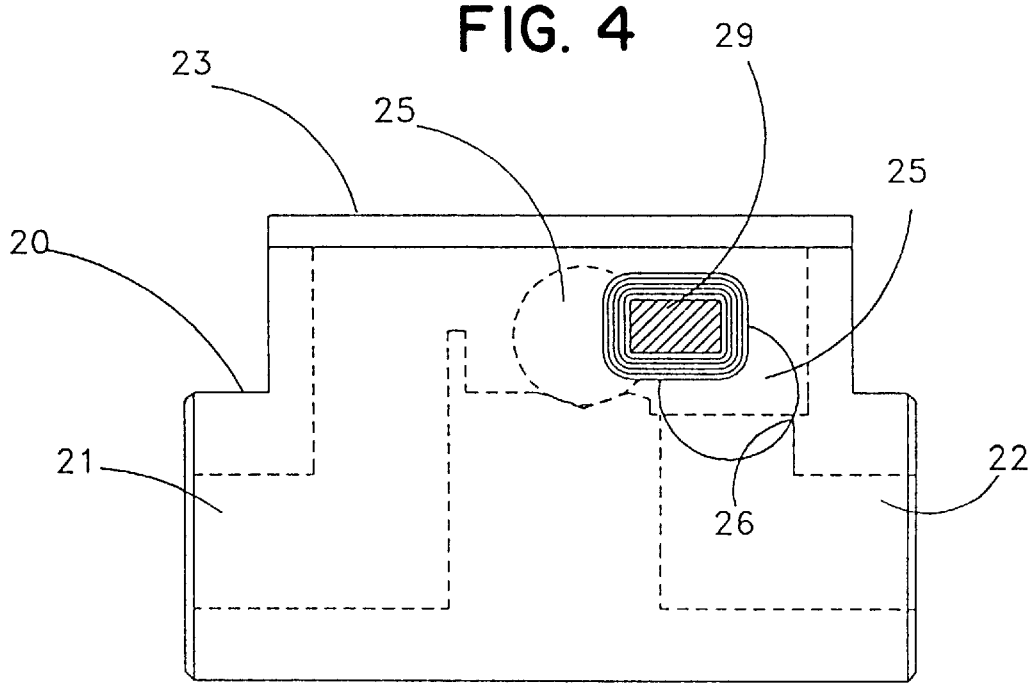
FIG. 4 is a side view of the safety valve of FIG. 3 partly in section.

FIGS. 3 and 4 illustrate a second embodiment according to the present invention, including a housing 20, a fluid inlet 21, a fluid outlet 22, a top cover 23, a ball 25, a valve seat 26, a pedestal recess 27, a back stop 28 and an electromagnet 29. The difference between this second embodiment and the first embodiment according to the safety valve of the present invention is that the electromagnet 29 is located on one of the side surfaces of the housing 20. Indeed, the electromagnet receiving the current pulse could be located on either side of the housing, on the top of the housing, or even on the end of the housing. It should also be noted that the magnet core could be round, oval, square, racetrack shaped (i.e. two semicircular end portions connected by straight portions), triangular, or of any other suitable shape.

Figure 5:
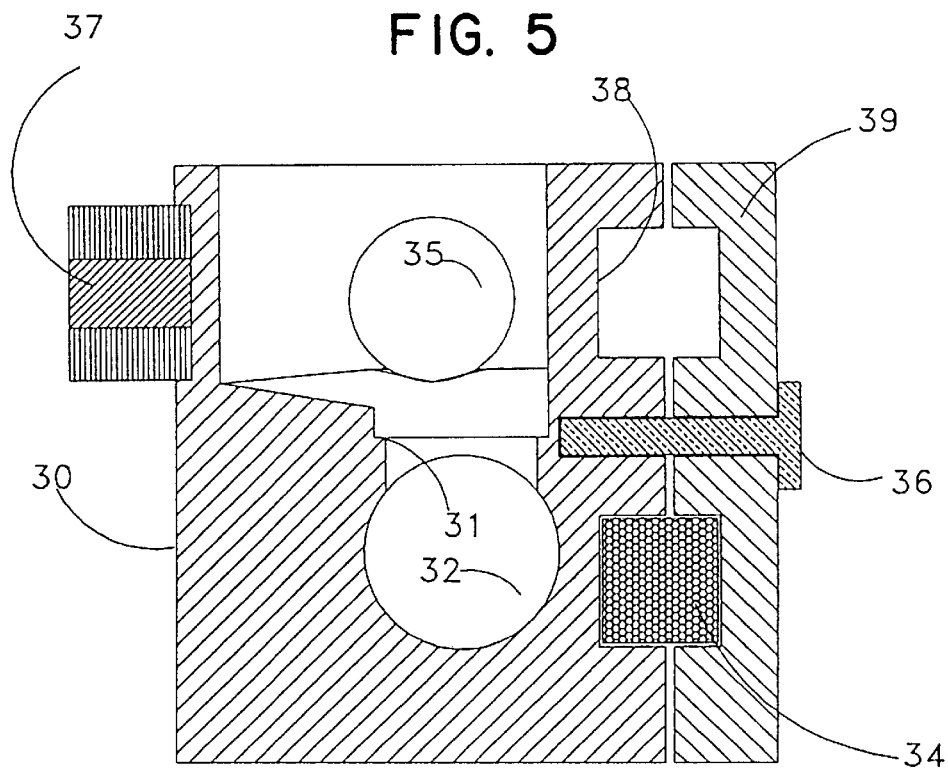
FIG. 5 is a cross-sectional elevational view of a safety valve according to a third embodiment of the present invention.
Figure 6:
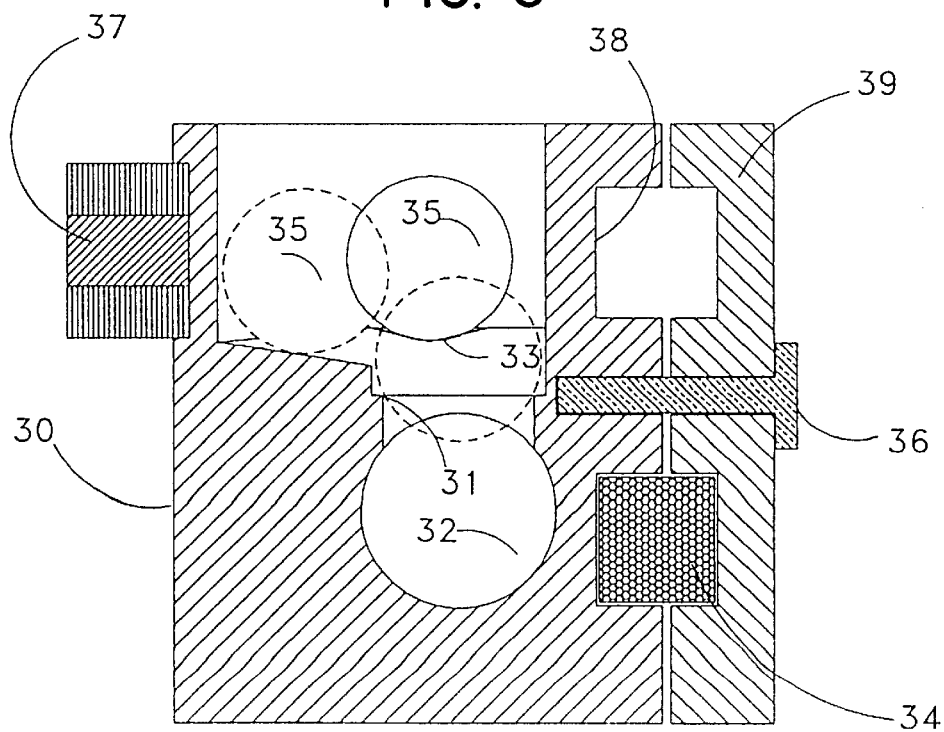
FIG. 6 is a view similar to FIG. 5, showing the displacement of a valve member.

FIGS. 5 and 6 illustrate a third embodiment according to the present invention, in which a housing 30 has a valve seat 31, a fluid outlet 32, a pedestal recess 33 and a ball 35. Similar to the first and second embodiments, this third embodiment employs an electromagnet 37 for remotely activating the valve, i.e. for remotely causing the ball 35 to be pulled from the recess 33 so as to drop into the valve seat 31.

However, this third embodiment also includes the feature of a permanent magnet 34 being externally mounted on the opposite side of the housing from the electromagnet 37. The external permanent magnet 34 is provided in a groove 38 in the housing. The groove 38 extends in a loop on the-surface of the housing so as to enable the magnet 34 to travel in the groove 38 between a position adjacent to the valve seat 31 and a position adjacent to the recess 33. The position adjacent to the valve seat 31 is, in fact, somewhat below the valve seat 31. A handle 39 connected by a pin 36. to the housing 30 is provided for moving the permanent magnet 34 in the groove 38.

The remote activation of this third embodiment is similar to that of the first and second embodiments. However, in this embodiment manual activation and resetting can also be accomplished by movement of the permanent magnet 34 along the groove 38. That is, the permanent magnet 34 can pull the ball 35 from the valve seat back up to the recess 33, or alternatively, can pull the ball 35 from the recess 33 to the valve seat 31. In its position below the valve seat 31, the permanent magnet 34 also assists in holding the ball 35 on the valve seat 31 after the valve has been activated.

Figure 7:
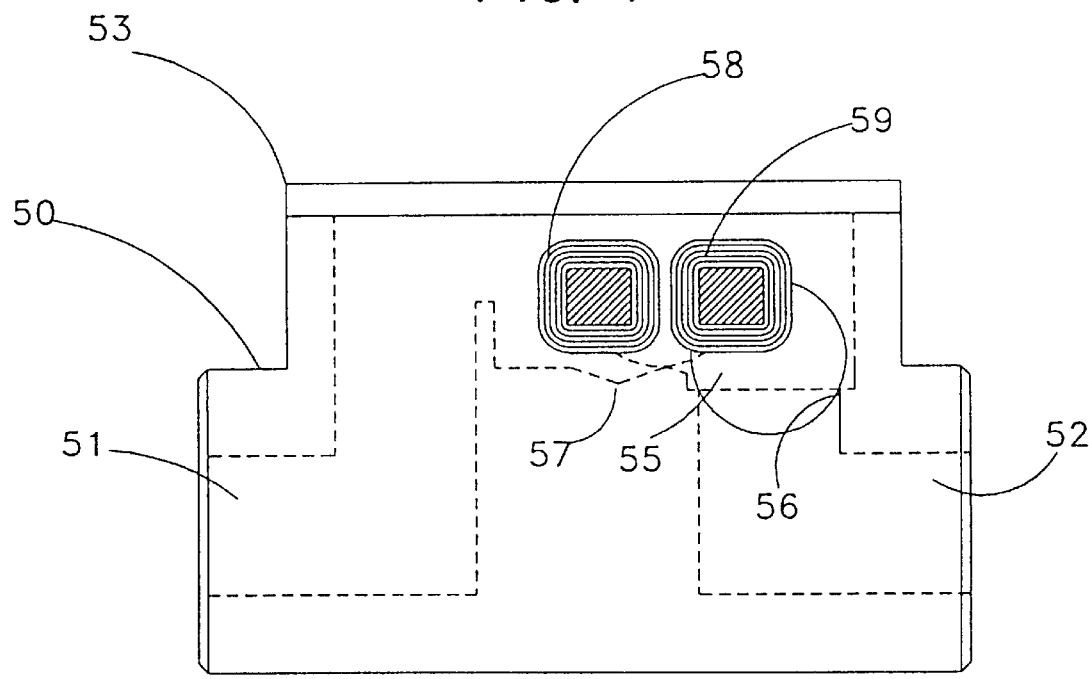
FIG. 7 is a view of the similar to FIG. 4 of a fourth embodiment of a safety valve according to the present invention.
Figure 8:
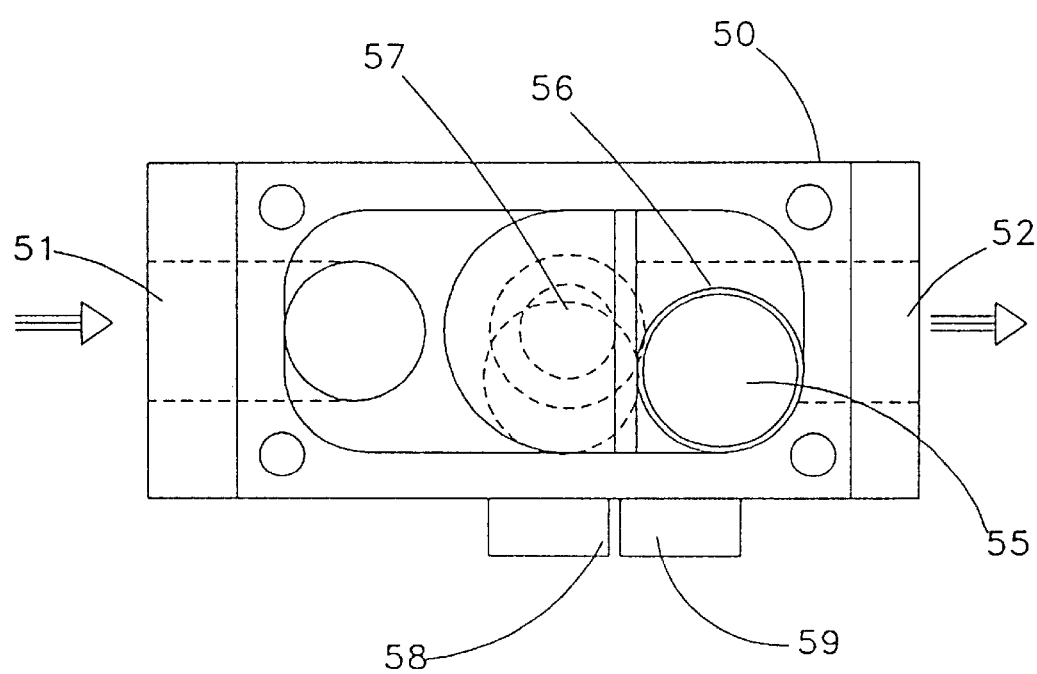
FIG. 8 is a top view of the safety valve according to the fourth embodiment.

FIGS. 7 and 8 illustrate a further embodiment according to the present invention. In this embodiment, a housing 50 is provided with a fluid inlet 51 connected by a fluid passageway to a fluid outlet 52. A top cover 53 closes the top of the housing 50. A ball 55 can be seated in a valve seat 56 or located in a recess 57. When located in the valve seat 56, the ball 55, made of a magnetic material, seals the fluid passageway and prevents the flow of gas therethrough. When located in the recess 57, the fluid passageway is open for the flow of gas.

Two electromagnets 58 and 59 are provided on the side of the housing 50. If the ball 55 is initially in the pedestal recess 57, then when the electromagnet 58 is energized, the ball 55 will be pulled out of the pedestal recess 57 and center itself about electromagnet 58. The electromagnet 59 is then energized, and simultaneously the electromagnet 58 is de-energized. This allows the ball 55 to center about the electromagnet 59. Thus, when the electromagnet 59 is subsequently de-energized, the ball 55 will fall onto the valve seat 56, stopping the flow of gas through the valve.

When the ball 55 is on the valve seat 56, energization of the electromagnet 59 will pull the ball 55 off of the valve seat 56 so that the ball 55 becomes centered about the electromagnet 59. Then, the electromagnet 58 is energized simultaneously with the electromagnet 59 being de-energized, allowing the ball 55 to move and become centered about the electromagnet 58. Thus, when the electromagnet 58 is subsequently de-energized, the ball 55 will roll onto the pedestal recess 57, allowing gas to once again flow through the valve.

Thus, the embodiment as set forth in FIGS. 7 and 8 is particularly advantageous in that the combination of the two electromagnets 58 and 59 allows the ball 55 to be selectively moved from its closed position to its open position, and vice versa. A simple timer circuit energizing the electromagnets in the appropriate order could be employed to operate the electromagnets.

It will be clear to those of skill in the art that a number of variations can occur with the embodiments described above. For example, the permanent magnet 34 and its accompanying knob 39 could be provided with any one of the embodiments described above. The magnet core can take on a number of different configurations including those above, including being round, oval, square, racetrack shaped, triangular, and other shapes. The electromagnet can be powered by a capacitor discharge, or by a short timed circuit. However, current pulses should be maintained on the order of one-half second or less in order to avoid the magnet coil overheating.

The housing should preferably be made of a non-magnetic material for proper transfer of the magnetic field of the electromagnet through the housing to the ball valve member made of a magnetic material. The ball valve member in each of the above embodiments can be made of any appropriate material, such as steel. The housing is preferably made of aluminum, but other suitable natural and man-made materials may be contemplated.

Thus according to the present invention, there is provided a seismic safety valve that can not only shut off the flow of gas in response to a seismic event, but can also be formed so as to remotely reset the valve or even remotely activate the valve in response to other conditions. Thus the invention has provided an easy way of remotely electronically activating and resetting a seismic safety valve. Thus the valve can be mounted either above ground, or even underground, in order to shut off the gas flow during an earthquake, after a gas leak has been detected, after a carbon monoxide buildup has been detected or during any other type of emergency in which it is desired to shut off the flow of gas.

As discussed above, remote activation is desirable in order to provide for valve closure that is triggered by natural gas sensitive devices, thus providing protection from gas leaks and carbon monoxide. The present invention further provides valve closure that can be triggered by seismic events in accordance with a programmed time and amplitude relationship. For example, the natural amount of seismic activity required to displace the ball from the pedestal recess onto the valve seat could be considered a higher level of activity. Activation may nonetheless be desired for lower levels of activity that have a certain form, such as a particular time and amplitude relationship. Thus, if a sensor is employed to detect this relationship, a programmed time and amplitude relationship can be employed together with the sensor to activate the electromagnet and trigger the valve. The present invention also allows for the valve to be closed be remote activation for any other emergency that might require the gas to be shut off. The present invention further provides a means that can remotely reset the valve after it has been activated.

Figure 9:
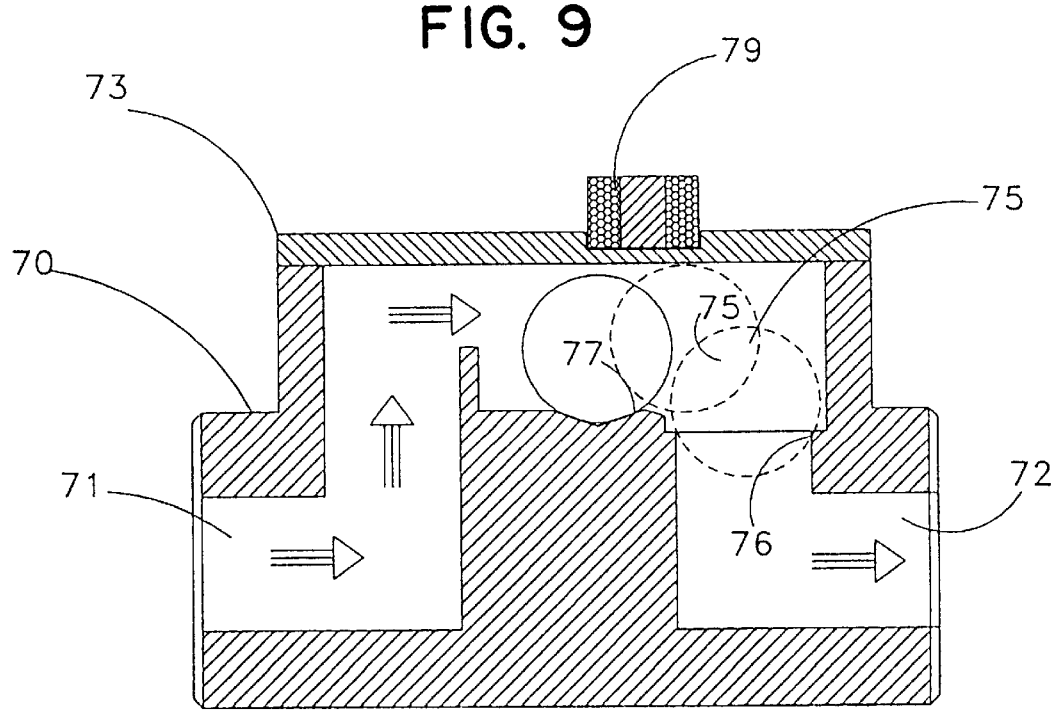
FIGS. 9 and 10 show a safety valve in a view similar to that of FIG. 2 showing the activation thereof by a pulse of current.
Figure 10:
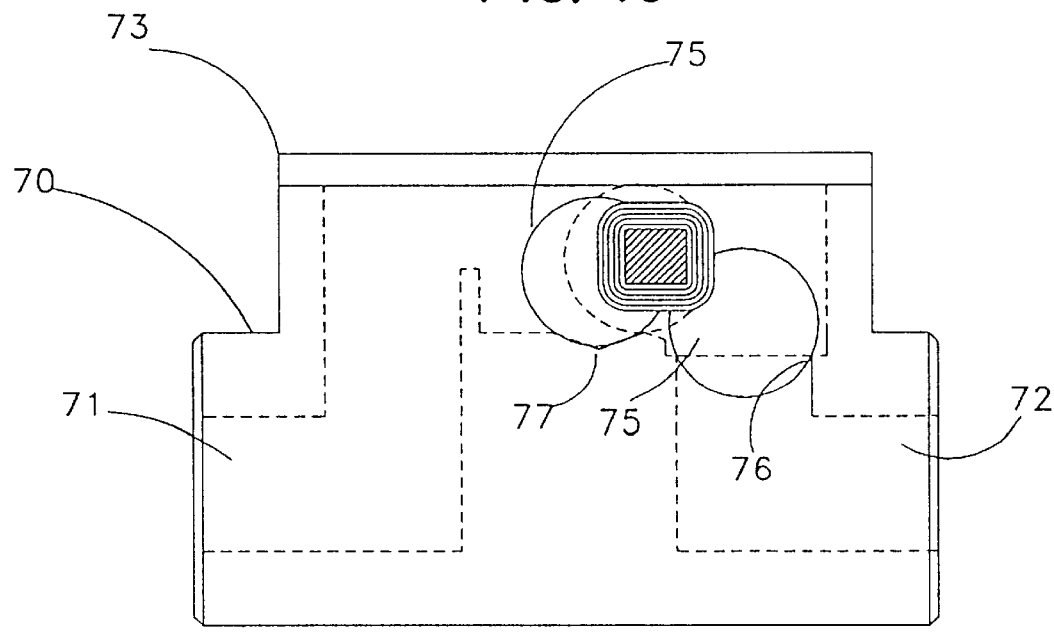

FIGS. 9 and 10 show a side section of the valve with an electromagnet 79 being activated by a pulse of current controlled by an electrical signal thus moving the ball 75 out of its recess 77 by momentum to cause the ball to fall into valve seat 76, stopping the flow. The valve can be reset by pulsing the current to pull the ball out of its seat and using momentum to move the ball to rest in its pedestal.

Figure 11:
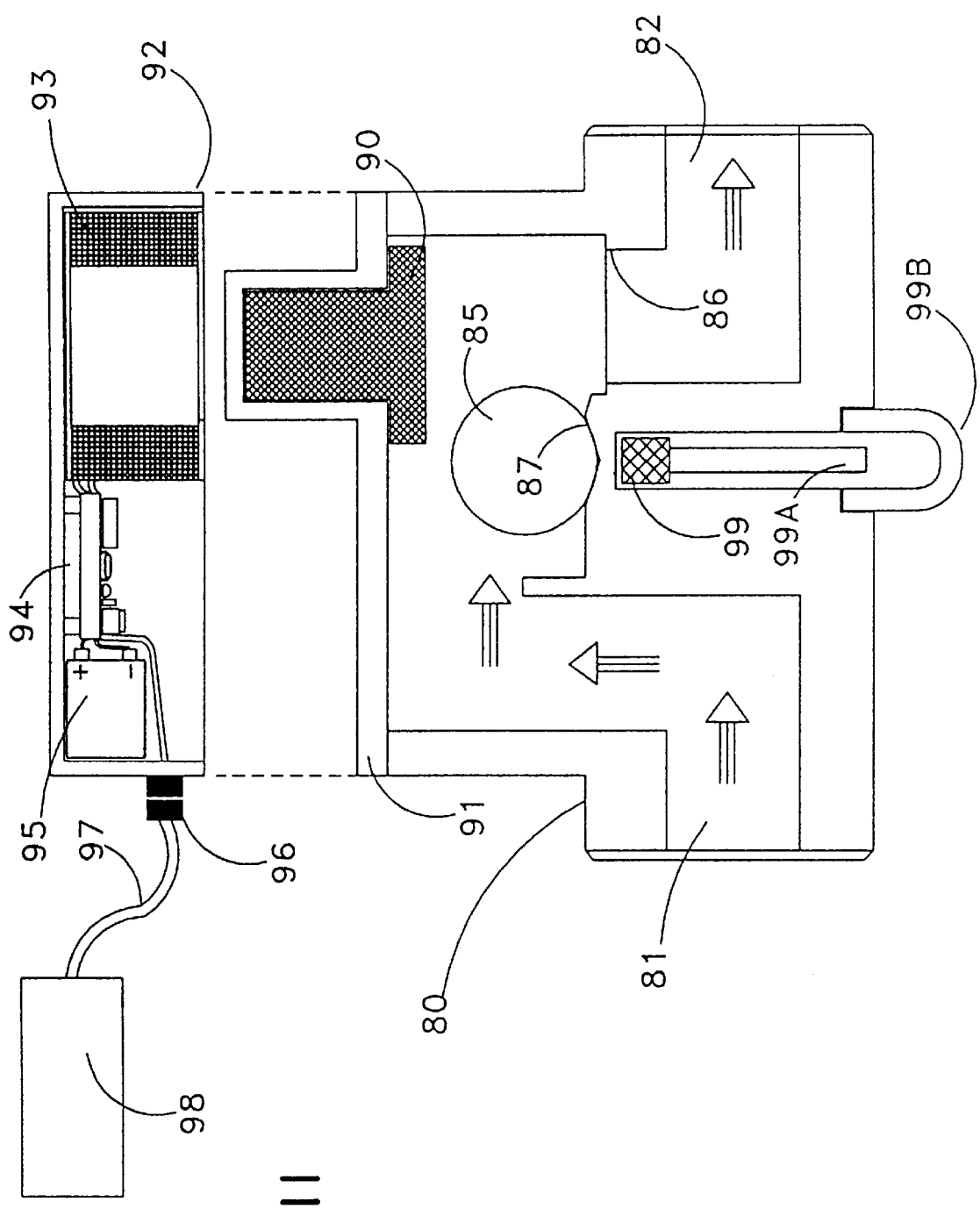
FIG. 11 shows a fifth embodiment according to the present invention in a view similar to that of FIG. 2.
Figure 12:
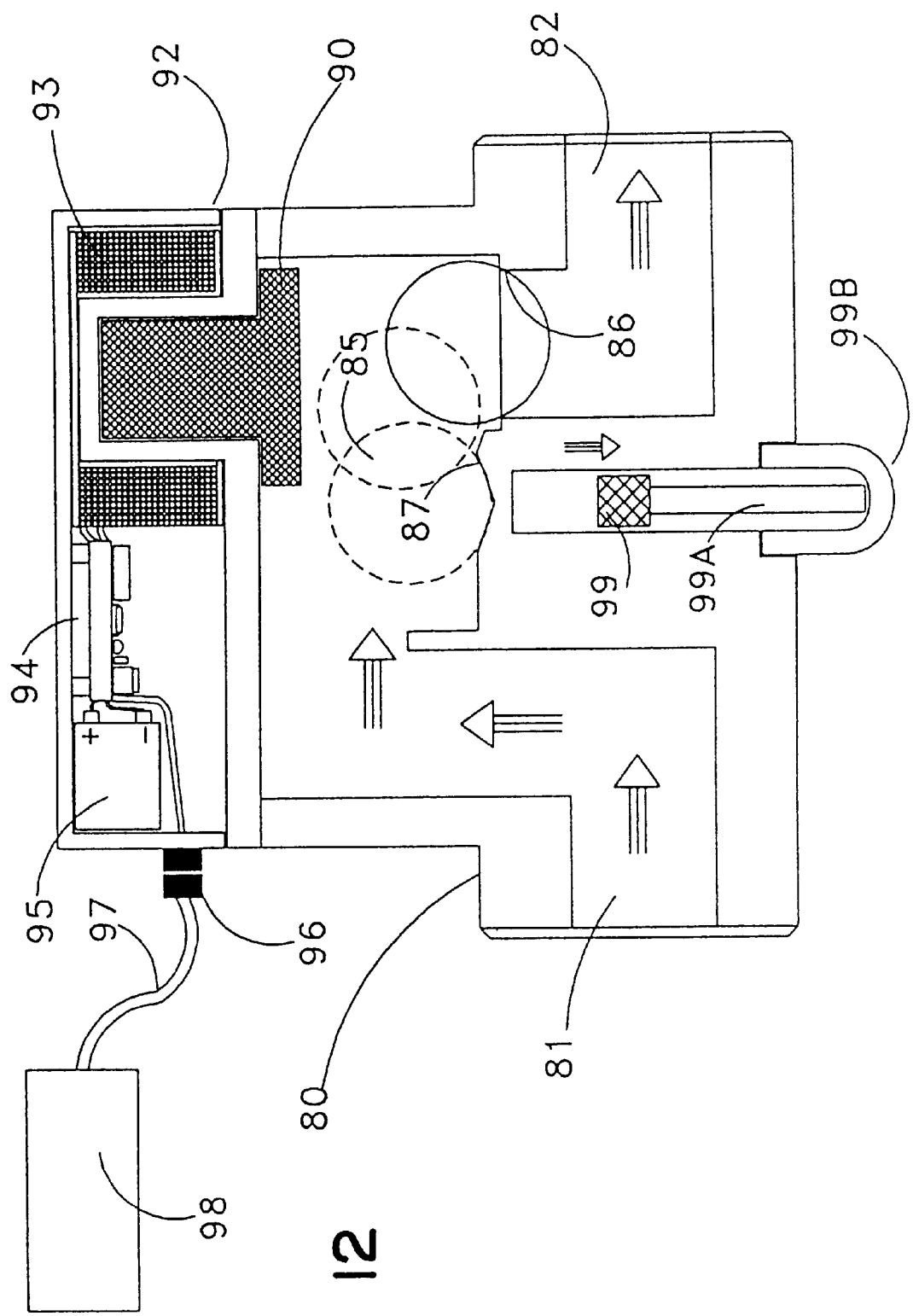
FIG. 12 shows the valve of FIG. 11 with the valve being activated.

FIGS. 11 and 12 show side sections of the valve similar to above having an add-on module 92 containing an electromagnet coil 93, battery 95, and fail-safe circuit 94 that can be attached to a master control 98. A core 90 is mounted in the top cover of the valve to increase the magnet pull on the ball. The operation is the same as above.

A means of changing the mechanical trip level is shown by a magnet 99. The magnet 99 acts on the ball 87, and the trip level is changed by increasing or decreasing the flux of the magnet 99. This magnet 99 also adds dampening to the ball on its pedestal.

To detect the status of the valve (on/off), the magnet 99 will be attracted by the ball when it is in its pedestal. When the ball moves from the pedestal 87 to its valve seat 86, the magnet will fall together with an attached colored stem 99A, allowing this change to be seen through the view glass 99B, thus indicating the status of the valve.

Figure 13:
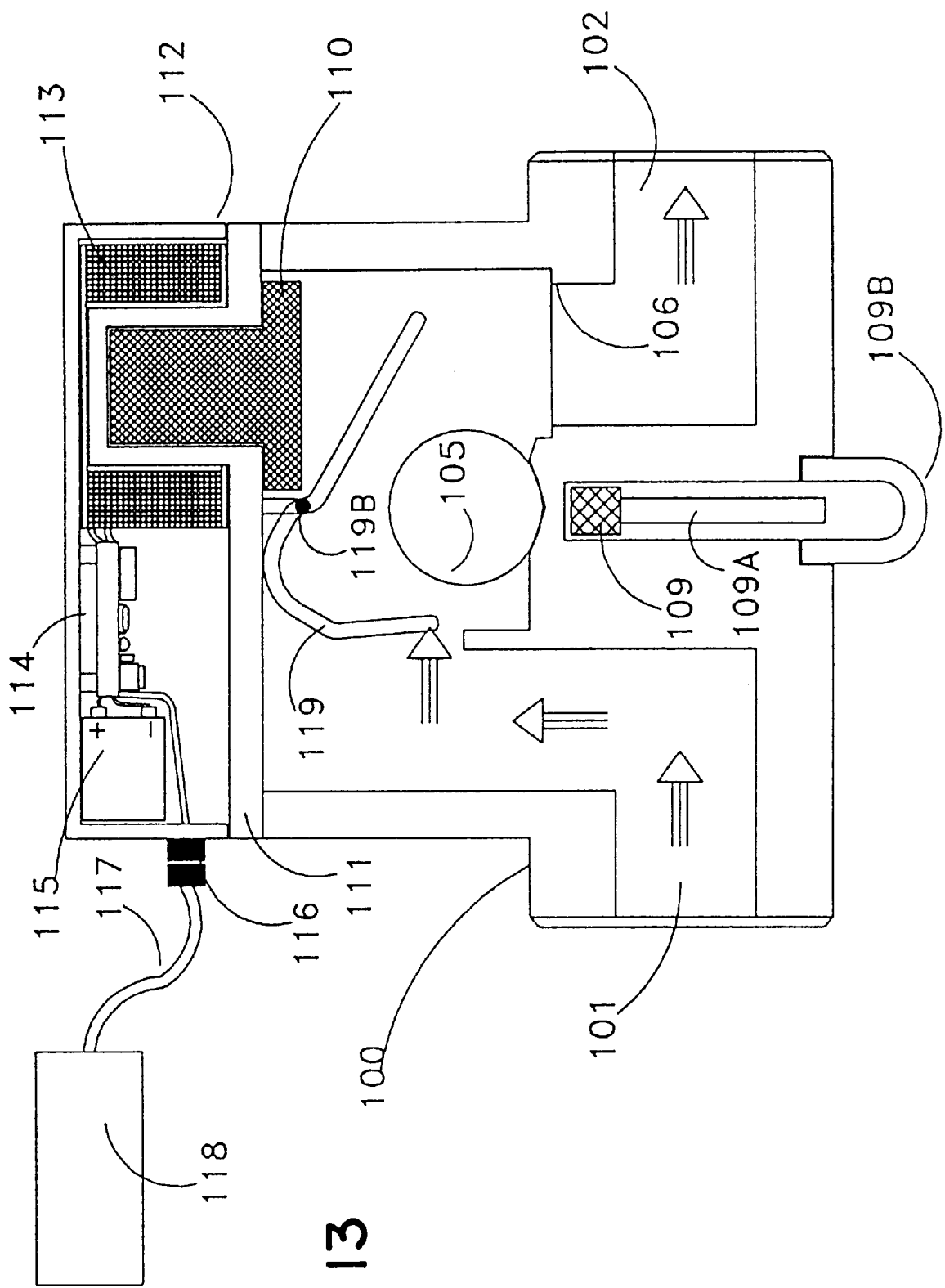
FIG. 13 shows a sixth embodiment, this embodiment being a variation of the embodiment of FIG. 11.
Figure 14:
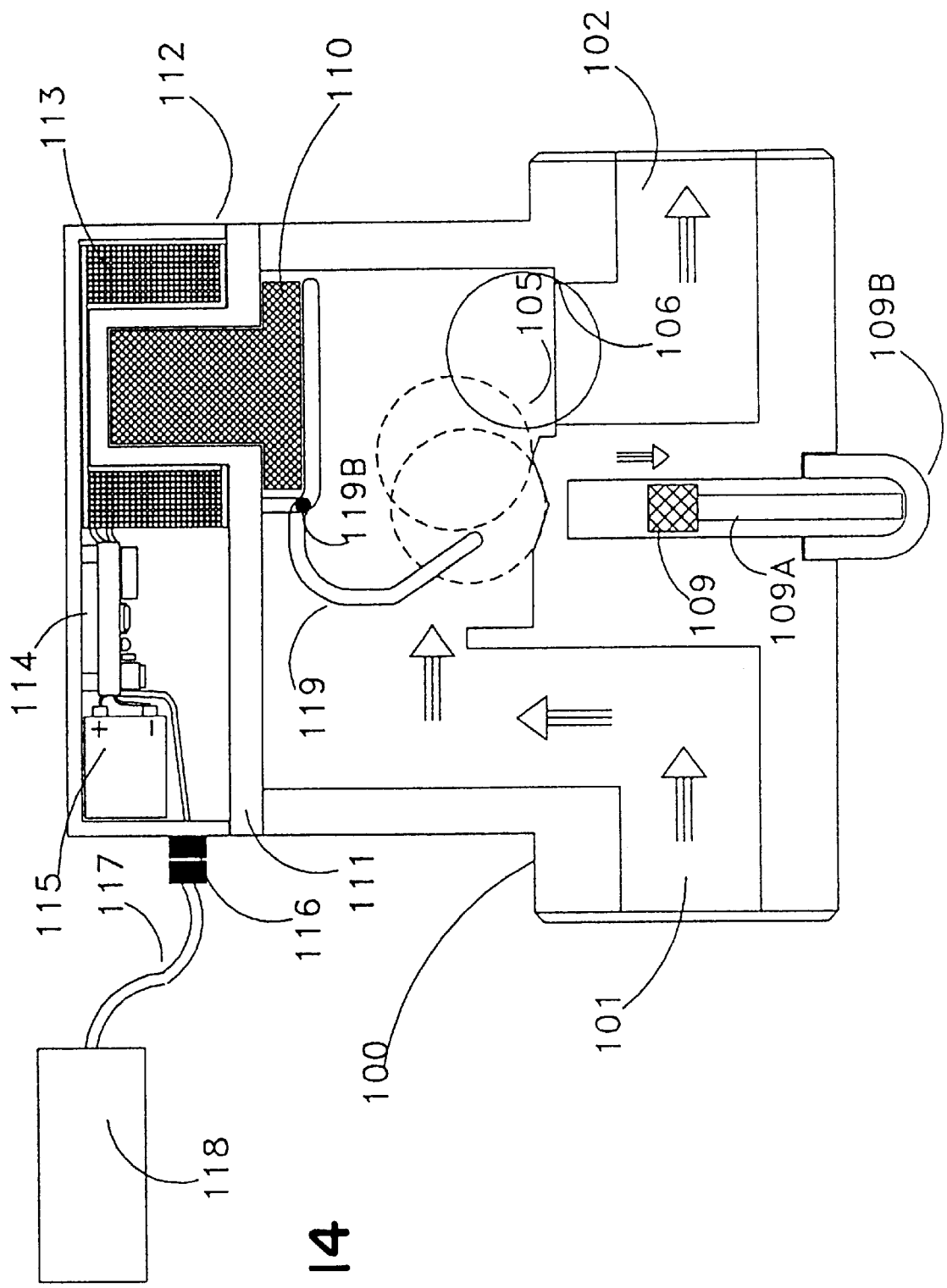
FIG. 14 shows the sixth embodiment being activated.

FIGS. 13 and 14 show side sections of a valve similar to the above valve, but having a flapper 119 pivoted about 119B mounted inside the valve so as to act directly on the ball. The flapper is attracted by the core 110. When the electromagnet is pulsed, the flapper will rotate to move the ball off of its pedestal. This will decrease the amount of energy required to activate the valve.

Figure 15:
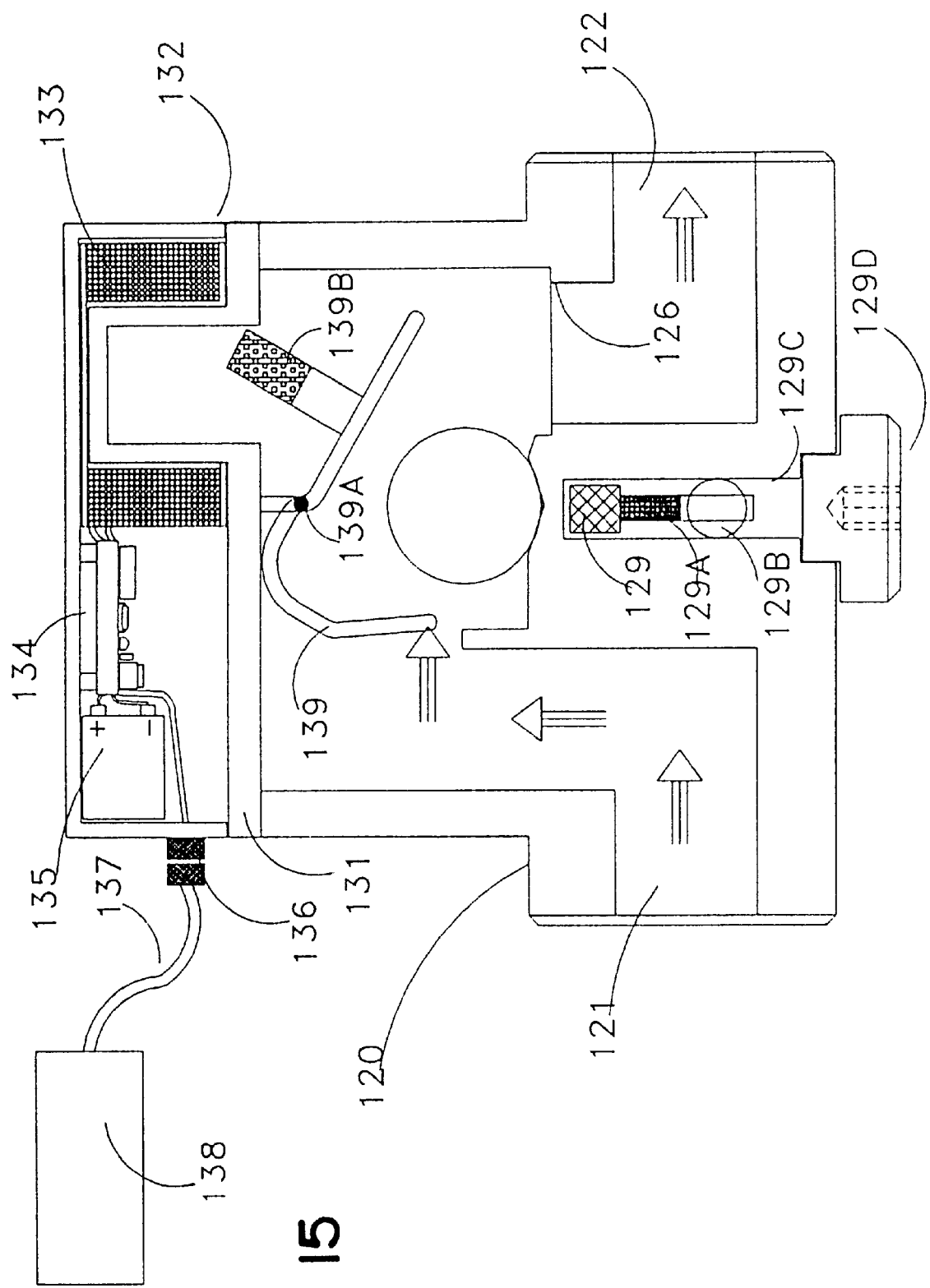
FIG. 15 shows a seventh embodiment, which is a modification of the sixth embodiment.
Figure 16:
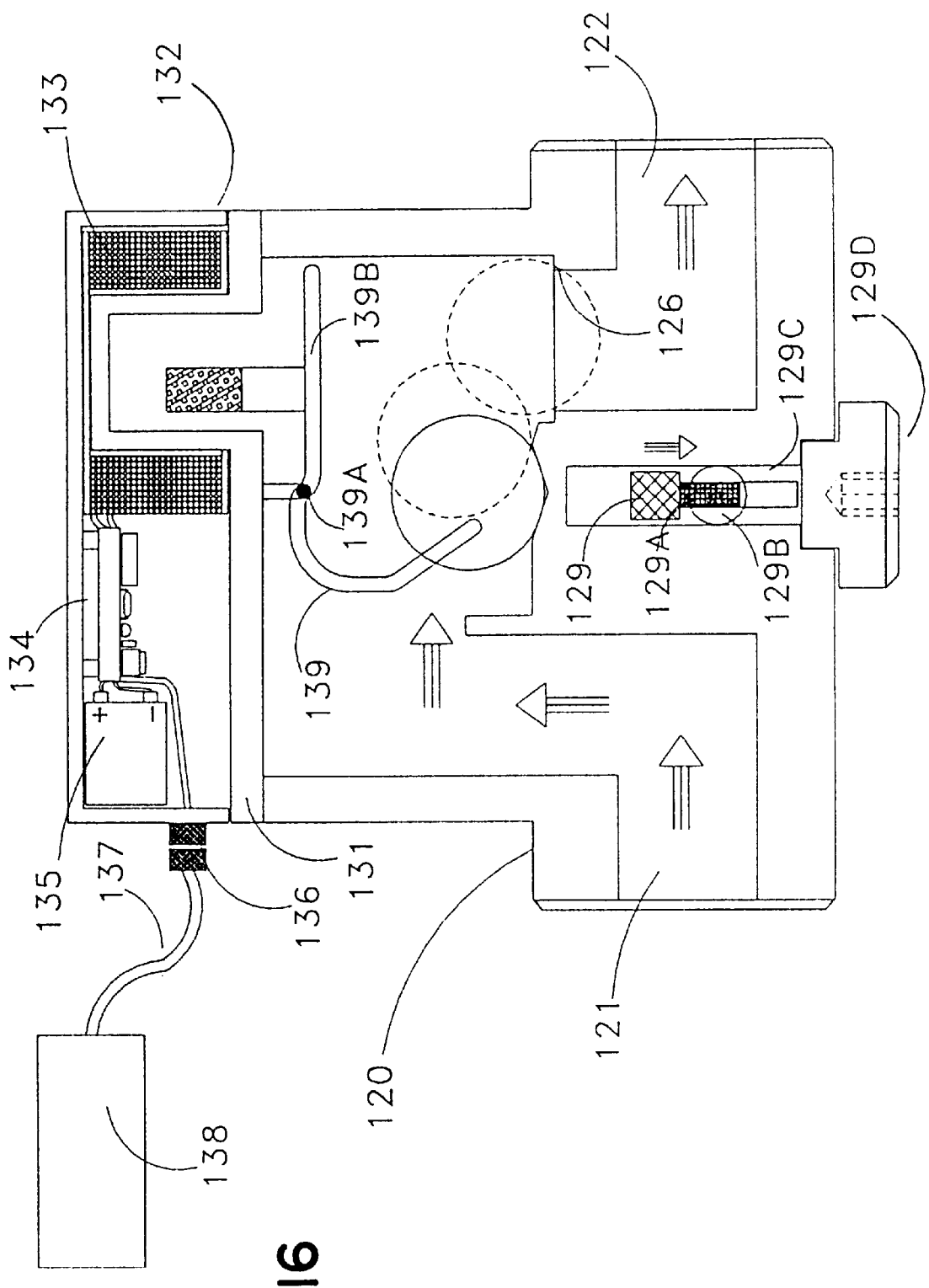
FIG. 16 shows the seventh embodiment in an activated state.

FIGS. 15 and 16 show side sections of a valve similar to FIGS. 13 and 14, but with the core removed, and a magnet 139B attached to the flapper. When the electromagnet is pulsed, the magnet 139B is pulled into the center of the coil, thus rotating the flapper to move the ball. This requires less energy by a factor of 10 over that shown in FIGS. 13 and 14 above. Also shown is an alternative status indicator having a cross hole 129B to view a color change when the magnet and stem move across the cross hole. The magnet and stem (129, 129A–C) are kept in place by a cap 129D.

Figure 17:
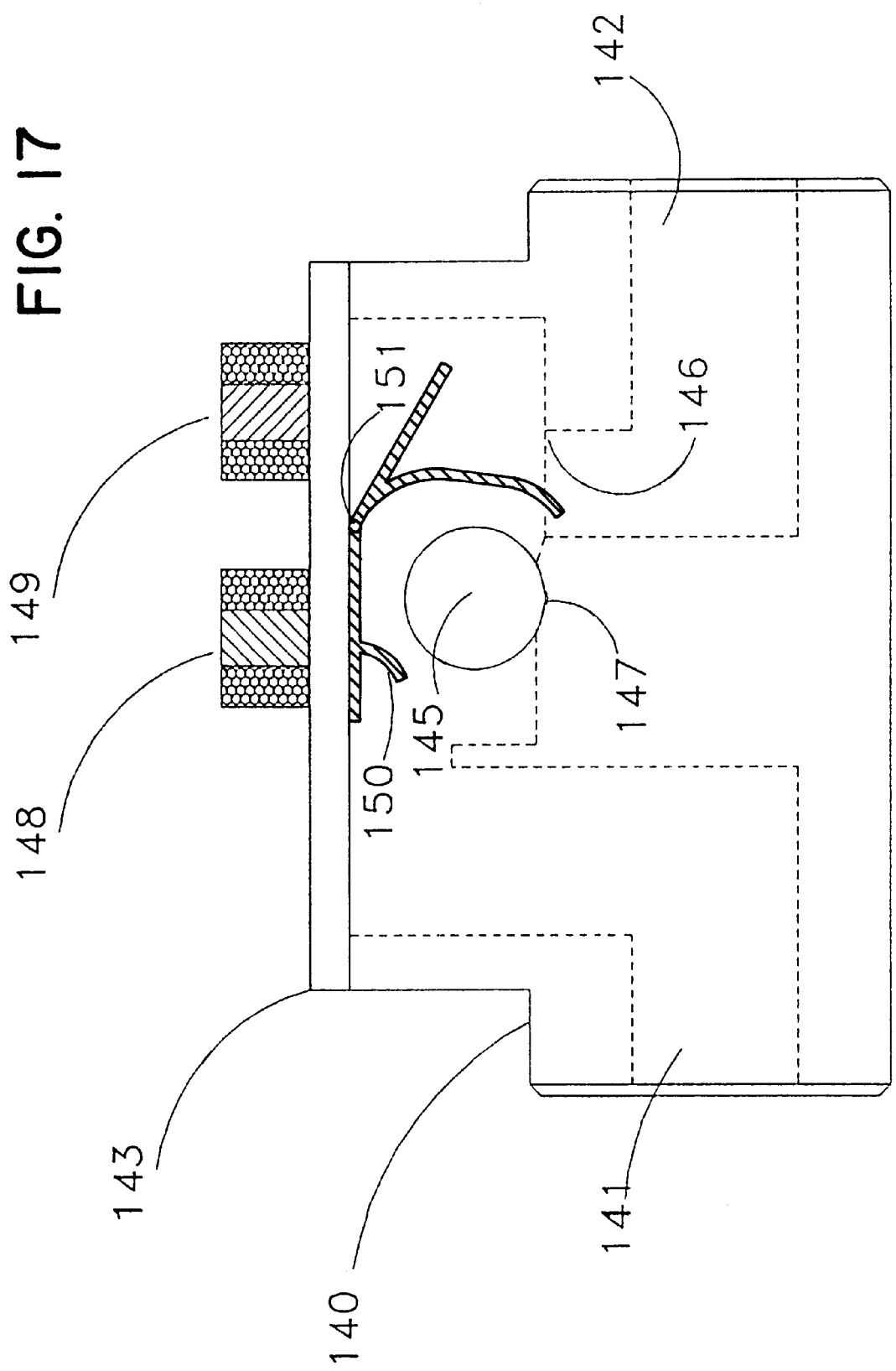
FIG. 17 shows an eighth embodiment of the present invention in a view similar to that of FIG. 2.
Figure 18:
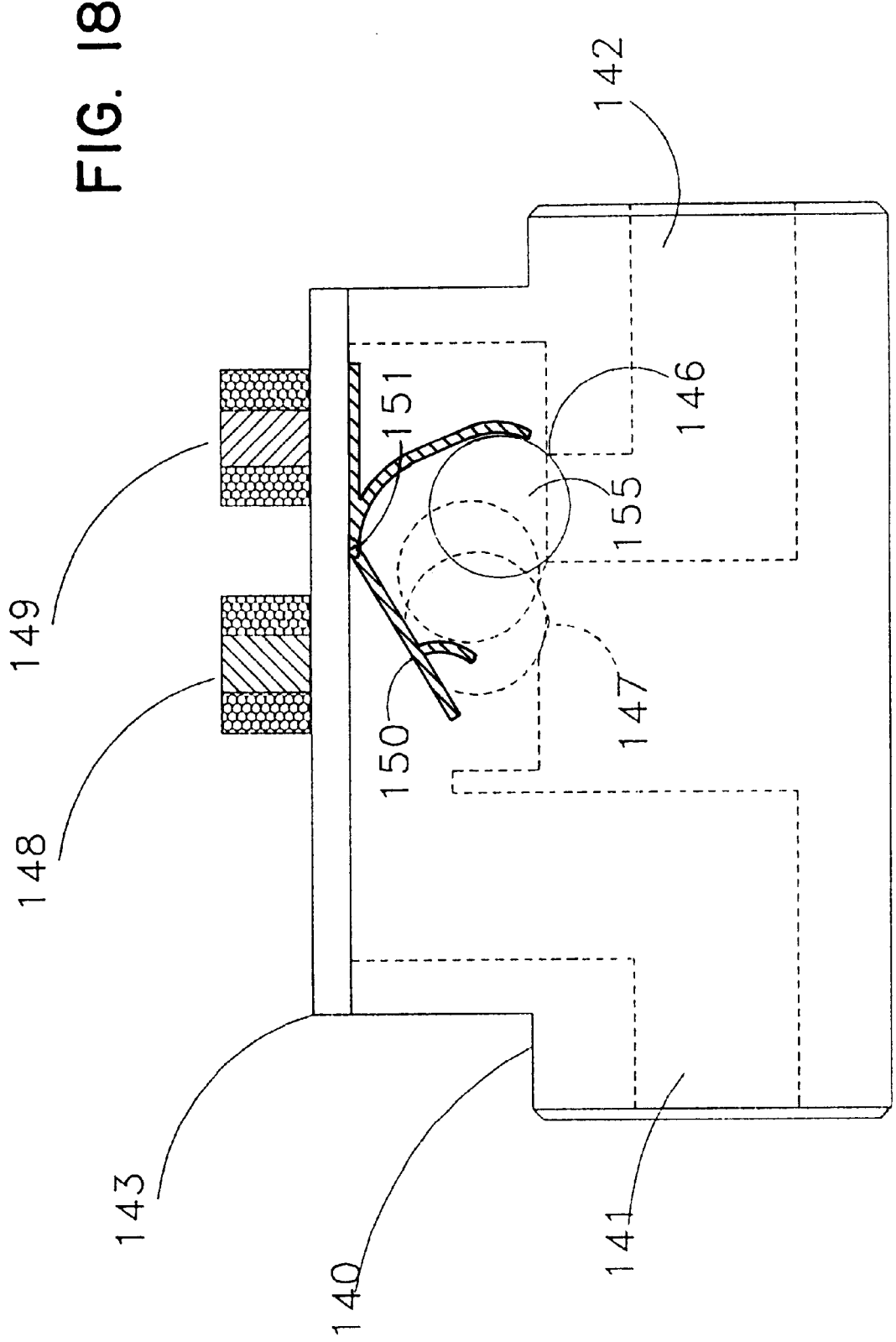
FIG. 18 shows an activated state of the eighth embodiment.

FIGS. 17 and 18 show side sections of a valve similar to the above figures, but with a dual flapper 150 and dual electromagnets 148 and 149. By activating one or the other electromagnet, the flapper is attracted thereto, and can move the valve to the on or off position, as illustrated.

Figure 19:
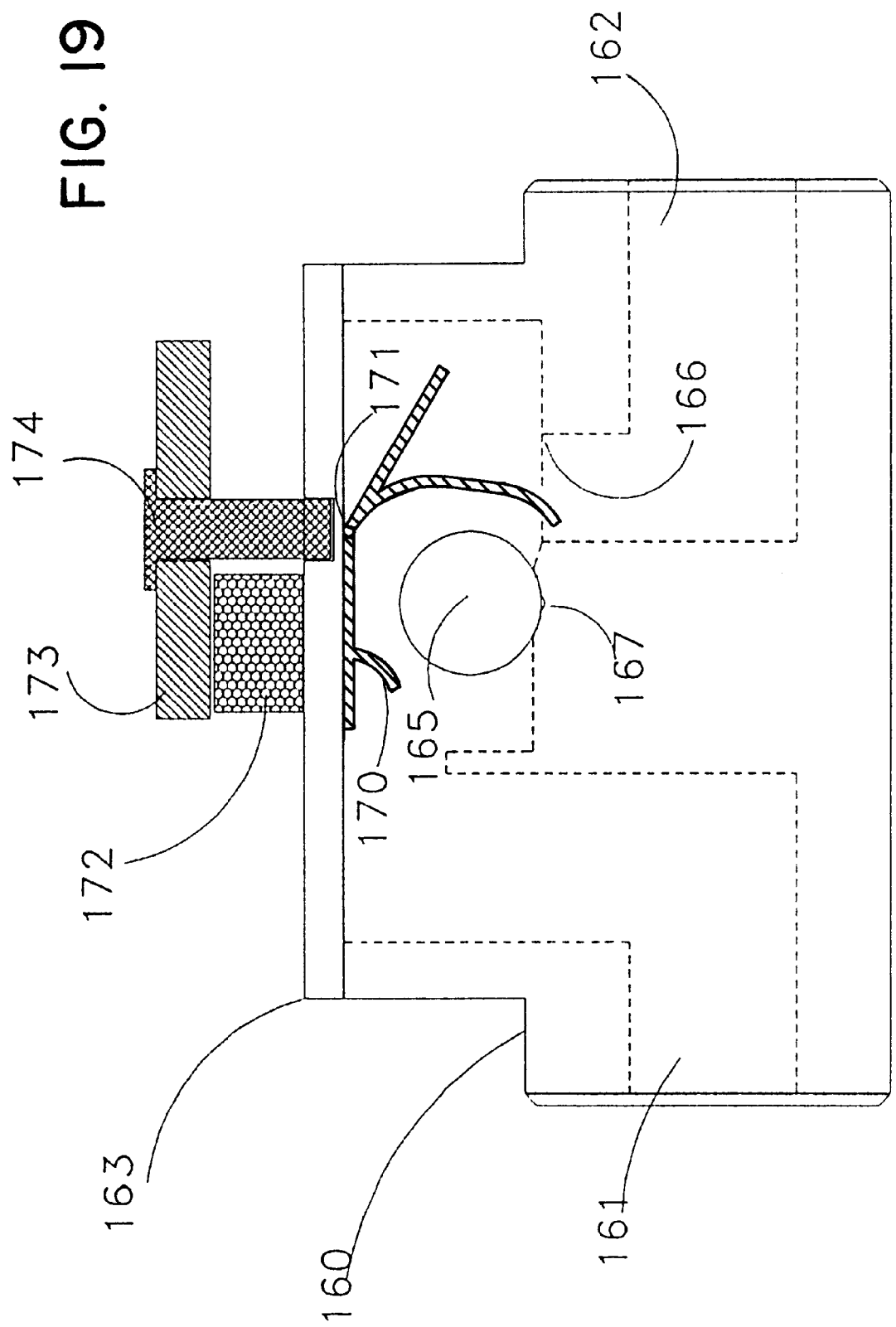
FIG. 19 shows a variation of the eighth embodiment.
Figure 20:
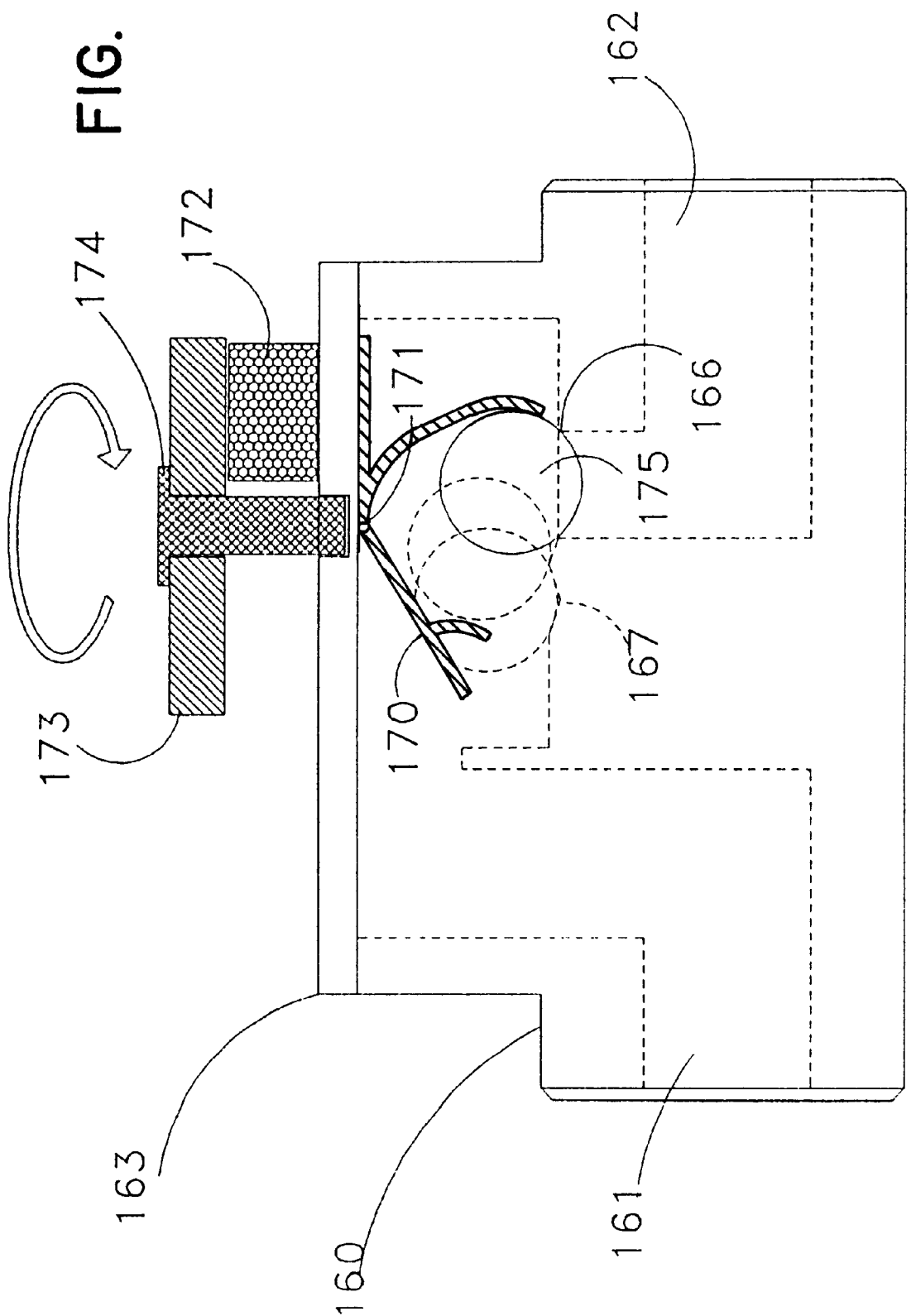
FIG. 20 shows an activated state of the valve of FIG. 19.

FIGS. 19 and 20 show side sections of a valve similar to FIGS. 17 and 18, with a dual flapper 170 and a magnet 172 attached to a knob or handle 173 that can be rotated to activate the flapper the same way as the magnet shown above. The handle 175 could also be removed, and a hand held magnet used in its place.

Figure 21:
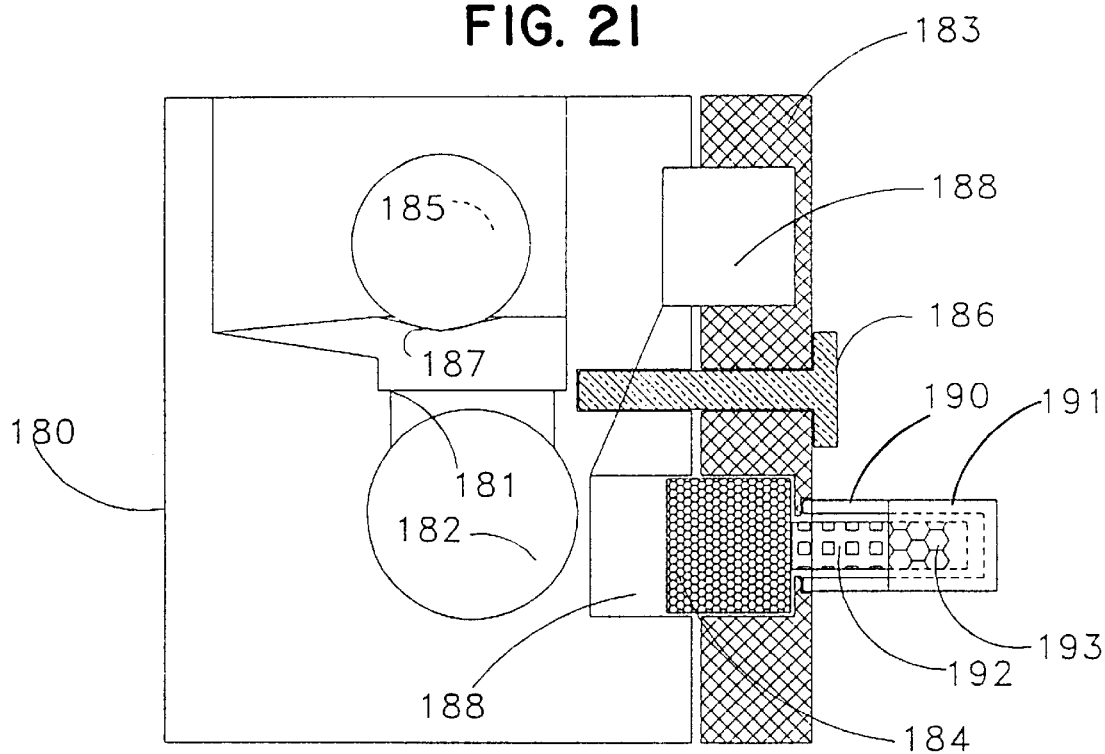
FIG. 21 shows a cross-sectional view of a ninth embodiment according to the present invention.
Figure 22:
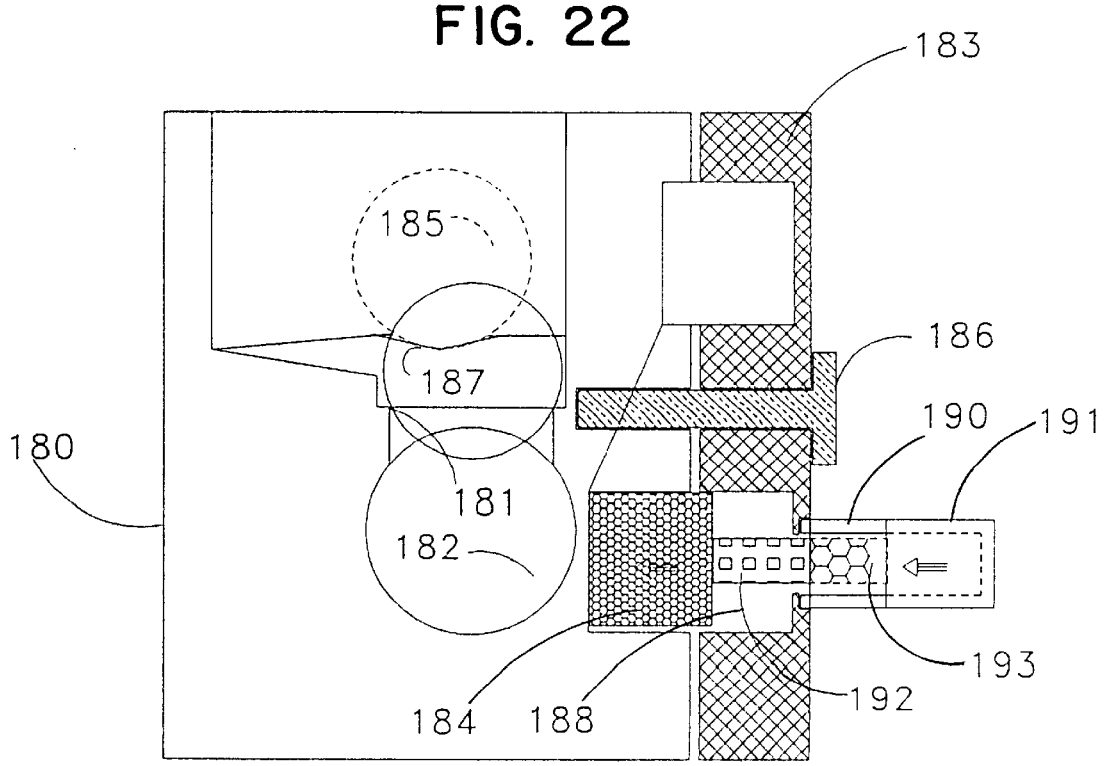
FIG. 22 shows the ninth embodiment in an activated state.
Figure 23:
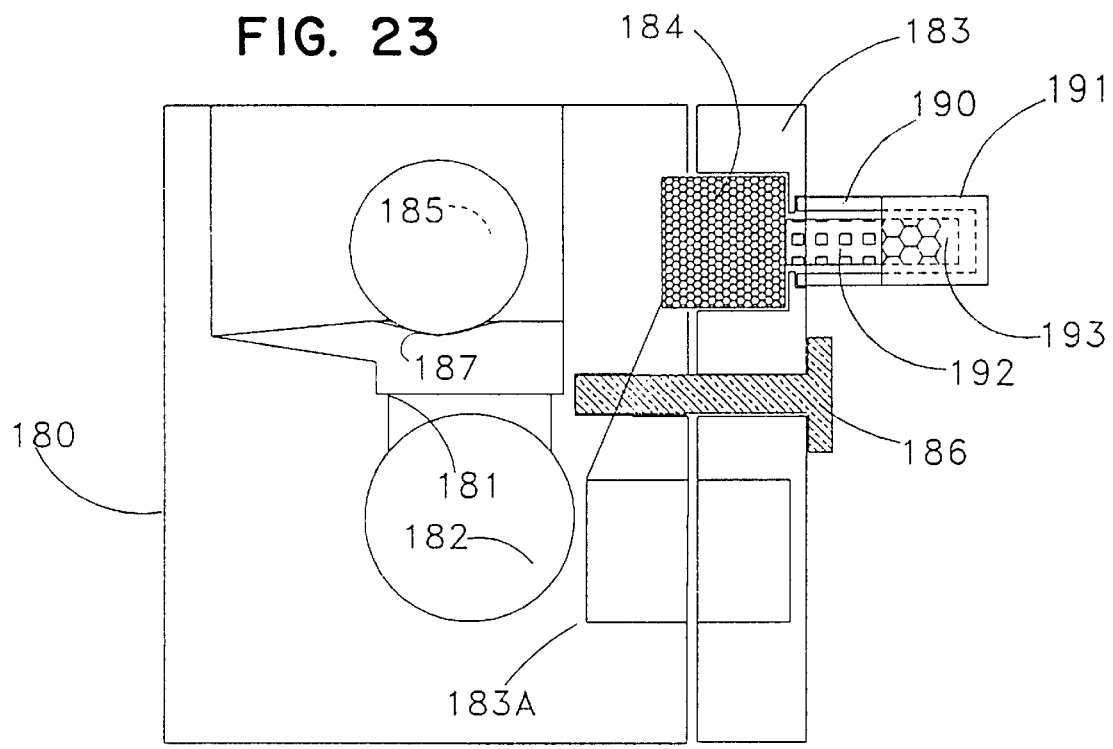
FIG. 23 demonstrates resetting of the valve of the ninth embodiment.
Figure 24:
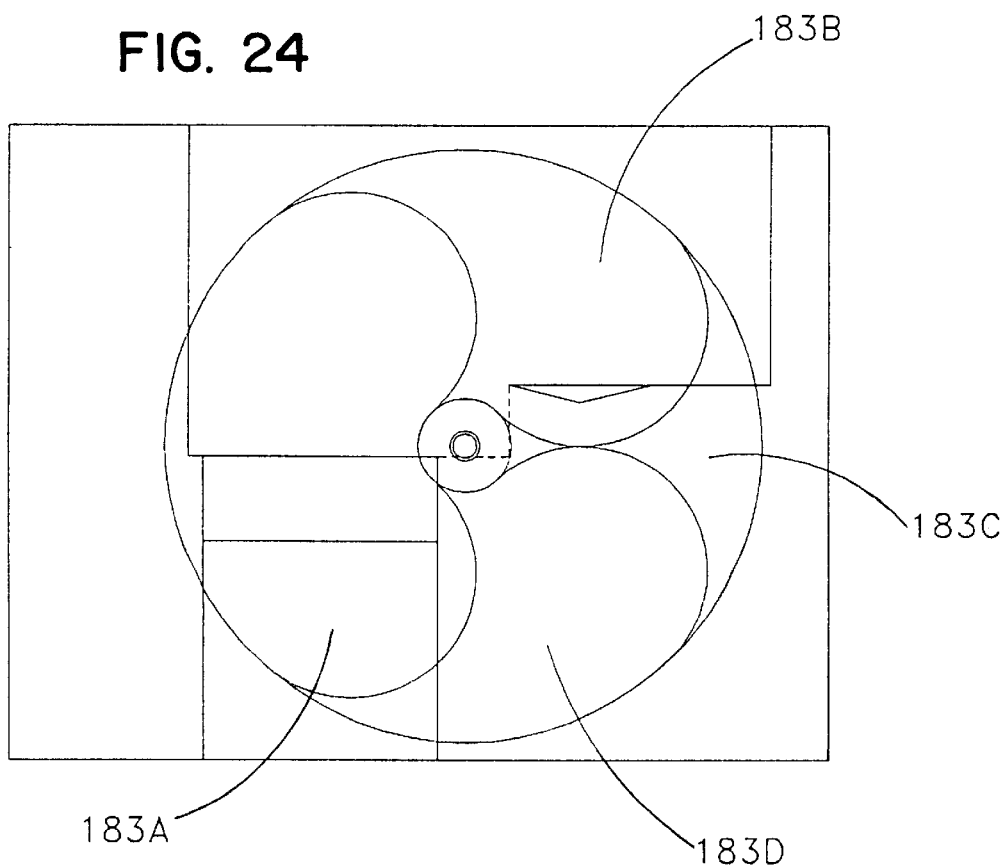
FIG. 24 is a front view of a ninth embodiment with a rotary handle removed to demonstrate a cam surface for a permanent magnet.

FIGS. 21–24 illustrate another embodiment of the present invention. This embodiment employs a valve 180 having a housing and seismic activation similar to the embodiments described above. The body of the valve 180 includes a valve member support or pedestal 187 supporting the ball valve member at a position 185 as shown in FIG. 21. Reference No. 181 illustrates the valve seat. A rotary member 183 forms a handle for activating and/or resetting the valve. It is pivoted about a shaft 186 mounted to the valve body. In the valve body is formed a variable-depth cam-type raceway 183A–D, as illustrated in FIG. 24. As can be appreciated from comparing FIG. 24 with the other figures, a permanent magnet 184 is mounted in a cavity 188 in the handle 183. The cavity 188 holds the permanent magnet at a particular position in the rotary handle 183. Rotation of the rotary handle 183 causes the permanent magnet 184 to move along the path defined by surface contours 183A–D as shown in FIG. 24. The moving magnet depth allows a smaller distance from the valve seat off-position and pedestal on-position, as can be seen from the figure, and accordingly allows a smaller valve design, plus also incorporates the visual valve position indicator.

A rod is connected to the permanent magnet 184. A portion 192 of the rod is colored green, for example, and a portion 193 of the rod is colored red. A housing for the rod is comprised of a transparent section 190 through which the rod portions 192 or 193 can be seen, and an opaque portion 191. Operation of this embodiment will now be explained.

From the position of FIG. 21, the magnet 184 is recessed into the rotary handle 183. This causes the green portion 192 to be visible. Thus, the green portion that is visible indicates an on condition of the valve, as the valve member remains on the pedestal 187. Upon the valve being activated for one reason or another, the valve member falls to the position 182 to close the valve by resting in the valve seat 181. In this condition, the valve member, which is made of a magnetic material, is brought closer to the magnet 184. This causes the valve member and the magnet to be mutually attracted. As such, the magnet 184 is attracted to the valve member resting on the seat 181, and is caused to shift from the recess or cavity 188 to the position closest to the valve member, as shown in FIG. 22. This causes the connected rod to shift along with the magnet 184, so that the red portion is now exposed at the transparent section 190.

By the above operation, the magnet has been attracted to the magnetic valve member. In the position shown in FIG. 22, the magnet 184 helps to hold the ball forming the valve member on the seat 181, providing a closure force in addition to gravity. At the same time, there is a visible indication that the valve is now closed by the positioning of the red portion 193 at the transparent section 190.

In order to reset the valve, the rotary handle 183 is rotated in the clockwise direction (in the arrangement of the valve as illustrated), so that the magnet 184, attracting the valve member, picks the valve member up off of the seat 181 and moves it toward the pedestal 187. The resetting position is shown in FIG. 23.

By moving the magnet 184 to the position shown in FIG. 23 with the rotary handle 183, two things are accomplished. First, the magnet is pushed back from the valve member to allow the valve member to be released from the force of the magnet so that it can be reset on the pedestal 187. Second, the magnet 184 is pushed back to move the green section 192 to the transparent section 190 so as to indicate an on position of the valve.

Subsequently, the rotary handle 183 is further rotated to move the magnet 184 back to the position of FIG. 21.

The position indicated by the rod having colored sections 192 and 193 can also be remotely sensed by a magnetic sensing device, such as a Hall-effect device, a magnetic reed switch, etc., which would be located in the body of the valve 180 near section 183A, for example. Note that this version of the design could be employed with the embodiment discussed with respect to FIGS. 5 and 6.

Figure 25A:
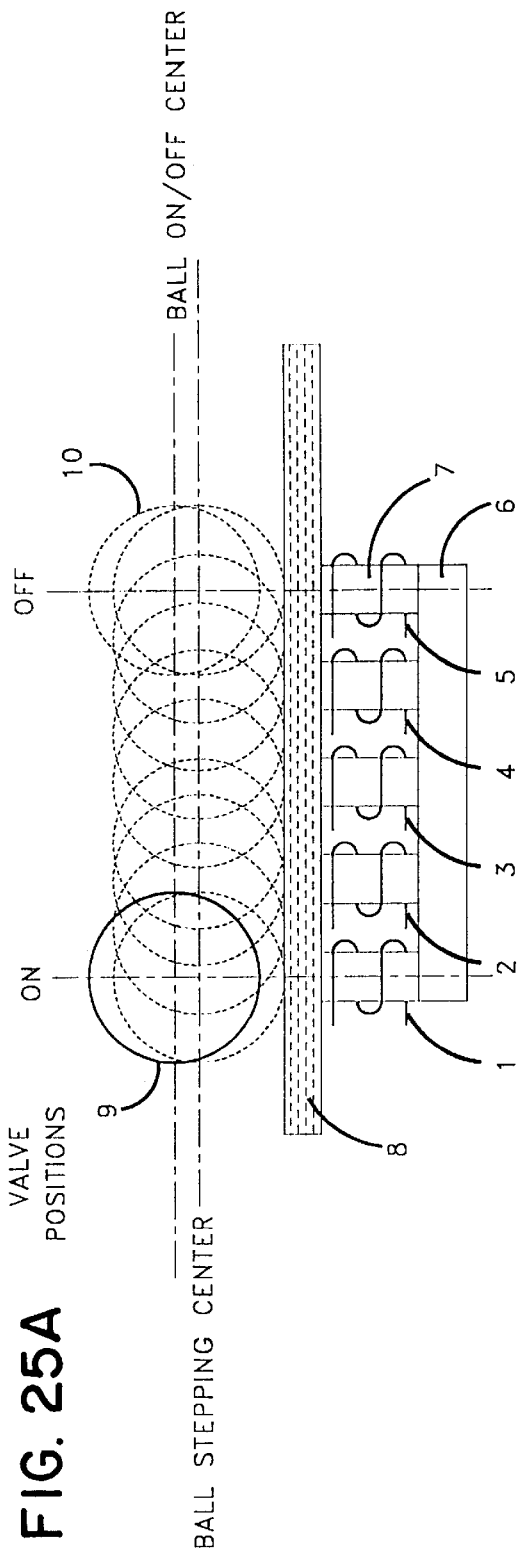
FIG. 25A is a schematic view of a solenoid segmented core.
Figure 25B:
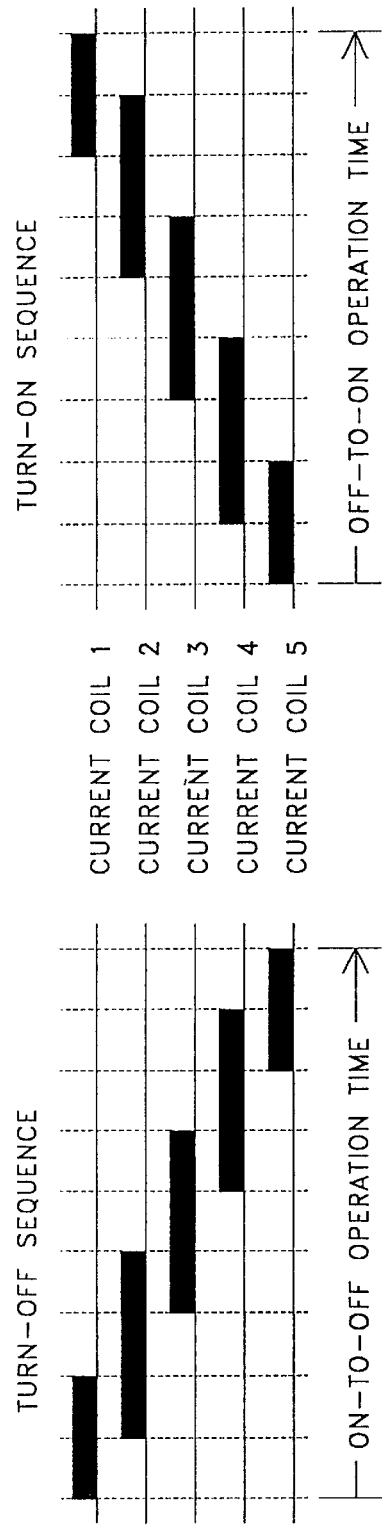
FIG. 25B is a valve position sequence step controlled timing diagram for the solenoid segmented core.
Figure 26:
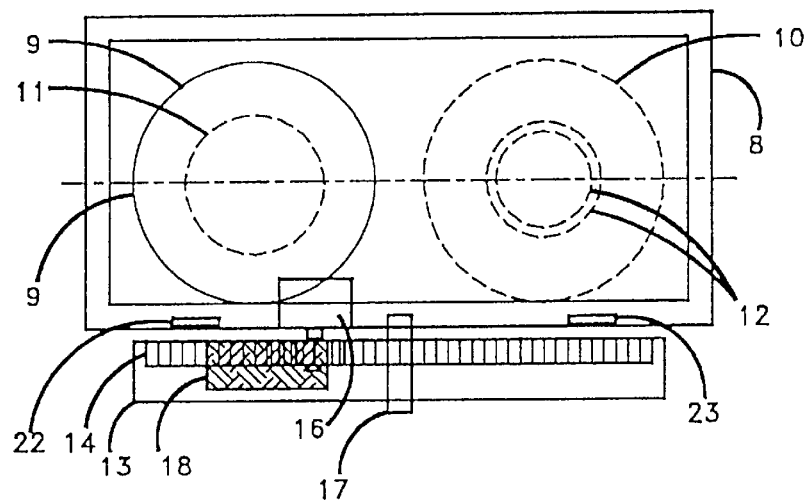
FIGS. 26–29 demonstrate a tenth embodiment according to the present invention, with FIGS. 26 and 28 showing the valve from a top view in on and off positions, and FIGS. 27 and 29 showing the valve from the side in on and off positions, respectively.

FIGS. 25A and 25B illustrate an example of another type of electromagnet that can be used with the valve according to the present invention as reflected by the above discussed embodiments, and further embodiments discussed below. In FIGS. 25A and 25B, an electromagnetic arrangement is formed by a series of coils 1–5, thus providing an electromagnetic arrangement that is capable of both actuating and resetting the valve member 9 illustrated in the figures. Referring to FIG. 25A, the valve housing 8 is shown relative to the valve member 9. The valve member 9 is shown in solid lines at its on position, and by dotted lines through its transition positions and an off position. The valve member 9 can be moved by sequential pulsing of the coils 1–5.

Each solenoid coil of coils 1–5 has a magnetic core material 7 that improves its flux strength and shape. An interconnecting magnetic core 6 is optional, but provides mutual coupling and improves the magnetic flux shaping and strength.

FIG. 25B shows sequence samples for electromagnetic pulses for current coils 1–5 for both actuating and resetting a valve. The coils are sequentially driven with a pulse current. The pulse current can be overlapped at the respective coils, or not overlapped. The advantage of this kind of electromagnetic arrangement is that the valve member can be moved over a long distance and through non-linear paths and multiple axes. Furthermore, low intermittent power sources, similar to a linear or stepping motor, can be used, with electromagnetic coupling from the valve for intrinsic safety isolation from hazardous conditions.

FIGS. 26–29 show another example of an electromagnetically controlled shut-off valve according to the present invention. In this embodiment, the housing is designated by reference number 8, and the valve member by reference number 9. As can be seen from FIG. 26, the valve member support is shown as 11, and the valve seat is shown as 12. In this case, they are illustrated at substantially the same horizontal level, as can be seen from FIGS. 27 and 29. Also in this case, a gas inlet 20 is shown at the top, while the gas outlet 21 is shown at the bottom.

A rotary handle 13 controls the positioning of a permanent magnet 18 by being capable of rotating in either direction about the center shaft 17. The magnet 18 can thus magnetically couple with the valve member 9 (made of a magnetic material) through the housing 8. Thus, the position of the valve member 9 can be controlled between an on position and an off position by moving the magnet 18 by rotation of the rotary handle 13. Thus, control of the position of the valve member 9 is isolated and thus intrinsically safe.

An electromagnetic motor illustrated at 16 drives a gear 15, which consequently drives a circular gear train 14 mounted on the rotary handle 13. Alternatively, a solenoid driven ratchet gear, such as those used with electronic clocks, could be used as well. Magnetic sensing positioning limiting switches 22 and 23 are provided adjacent to the on and off positions, respectively. These switches can allow for remote control from a remote power source for the electromagnetic motor 16 or solenoid ratchet in the rotation direction. They also provide remote valve position information. The sensors 22 and 23 can sense the position of the magnet 18 with magnetic mechanical limit-type switches, hall-effect sensors, or they could be capacitive or optical, using a position mark on the handle 13, etc.

Figure 27:
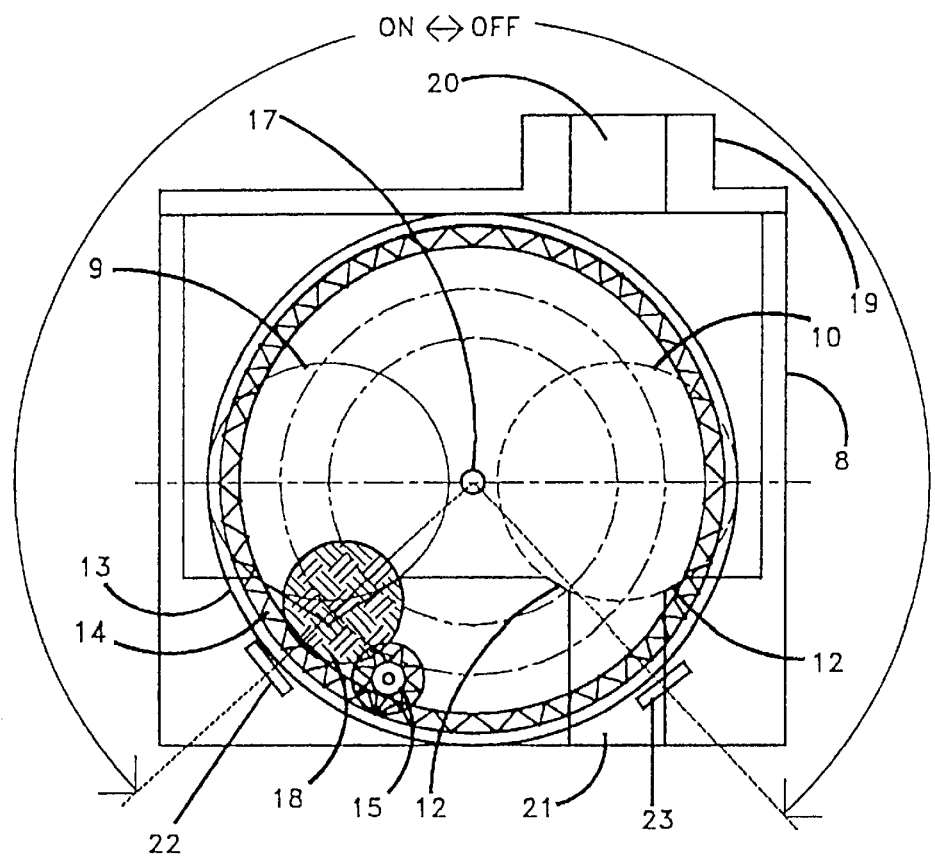
Figure 28:
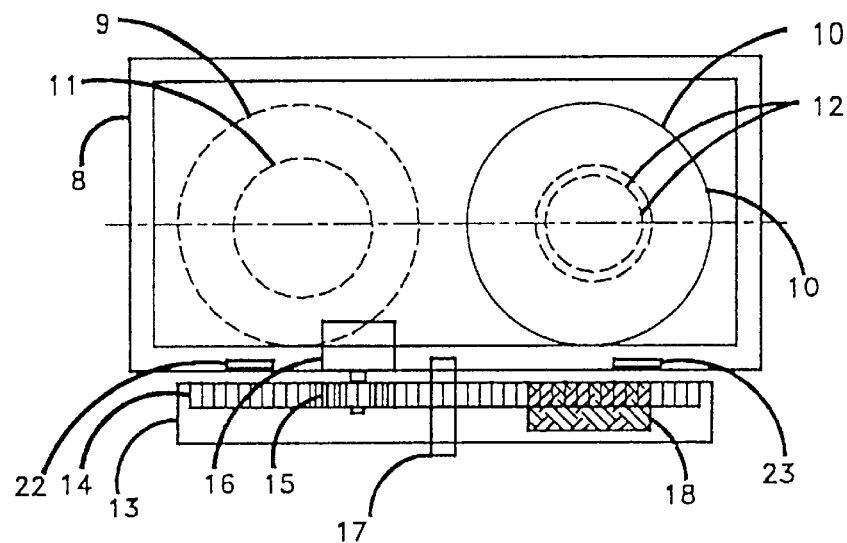
Figure 29:
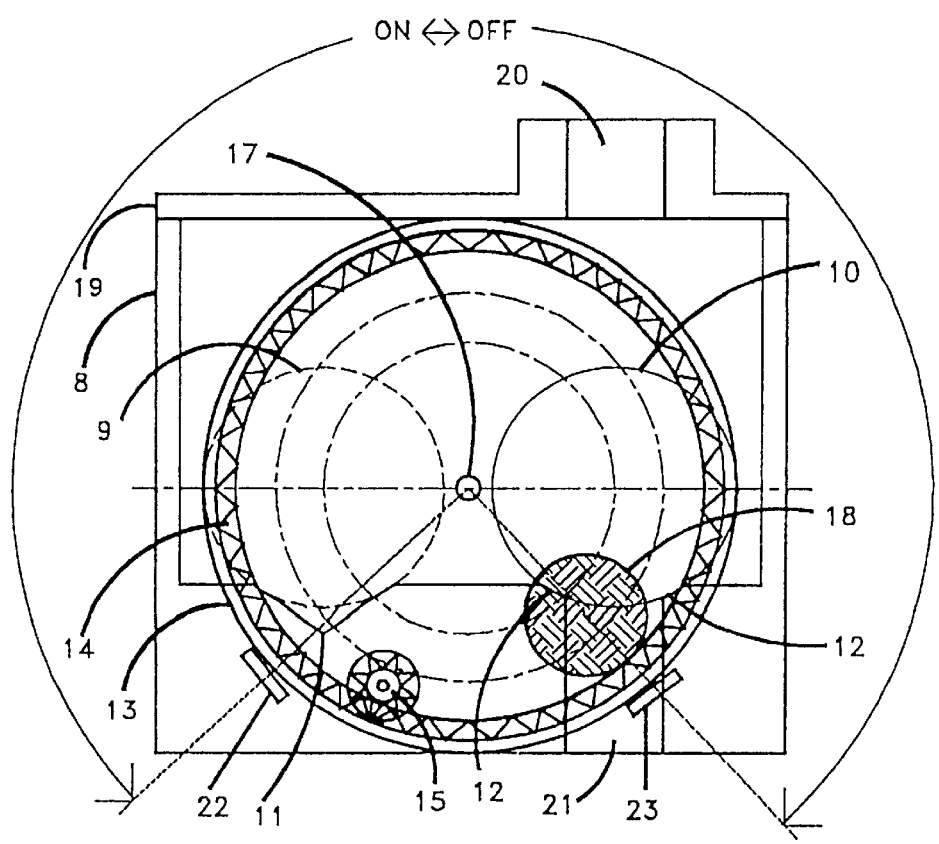

With the arrangement as demonstrated by FIGS. 26–29, the position of the valve member 9 can be changed by appropriate rotation of the handle 13 between the on and off positions. The gas or fluid flows through the inlet 20 in an optional top cover 19 (which is not needed if the housing as a whole is cast), and flows out of the outlet 21 when the valve is in the off position. In the on position, the magnet 18 serves to hold the valve member 9 on the valve member support 11. When the valve member 9 is moved to the off position, magnet 18 is moved by rotation of the handle 15 to the position as shown in FIGS. 27 and 29. In this position, the magnet 18 further serves to hold the valve member 9 on the valve seat 12.

Figure 30:
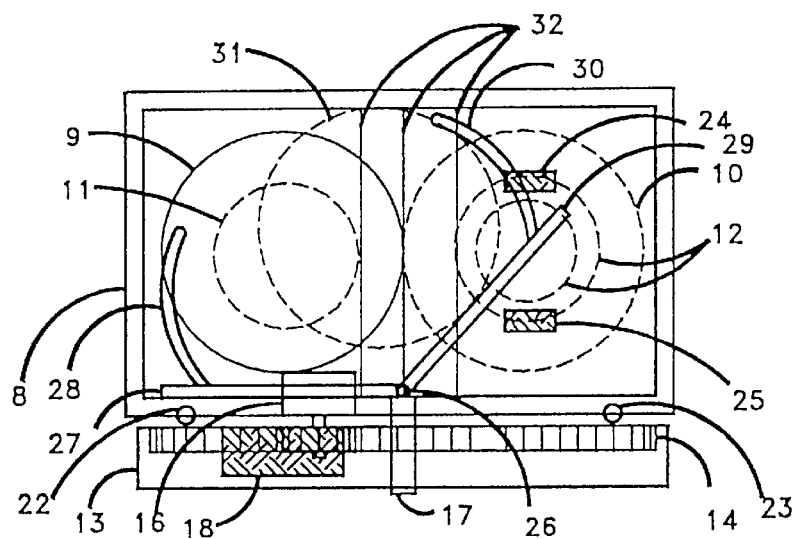
FIGS. 30–33 illustrate an eleventh embodiment according to the present invention, with FIGS. 30 and 32 comprising top views showing on and off positions of the valve, respectively, and FIGS. 31 and 33 comprising side views showing the on and off positions, respectively.
Figure 31:
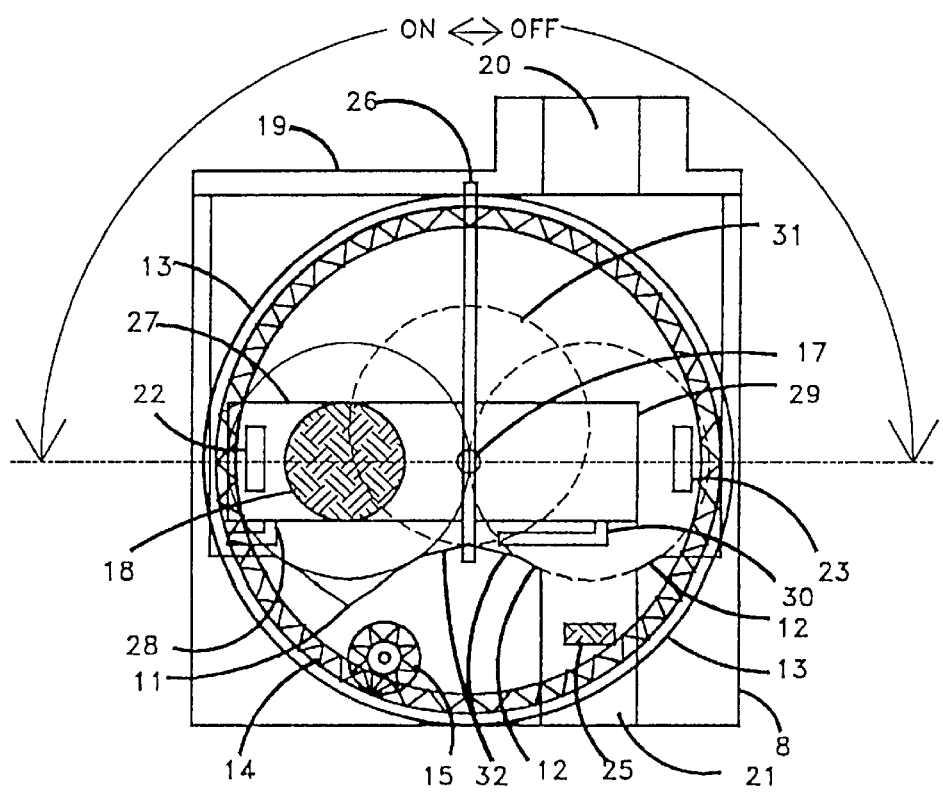
Figure 32:
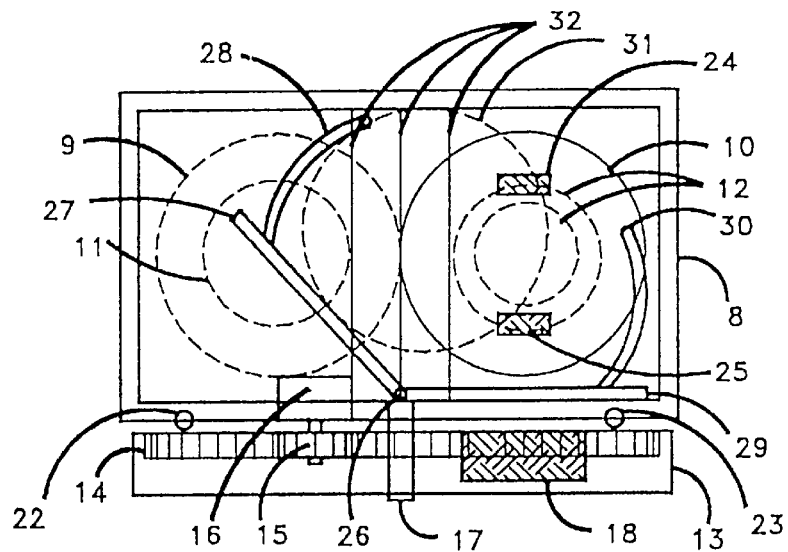
Figure 33:
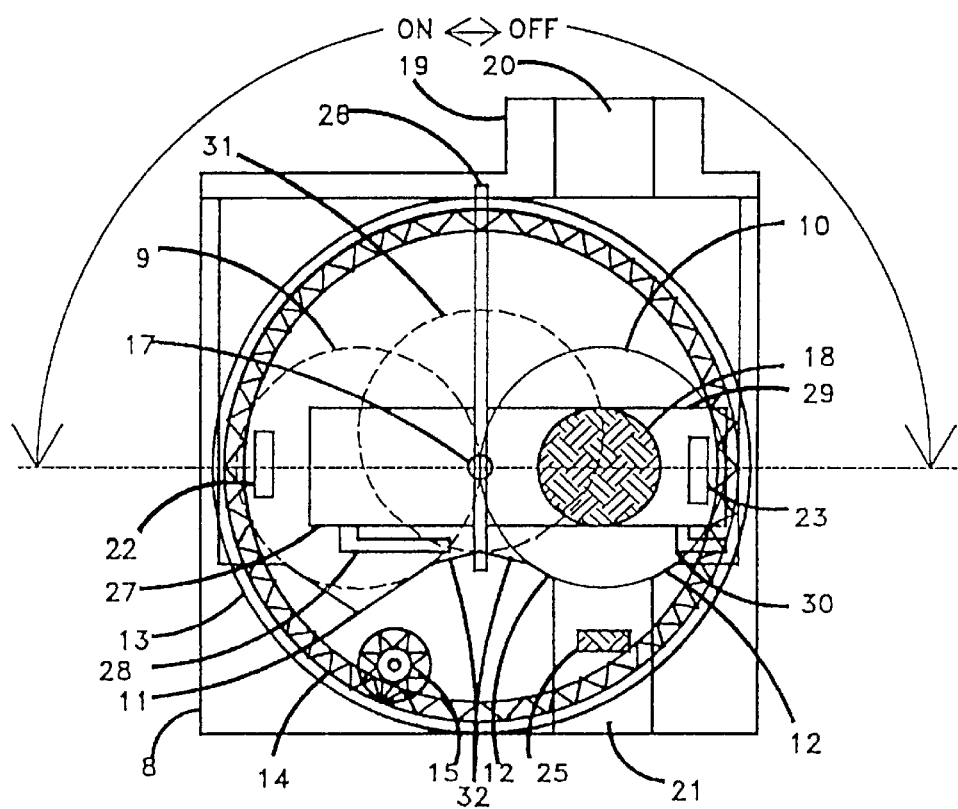
Figure 34:
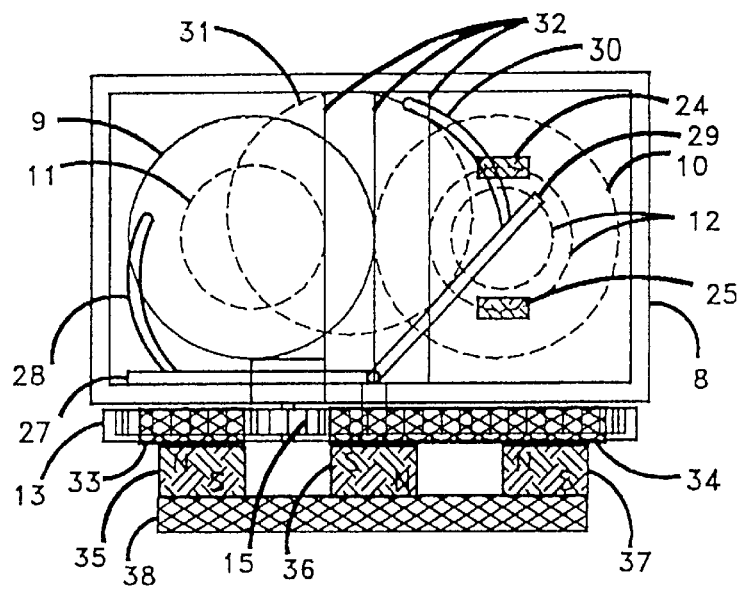
FIGS. 34–37 illustrate a twelfth embodiment according to the present invention, with FIGS. 34 and 36 representing top views showing on and off positions of the valve, and FIGS. 35 and 37 representing front view showing on and off positions of the valve, respectively.
Figure 35:
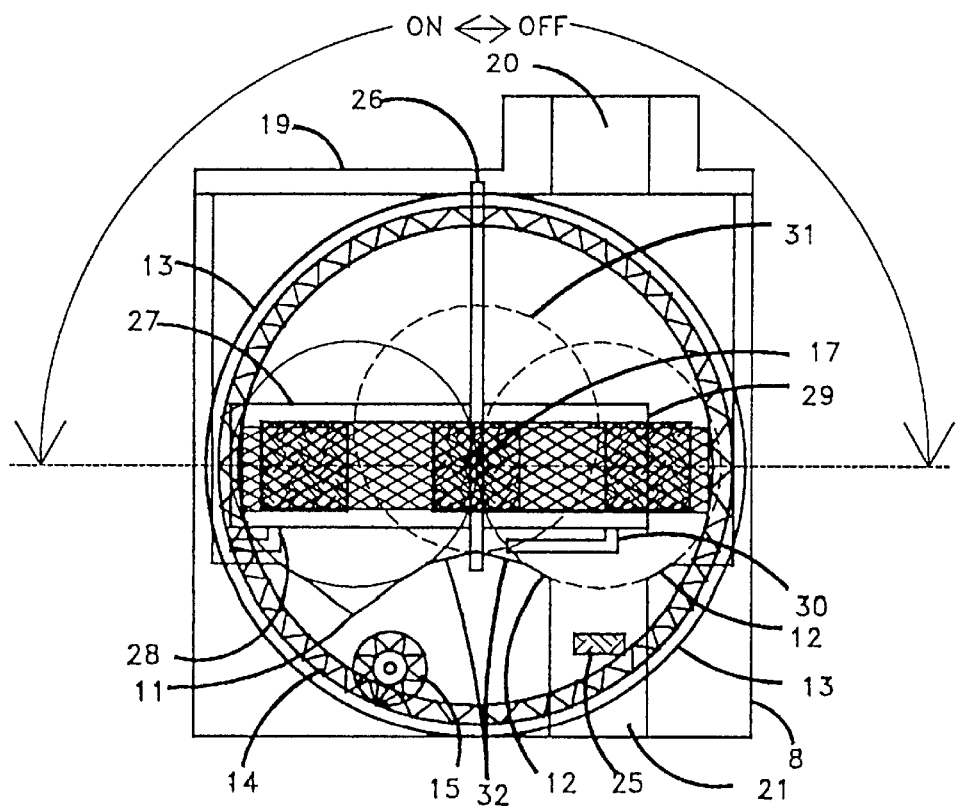
Figure 36:
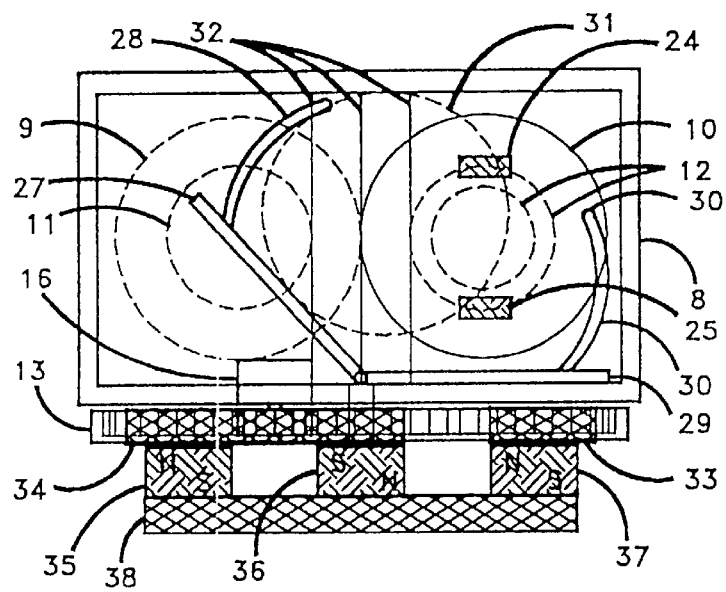
Figure 37:
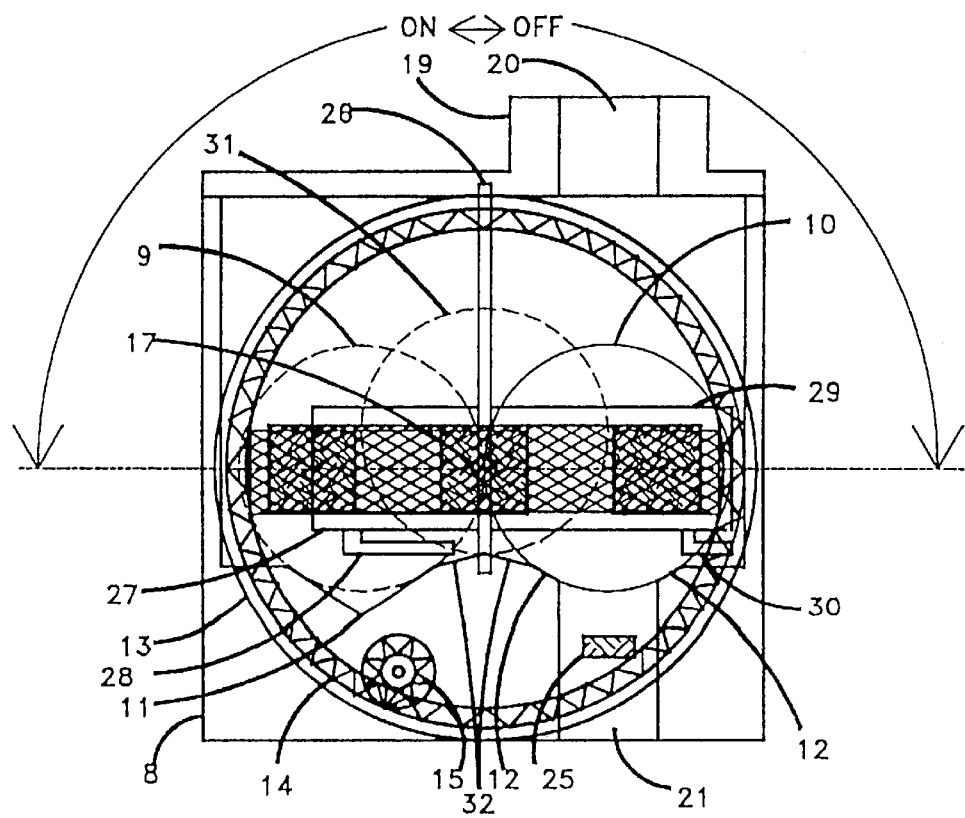

FIGS. 30—33 show a modification of the on and off control illustrated in FIGS. 26–29. These figures show a similar electromagnetic motor 16 having a gear 15. Similarly to the above-described embodiments, an alternative could be a solenoid driven ratchet gear. A circular gear train 14 is provided in the rotary handle 13, which mounts the permanent magnet 18 for bidirectional rotation above the center shaft 17. Thus, similar to the above embodiment, magnet 18 is rotatable between an on position as shown in FIGS. 30 and 31, and an off position as shown in FIGS. 32 and 33.

An on flapper 27 and off flapper 29 are connected with a shaft 26 that is supported for pivotal motion between the respective positions illustrated in FIGS. 30 and 32. Arms 28 and 30 are connected to the respective flappers 27 and 29. The spherical valve member 29 is thus moved between the on and off positions by actuation of the flappers 27 and 29 through the positioning of the magnet 18. That is, with the flappers being made of a magnetic material, the magnet 18 can attract the respective flappers 27 and 29. By so attracting, for example, the flapper 27 toward the position of the magnet 18 as shown in FIG. 30, the valve member 9 is forcibly repositioned from the valve seat 12 so to arrive at the valve member support 11. This is due to the lifting and pushing action of the arm 30 attached to the flapper 29.

Holding magnets 24 and 25 can be used to hold the valve member 9 in the off position, thus creating uniform seat pressure. Magnetic sensing limiting switches 22 and 23 control the motor used to reposition the magnet through a remote control power source for controlling both the power and direction of the motor. A so-called valve floor 32 is beveled between the valve seat 12 and the valve member support 11 so as to aid the valve member 9 in changing positions by creating overcenter momentum, also keeping it from bouncing out of position during the process of switching positions or from vibration and shock.

In the further embodiment shown in FIGS. 34–37, the internal structure of the valve, including the housing, valve member support 11, valve seat 12, and flapper design are similar to those for the embodiment described in FIGS. 30–33. The rotary handle 13 with its circular gear train 14 is also similar, and can still use either a motor or solenoid ratchet driving the rotary gear train. The difference in this case comes from the nature of the moving magnet.

In this case the single permanent magnet 18 is replaced by three stationary permanent magnets 35, 36, and 37, which may be coupled with a pole piece 38 for mutual flux coupling. As can be seen from the alternate on and off positions of FIGS. 34 and 36, the magnets 35, 36, and 37 do not change position between the on and off positions and are not rotated by the rotary handle 13. Rather, a magnetic shunt 34 and magnetic core coupling 33 are mounted on the rotary handle 13 for bidirectional rotation about the center shaft 17. Accordingly, they will be magnetically coupled or decoupled by the stationary permanent magnets 35, 36, and 37. That is, in FIG. 34, the magnetic core coupling 33 is located at the left, or on position, while the magnetic shunt 34 is located at the right, or off position. These positions are reversed in FIG. 36. Thus, it will be seen that a flapper will be attracted toward the magnetic core coupling 33 for movement of the valve member 9. Similar to the above embodiments, magnetic coupling takes place through the valve housing 8 for isolated and intrinsically safe on and off control of the magnetic flapper 27 and 29.

FIGS. 38–41 illustrate a significantly different arrangement. However, there are some features in common with the above-described embodiments. Initially, the housing 8 has a lid 19 having an inlet 10 and outlet 21. The valve member support and the valve seat, as well as the floor of the valve housing, are similar to those described in the immediately preceding embodiments.

Figure 38:
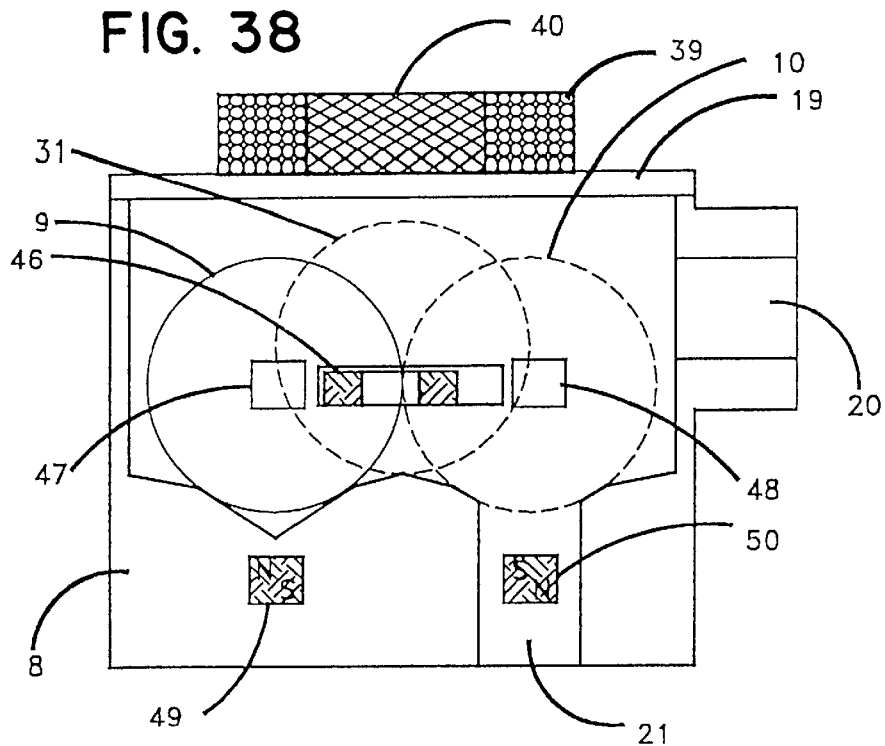
FIGS. 38–41 illustrate a thirteenth embodiment according to the present invention, with FIG. 38 showing an initial embodiment of an electromagnetic on/off control, and with FIGS. 39–41 illustrating variations thereof.

The valve according to this embodiment provides electromagnetic on and off control, as well as position sensors. An electromagnetic solenoid coil 39 has a magnetic core 40 that can be switched on and off with a current pulse. The current pulse will thus alternately move the magnetic ball valve from the on position of the valve member 9 as shown in FIG. 38 to the off position 10 as shown by dashed lines in FIG. 38. The movement of the valve member 9 through intermediate positions such as are shown by reference number 31 is assisted by momentum from the magnetic pulse, and the valve velocity helps to carry it over the intermediate barrier so as to maintain the new position of the valve member without bouncing back. The current pulse that is applied to the electromagnetic solenoid coil 39 is of an amplitude and time set so that the valve mass and inertia can be overcome so as to jump the barrier in either direction of movement and still not bounce back.

Figure 39:
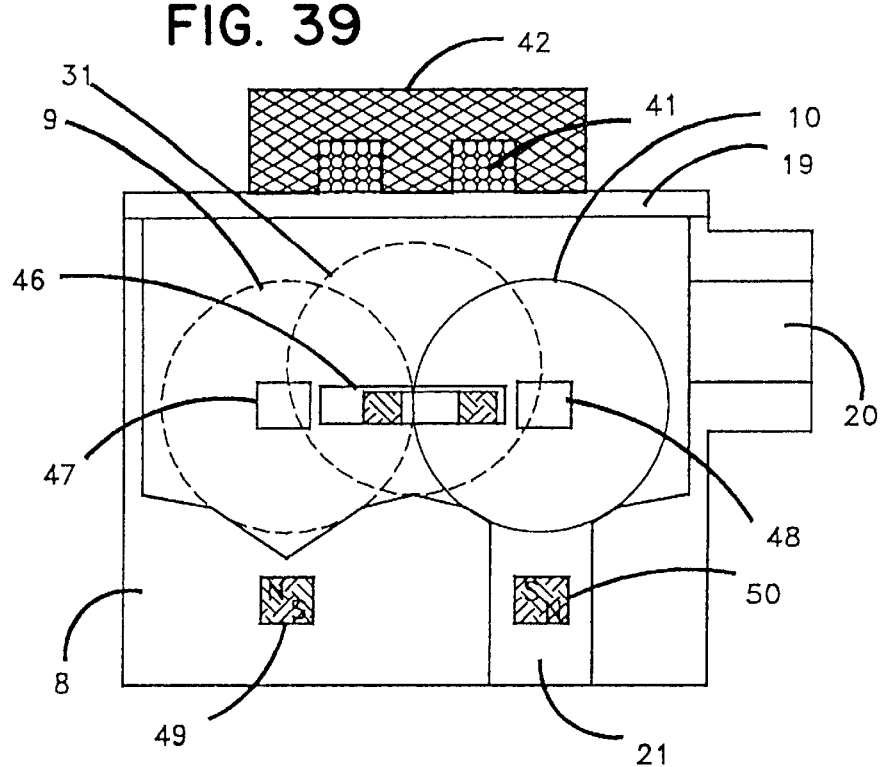

The valve member 9, a magnetic ball, is shown in FIG. 39 as being held in the off position 10 with a holding magnet 50. Or, the valve member 9 can be held in the on position with a holding magnet 49.

A sliding magnet position indicator 46 has a magnet on each end of a shaft or wand. Indicator 46 is located in a transparent cylindrical enclosure that has low friction so as to allow for easy sliding of the indicator 46. This allows the indicator 46 to be attracted to the magnetic ball material so that the position of the valve can be visually determined from outside of the valve.

Figure 40:
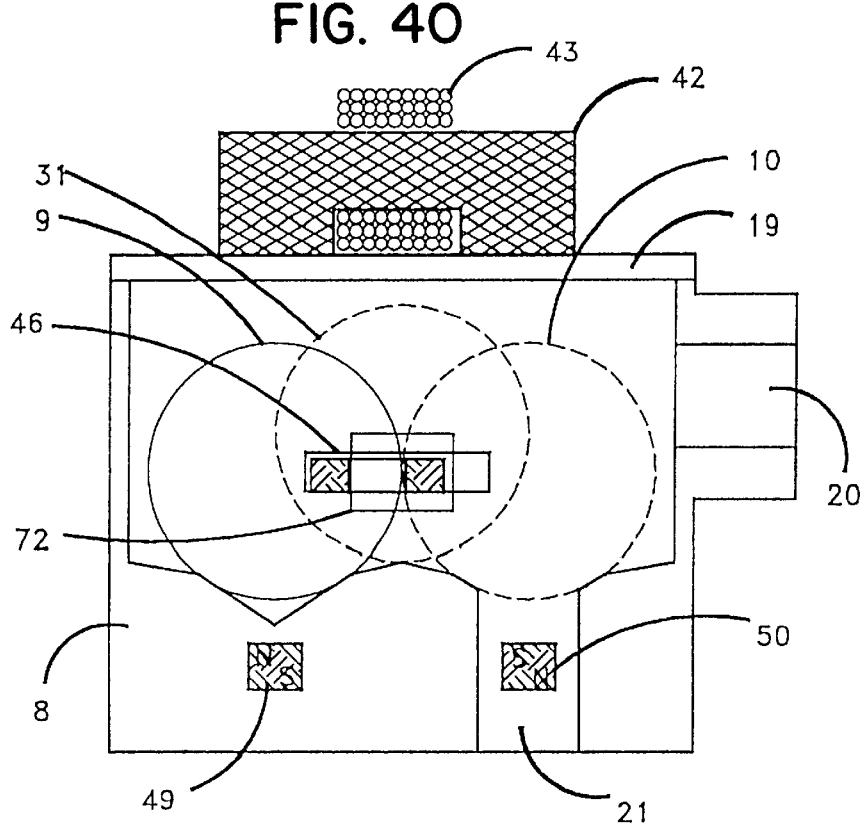
Figure 41:
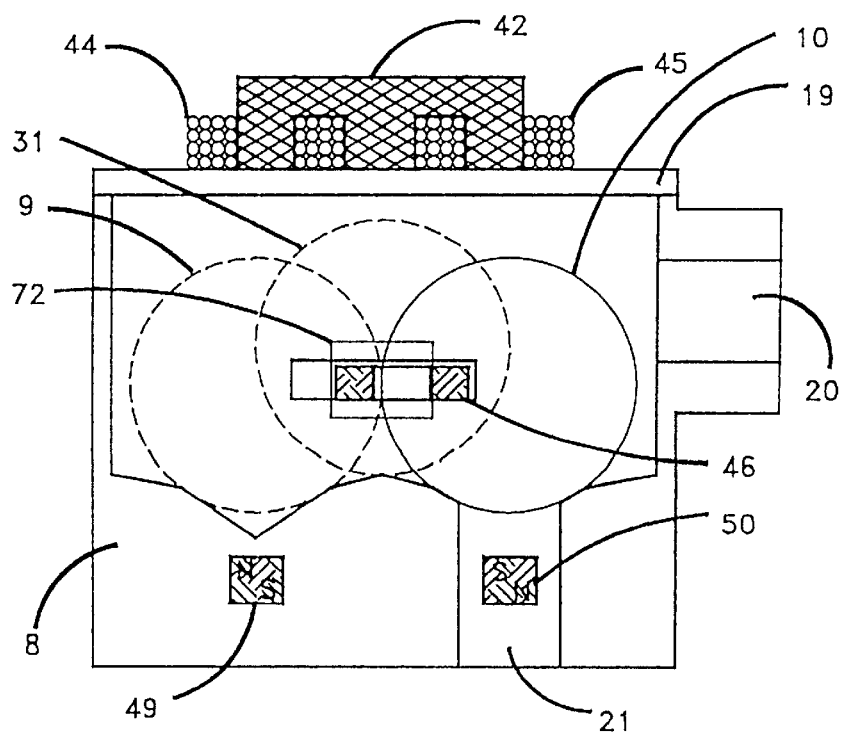

Magnetic sensors 47 and 48 are used to identify the position of the valve member 9 and are connected with a remote control system. The magnetic sensors 47 and 48 can use magnetic reed switches or hall-effect devices. An LVDT 72 can also be used around the indicator 46, as shown in FIGS. 40 and 41, in place of the magnetic sensors 47 and 48. The LVDT 72 thus provides a remote position indicator that can send a signal to an indicator or control system.

An electromagnetic solenoid coil 39 having a magnetic core 40 is shown in FIG. 38. FIGS. 39, 40, and 41 show other magnetic single coil solenoid designs 41, 43, 44, and 45. These are used together with other core designs, such as a pot core, a C-core, or an E-core. Designs 44 and 45 are multi-coil designs. Each of the designs can have a current pulse applied thereto that can alternately move the magnetic ball valve from the on position to the off position, and vice versa. Thus, the electromagnetic solenoid coils can include single or multiple coils for electromagnetic pulse control. This allows the use of relatively low power, average and peak, alternate position changes with single polarity (unipolar) current pulses. It should be further noted that the valve seating pressure can be adjustable by moving the position, location, and strength of the permanent magnets.

With reference to FIGS. 30–33, in this arrangement one or a plurality of magnets such as 24 and 25 having shapes and positions to provide equal force on the valve when seated can maintain an even and continuous pressure during vibration and various pressure differentials.

Figure 42:
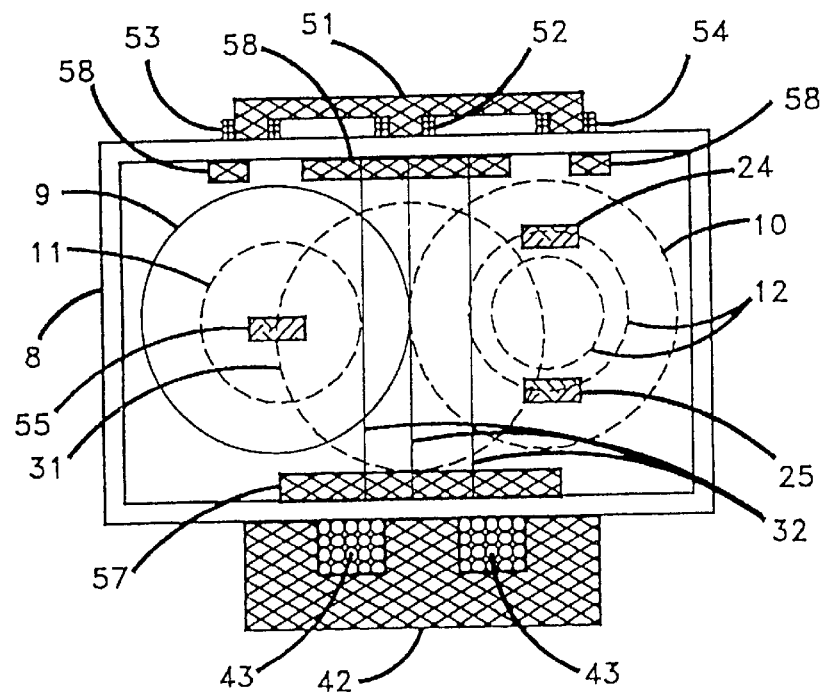
FIGS. 42–44 illustrate a fourteenth embodiment according to the present invention, including a top, front and end view, respectively.
Figure 43:
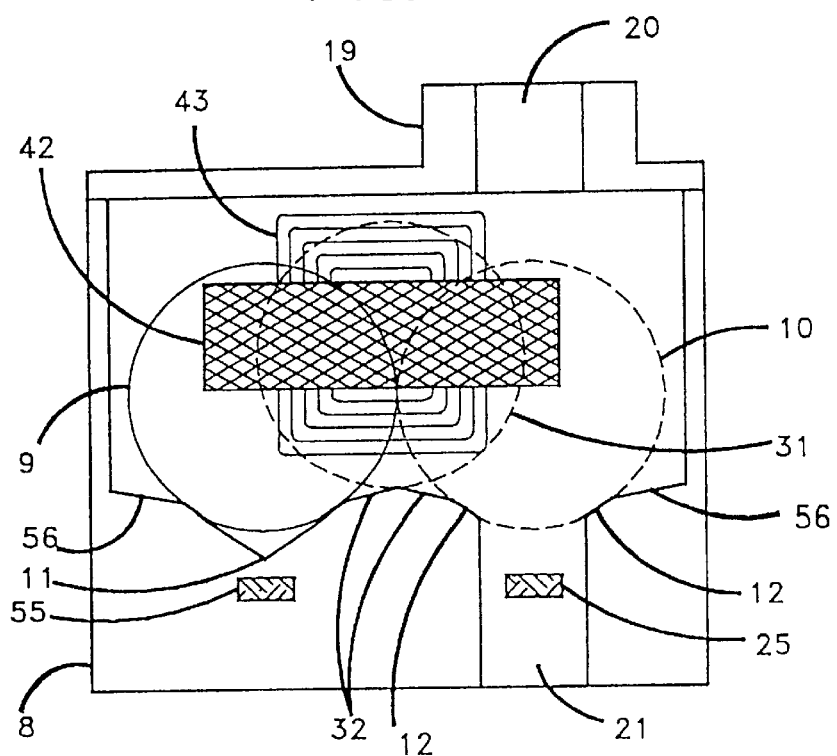
Figure 44:
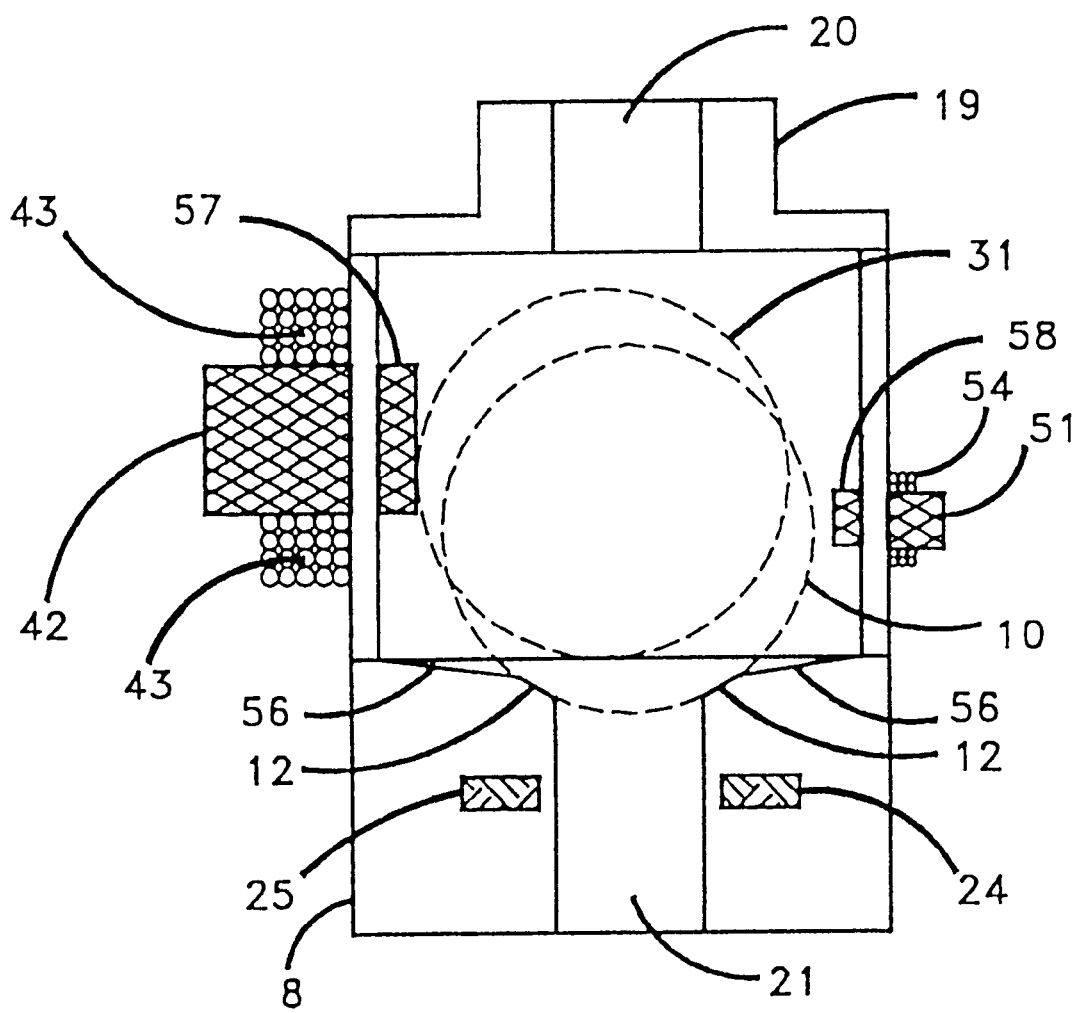

FIGS. 42–44 show a further embodiment according to the present invention. Here the housing 8 includes a lid 19 having an inlet 20, with the outlet being shown at 21. The valve member 9 is shown in solid lines in FIGS. 42 and 43 in its on position, and by reference number 10 in its off position. An intermediate position 31 is also illustrated. The valve member support 11, valve seat 12, and floor 32 of the housing 8 are similar to the embodiments that have been described immediately beforehand.

The difference in this valve is how the electromagnetic on and off control is achieved. In this case, control is achieved with a flux extender or split cores. The electromagnetic solenoid coil 43 is shown with a magnetic core 42, which can be used to switch the valve on and off with the current pulse for alternate movement of the magnetic ball forming the valve member 9 between the on and off positions, similar to the immediately preceding embodiment. Here, however, a magnetic extension 57 of the core 42 is added on the internal side of the housing 8. The extension 57 forms a flux extender or core extender that shapes and concentrates the magnetic energy flux. This provides a higher flux density for moving the ball with a given current amplitude, resulting in an improved efficiency and lower peak or average power from the remote power source.

Another feature of this embodiment is the unique valve remote position indicator. The indicator is provided with magnetic coupling in isolation on the inside of the valve housing 8, operating like an LVDT. A common magnetic core 51 has a bias winding 52 and sensing winding 53 and 54, used to determine the position of the magnetic ball forming the ball member 9 in proximity to either one coil 52 or the other coil 53. Core extensions 58 are provided on the inside of the valve housing 8 at strategic locations so as to shape the flux fields coupled by the coil 54 and the core 51. This improves the sensitivity to the proximity of the magnetic valve ball in either the on position or the off position.

Figure 45:
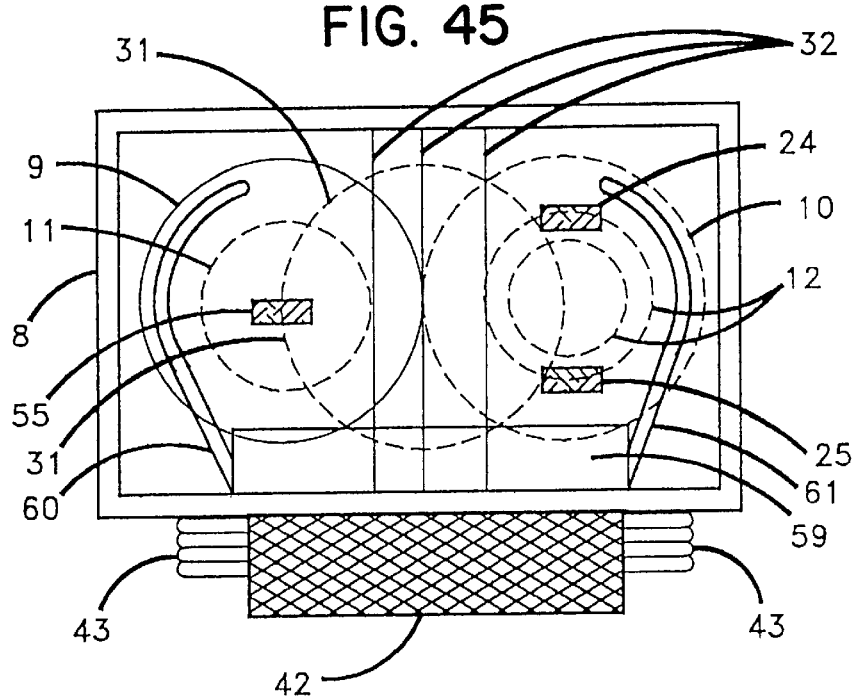
FIGS. 45–47 represent a fifteenth embodiment according to the valve of the present invention, including a top, front and end view of the valve, respectively.
Figure 46:
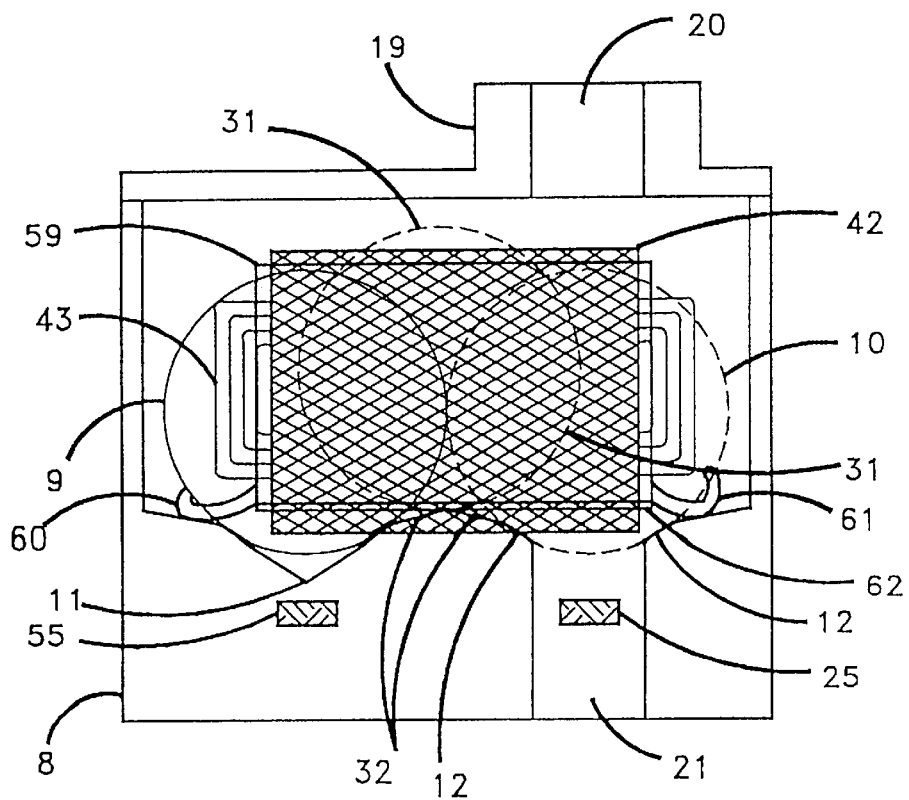
Figure 47:
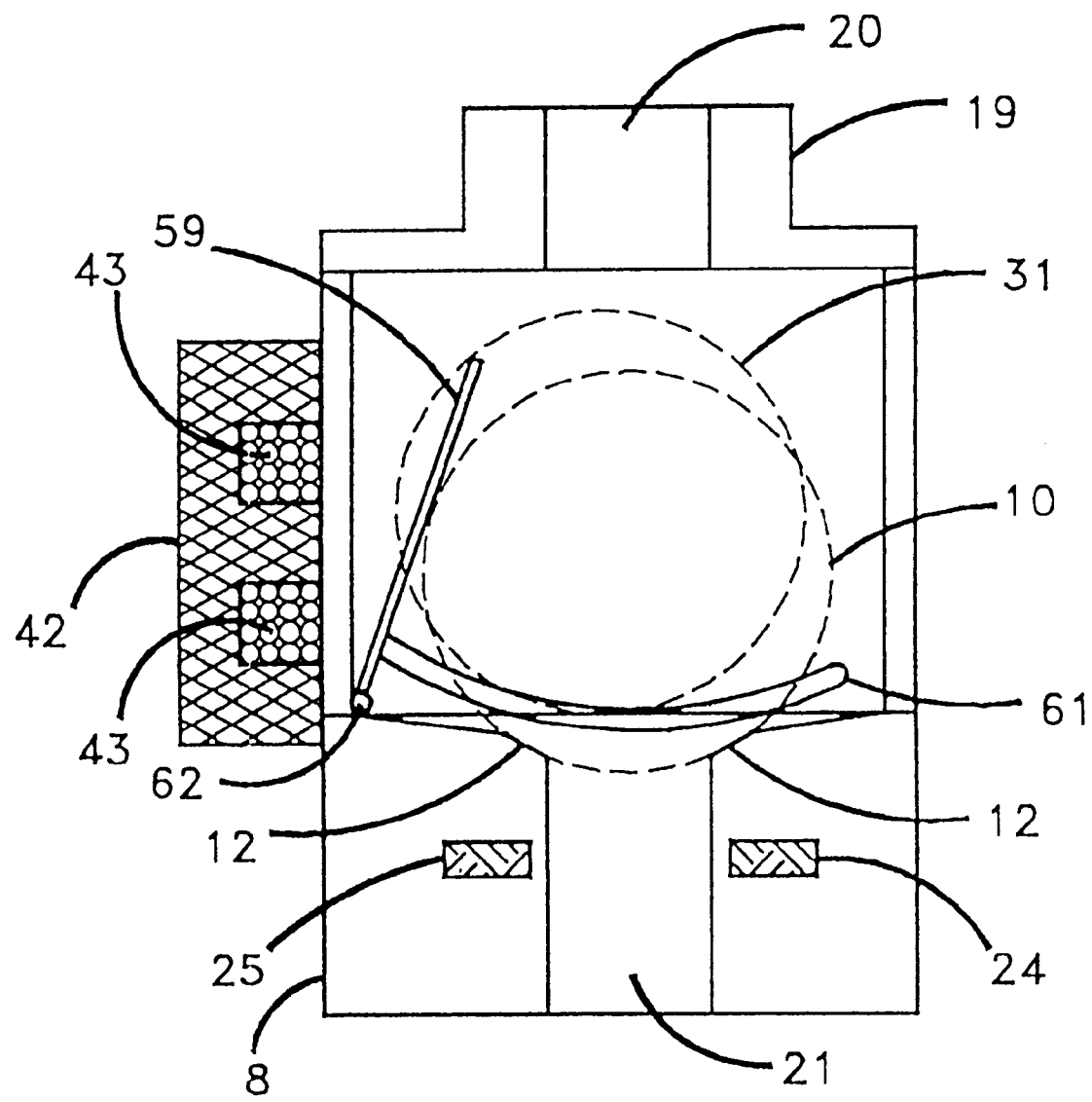

In the further embodiment illustrated in the FIGS. 45–47, the housing 8, lid 19, inlet 20 and outlet 21 are similar to the preceding embodiments. Also, the valve member support 11, valve seat 12 and intermediate portions 32 forming the floor of the housing 8 are also similar. Also similar to the immediately preceding embodiment, magnets 24, 25, and 55 are used to hold the magnetic ball forming the valve member 9 in its off and on positions, respectively.

In this embodiment, however, a slightly different kind of flapper valve control is provided. An electromagnetic solenoid coil 43 has a magnetic core 42, and can be switched on and off with the current pulse to operate a plate-shaped magnetic flapper 59. The magnetic flapper 59 is pivotal via a hinge or bearing pin 62 so as to pivotal about a horizontal axis in a vertical plane. Valve control arms 60 and 61 are connected to the flapper 59 at opposite ends thereof. The arms 60 and 61 are preferably curved as illustrated, and are used to flip the ball forming the valve member 9 between its on and off positions across the barrier 32 and through an intermediate position illustrated at position 31. Initial actuation will cause the ball to leave the valve member support 11 or valve seat 12, and momentum will carry the ball to the opposite position across the barrier 32. Various position indicators and positions sensors for remote control can be used with this embodiment, as with the previous described embodiments.

Figure 48:
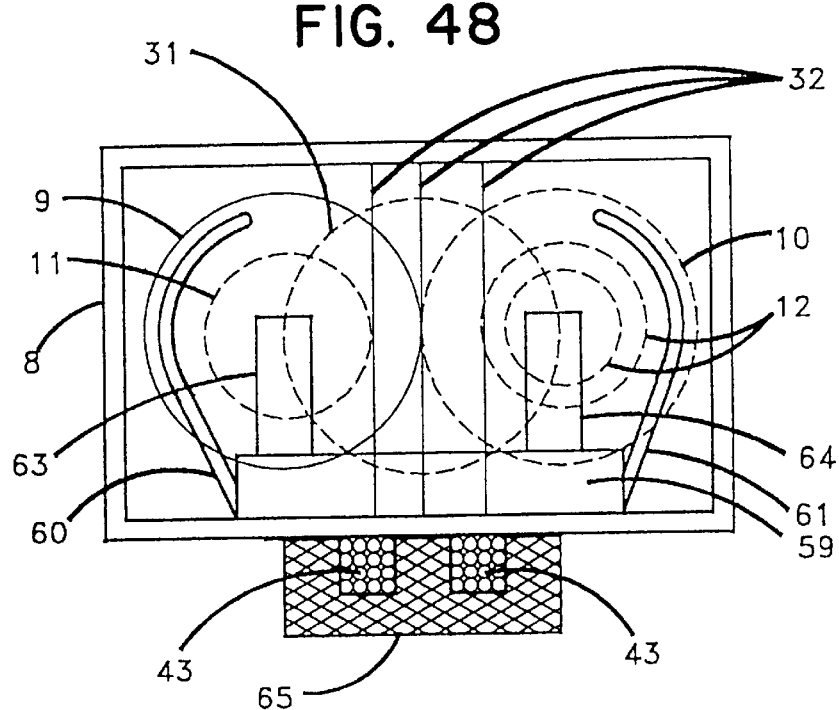
FIGS. 48–50 represent a sixteenth embodiment according to the present invention, including top, front and end views of the valve, respectively.
Figure 49:
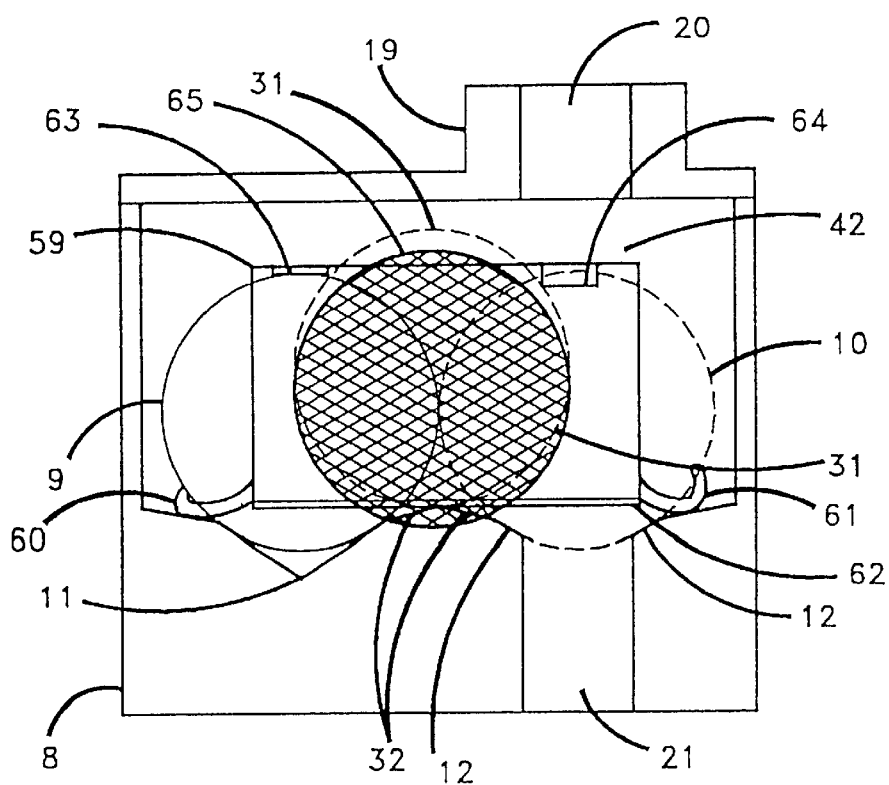
Figure 50:
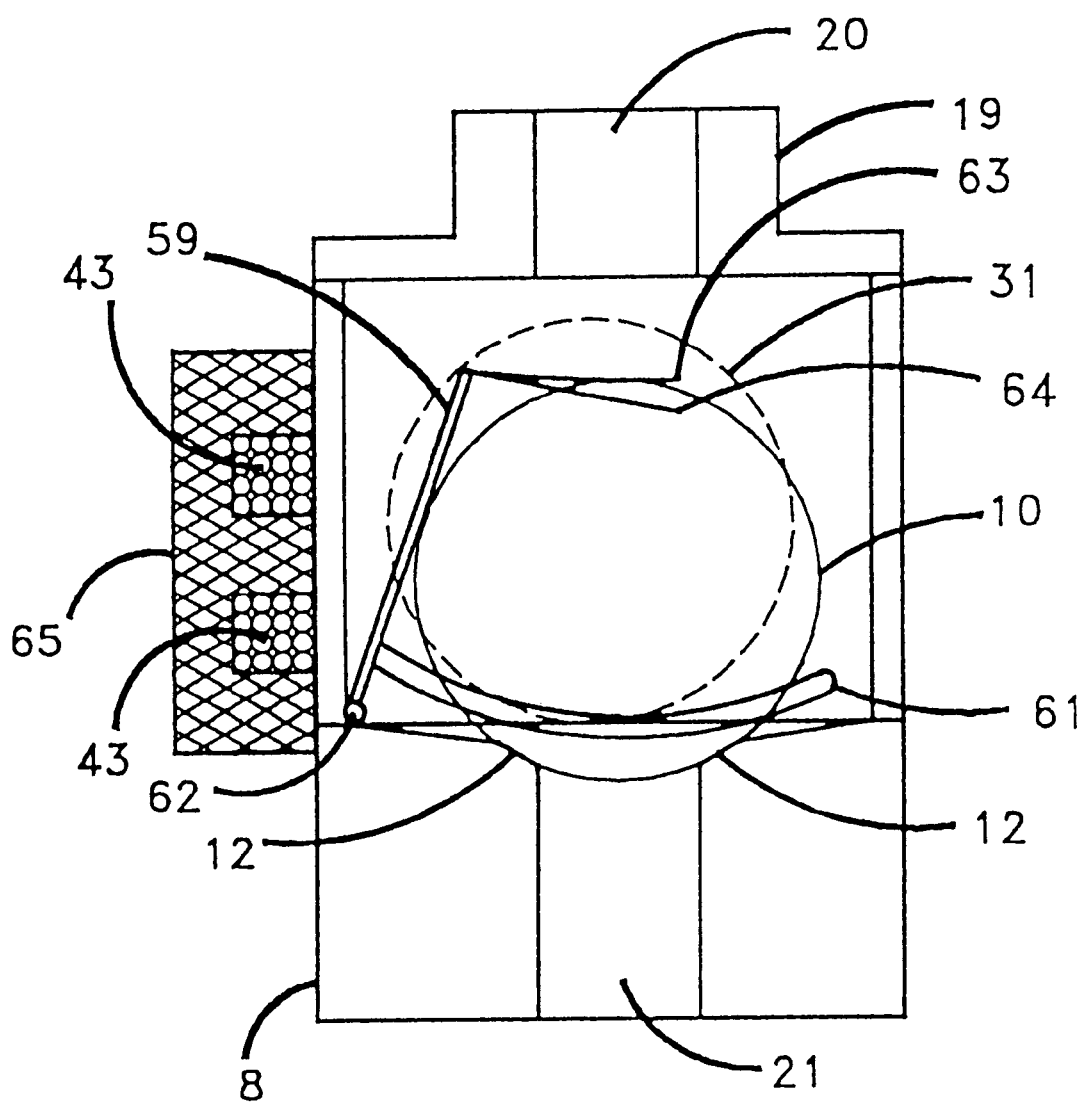
Figure 51:
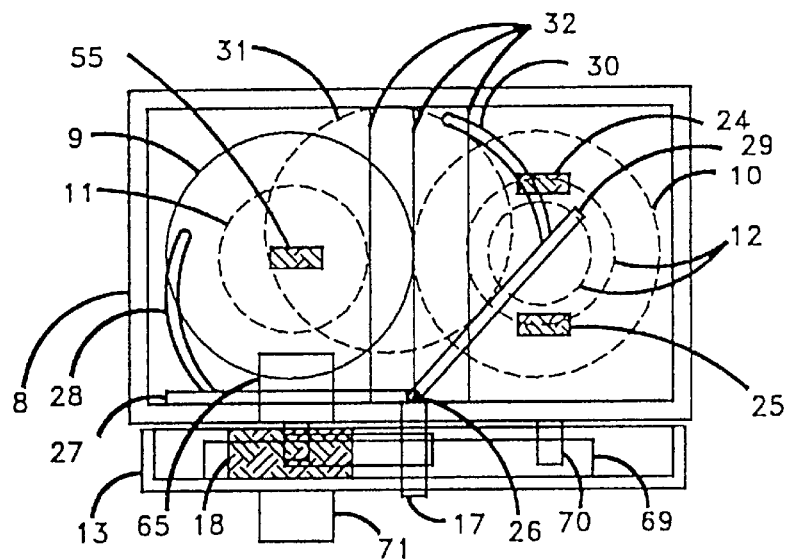
FIGS. 51–54 illustrate a seventeenth embodiment of the valve according to the present invention, with FIGS. 51 and 53 representing top views of on and off positions of the valve, and FIGS. 52 and 54 representing on and off front views of the valve, respectively.
Figure 52:
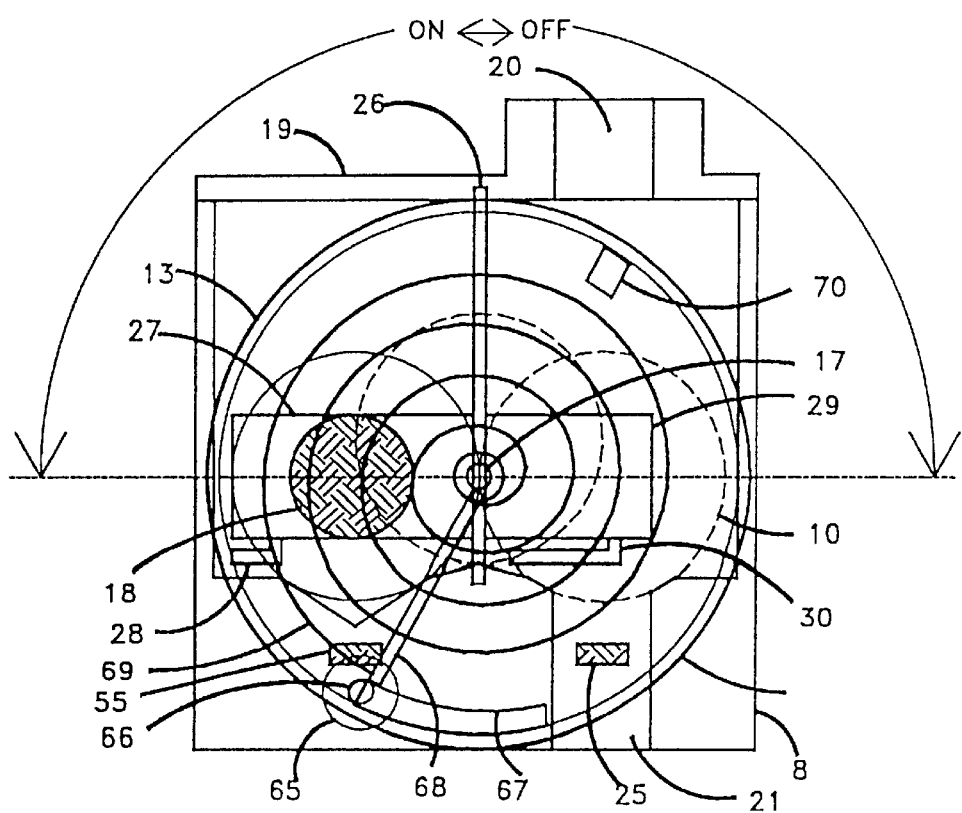
Figure 53:
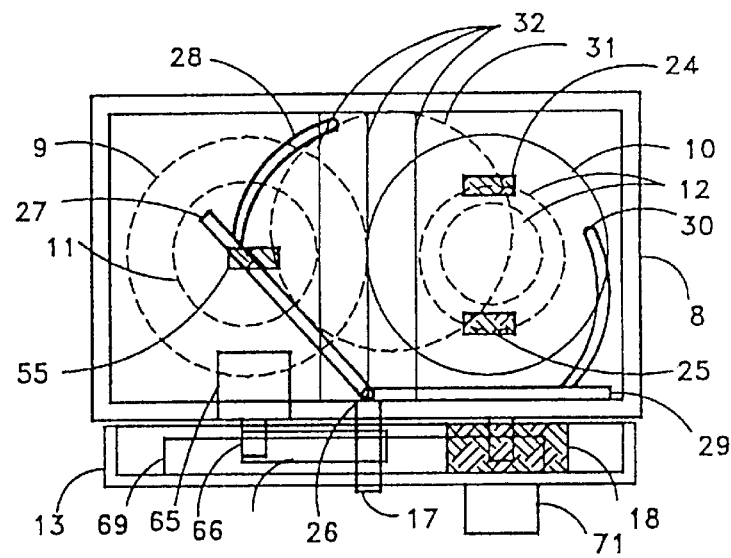
Figure 54:
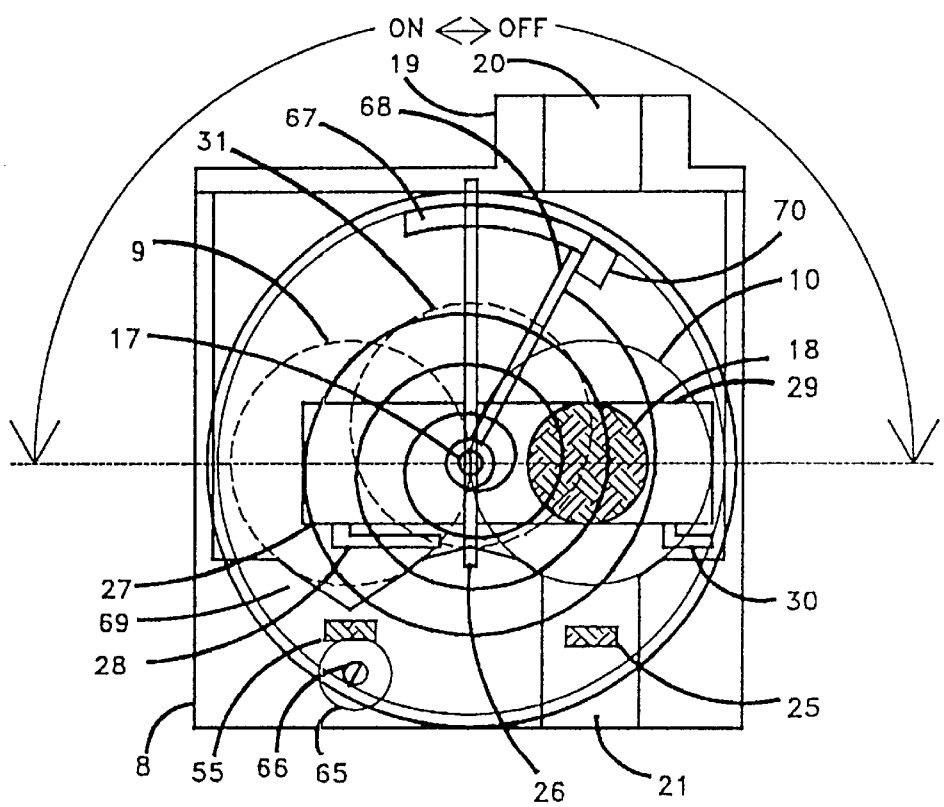
Figure 55:
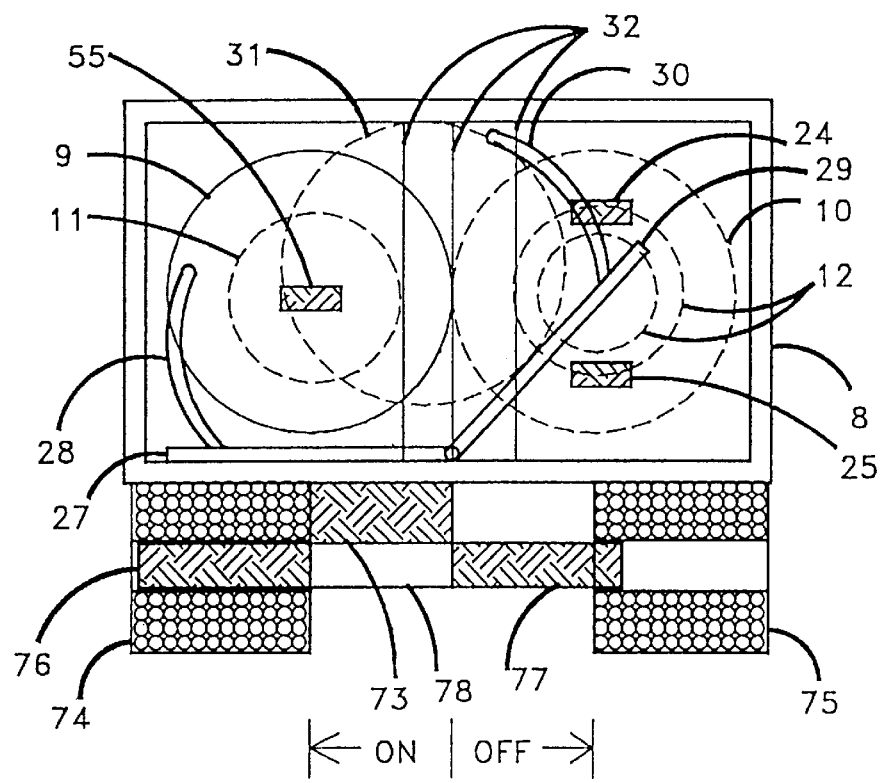
FIGS. 55–58 illustrate an eighteenth embodiment of the valve according to the present invention, with FIGS. 55 and 57 representing top views of on and off positions of the valve, and FIGS. 56 and 58 representing a front view and an end TO view of the valve in the on position, respectively.
Figure 56:
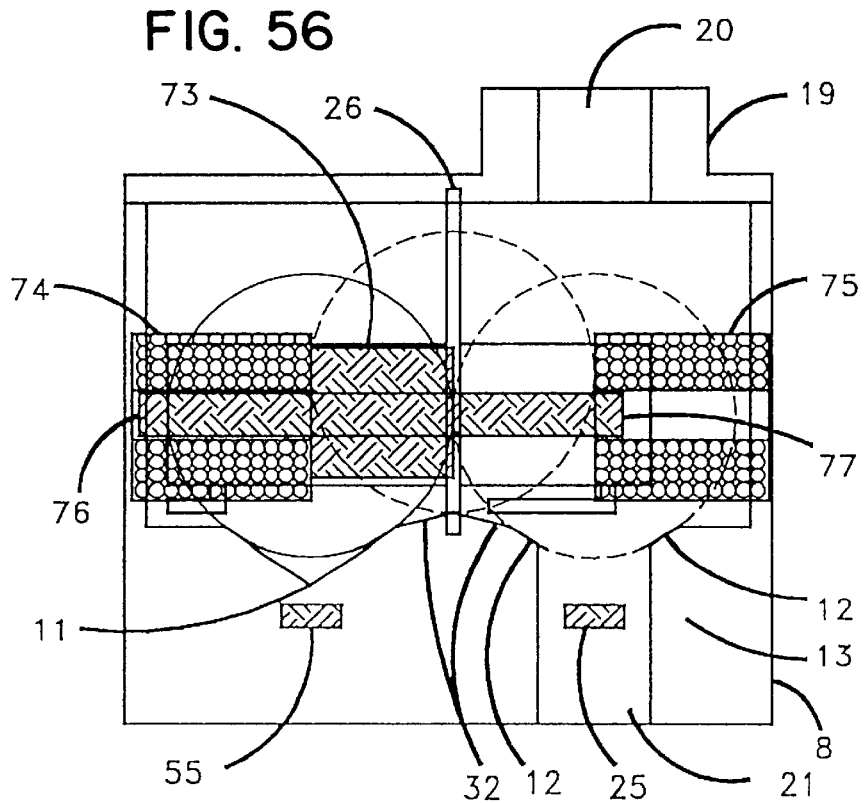
Figure 57:
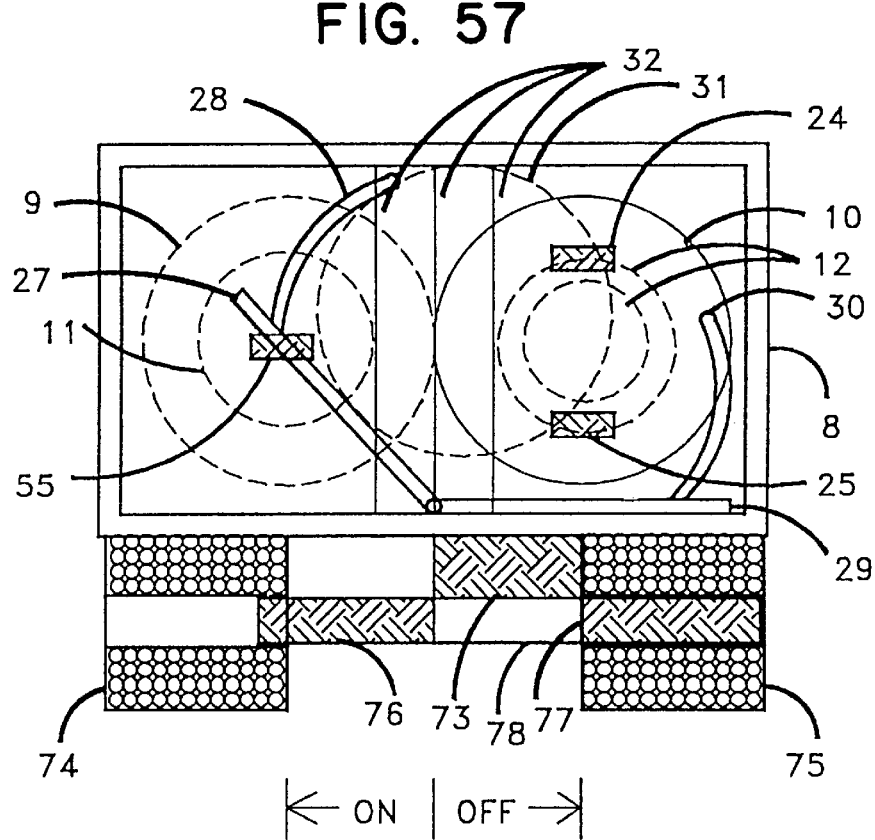
Figure 58:
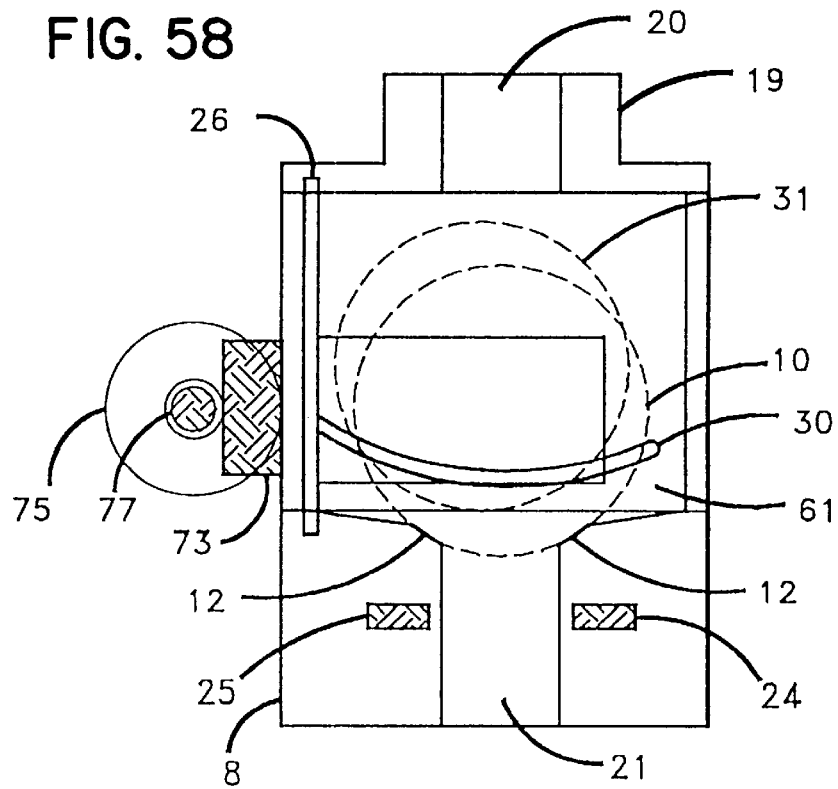

FIGS. 48–50 illustrate a variation of the embodiment described in FIGS. 45–47. In this embodiment, the ball that forms the valve member 9 is held in position by spring fingers 63 and 64. The spring fingers 63 and 64 are connected to the upper end of the magnetic flapper 59. As can be seen for example from FIG. 50, in comparing it with FIG. 48, while the finger 64 does not contact the ball in the on position, the finger 63 is pressed against the top surface of the ball so as to provide an additional bias for maintaining the ball in position. Thus, this bias is provided in either position.

When the current pulse is provided to the electromagnetic solenoid coil 53, the flapper 59 is brought against the interior wall surface of the housing 8. This causes the fingers 63 and 64 to clear out of the way before the pick up arm 60 and 61 flip the arm to the opposite position.

The advantage of the arrangement of FIGS. 48–50 is that the ball that forms the valve member 9 does not necessarily need to be made of a magnetic material, because an additional bias force for holding the valve member in position, particularly in the off position, can be provided by the spring fingers 63 and 64, in addition to gravity.

FIGS. 51–54 describe an embodiment which has an internal housing arrangement similar to the embodiment described with respect to FIGS. 30–37. That is, note the common features of the flapper 27, flapper 29, arms 28 and 30, housing 8, lid 19, inlet 20, outlet 21, magnets 24, 25, and 55, valve member support 11, housing floor 32, and valve seat 12.

In this embodiment, however, the electromagnetic on and off control is provided by a solenoid trigger release shut-off, manual spring and a rewinds for moving magnet with side-to-side pivot flapper valve control. The electromagnetic control is similar to that used with respect to the embodiment described in FIGS. 30–33, except that a motor and a gear train are not used.

Rather, in this embodiment a rotary handle 13 is manually turned using a handle 71 to reset the valve to an on position as shown at 9 and so as to wind a coil spring 69. The solenoid 65 forms a spring latch 66 holding the rotary handle 13 in position with a tapered cam 67. This position is held until a current pulse is supplied from a remote control power source (perhaps in response to a remotely sensed condition intended to cause actuation of the valve) to the solenoid 65, causing the solenoid to pull the spring latch 66 out of the way of the tapered cam 67. This releases the handle so as to allow the spring to unwind to rotate the handle, thus moving the magnet 18 to the off position. This causes the magnet 18 to control the position of the flapper 29 and to move the ball to the off position as indicated at 10.

FIGS. 55 through 58 show another embodiment in which the housing and flapper design are similar to the embodiments described above. Again, the primary differences from the previous embodiments lie in the electromagnetic actuation of the valve.

A linear motion differential solenoid is used, having push-pull coils 74 and 75 used to attract and repel magnets 76 and 77. Thus, the magnets 76 and 77 can be moved back and forth, between a position shown in FIGS. 55 and 57, for example. Between the magnets 76 and 77 is a magnet 73 having a shape designed to improve the flux distribution and strength of the flux to the flapper, even though it moves over a relatively short movement range, and may only cover a small area of a flapper 27 or 29. Thus, the magnet 73 is moved between the positions shown in FIGS. 55 and 57 to control the flappers 27 and 29. A shaft 78 connects the magnets 76, 77, and 73. A coil pulse current from the control power source will reverse the polarity for moving the shaft in the opposite directions. Control is otherwise as discussed in the previous embodiments.

With this embodiment, as with all of the preceding described embodiments, various features described with respect to the other embodiments can be incorporated herein. For example, position sensors and remote control sensors can be used for indication of the position of the valve or control of the position of the valve. The embodiment of FIGS. 59–62 includes a housing 8 having a lid 19 with an inlet 20, an outlet 21 and a valve seat 12. However, there is no valve member support 11 as with the previous embodiments.

Figure 59:
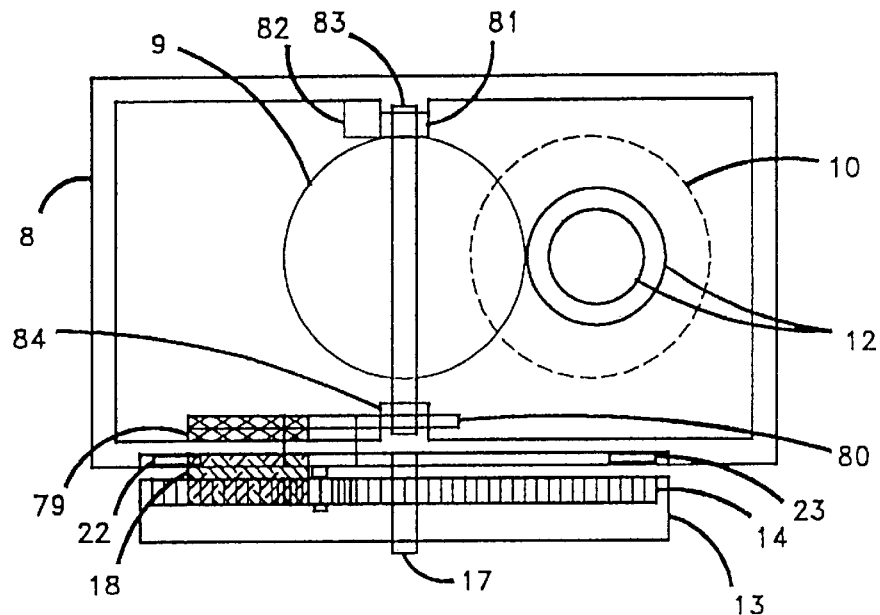
FIGS. 59–62 illustrate a nineteenth embodiment of the valve according to the present invention, with FIGS. 59 and 61 being top views of the valve in the on and off positions, respectively, and with FIGS. 60 and 62 being front views of the on and off positions, respectively.
Figure 60:
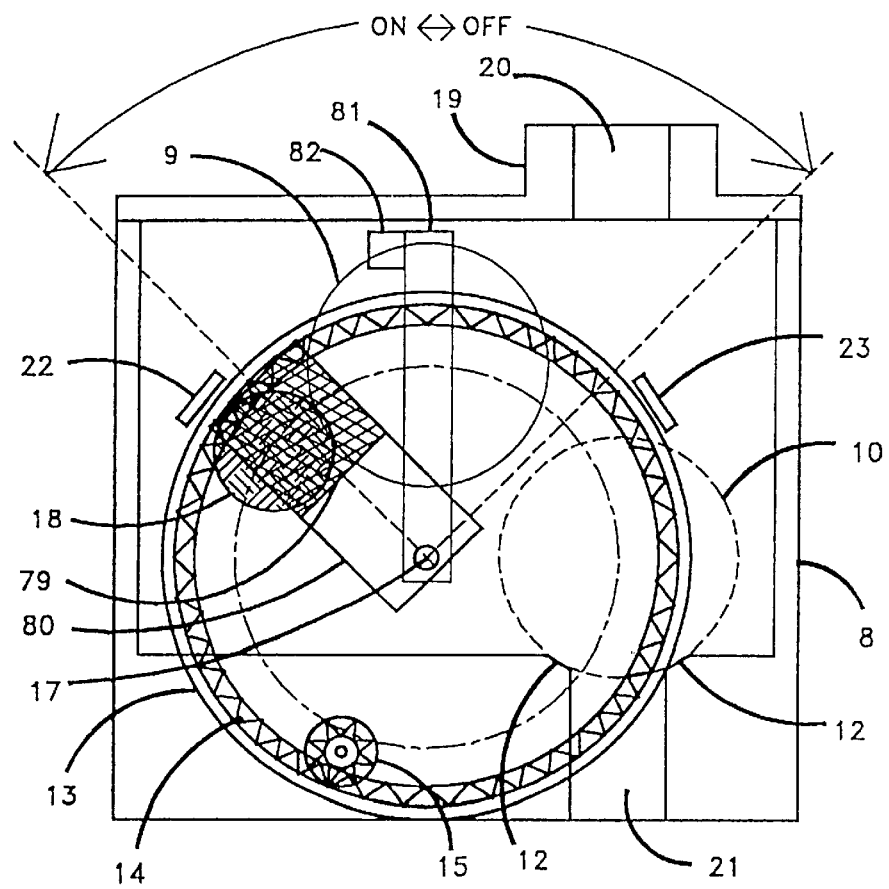
Figure 61:
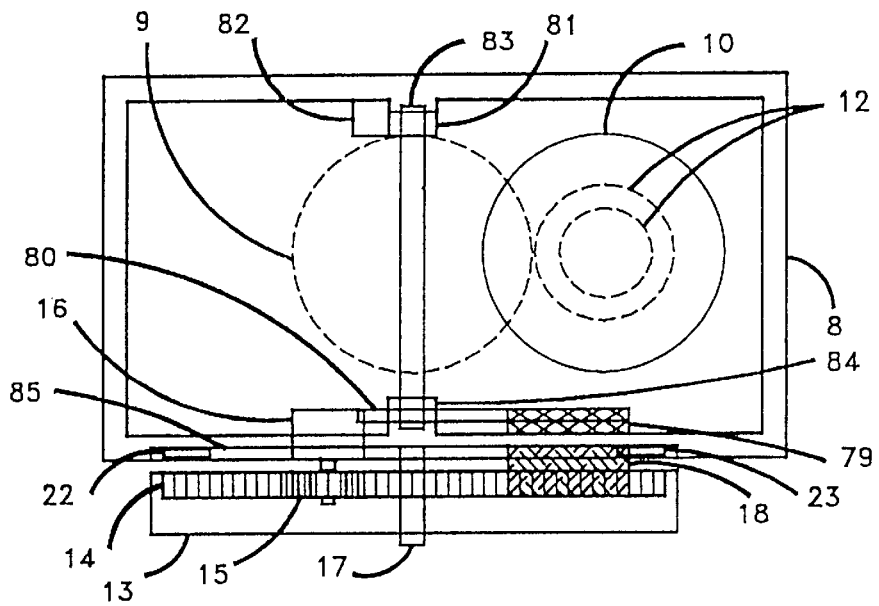
Figure 62:
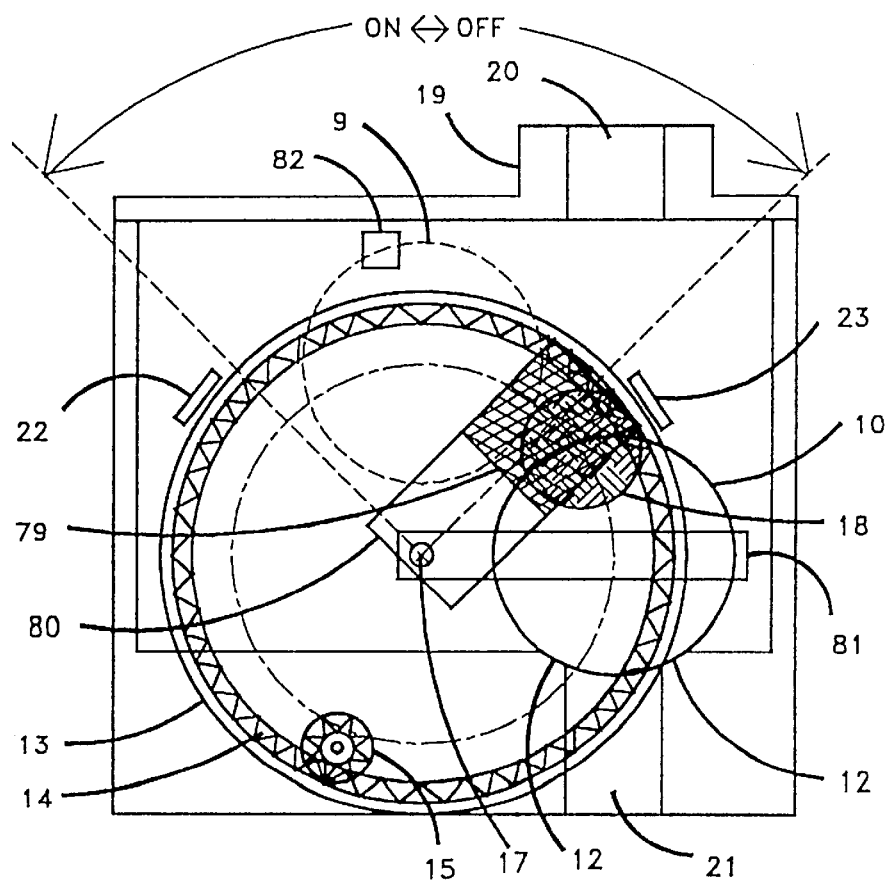
Figure 63:
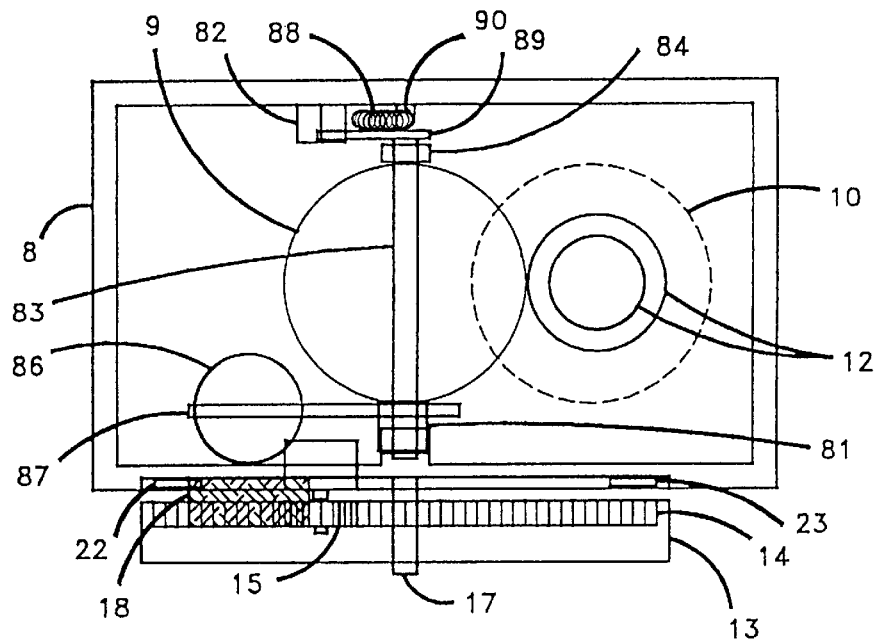
FIGS. 63–66 represent a twentieth embodiment of the valve according to the present invention, including top and front views of the valve in the on position shown in FIGS. 63 and 64, and top and front views of the valve in the off position shown in FIGS. 65 and 66.
Figure 64:
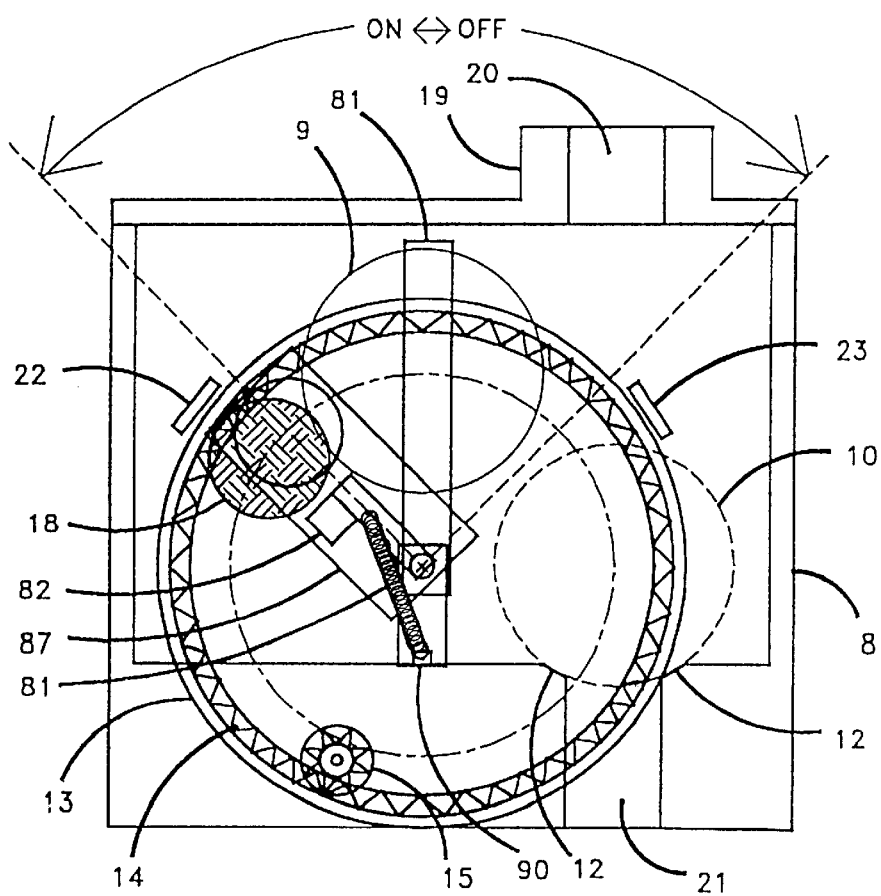
Figure 65:
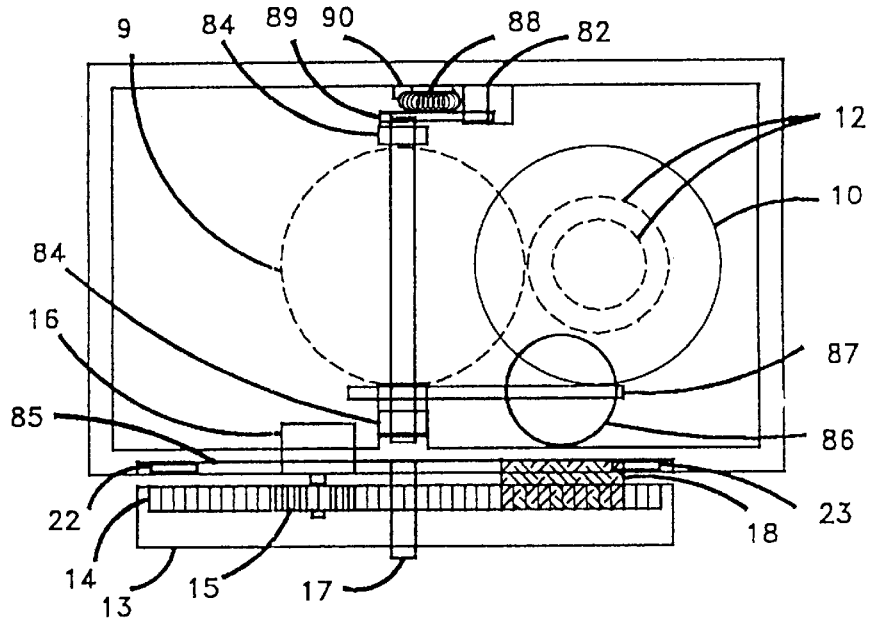
Figure 66:
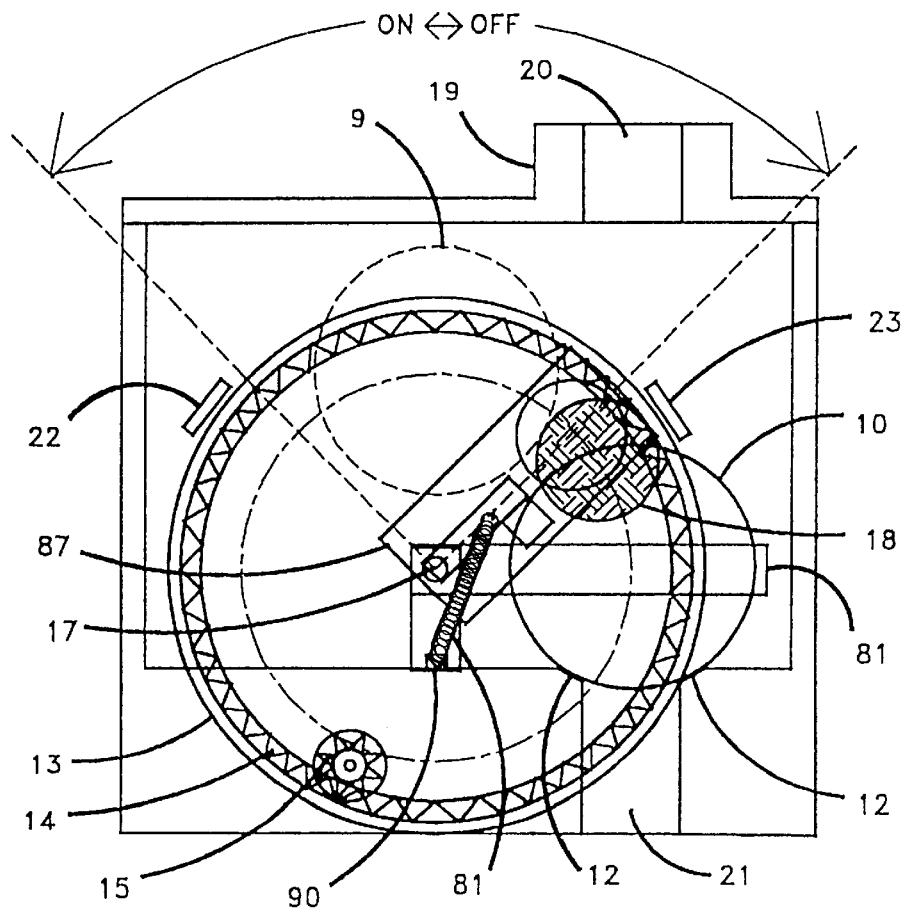

In this embodiment, rather, the valve member 9 shown as a bell valve, is pivoted between the off position 10 and an on position illustrated in solid lines in FIGS. 59 and 60 and by dashed lines in FIG. 61 and 62.

An external handle 13 is similar to the rotary handle 14 as previously described, and is used to rotate a magnet 18 with an appropriate rotary gear train and motor, or solenoid ratchet as described previously. However, in this case the magnet 18 is rotated to magnetically couple and pull a magnet and/or core pole-piece armature 79. An armature control arm 80 has the magnet 79 on an end thereof. The arm 80 is connected to an independent rotating shaft 83 that is supported by bearings 84 in the housing 8. Furthermore, the shaft 83 is directly connected to the valve member 9 by an offset cam 81. The on and off positions are maintained by overtravel past stop 82 or seat 12 of the motor driven handle, which is caused by the mechanical limits of the stop 82 in the on position or by the valve seat 12 in the off position. Preferably the travel of the rotating magnet 18 is in a recessed well. The overtravel positions can be seen from FIGS. 60 and 62. In FIG. 60, the magnet 18 has rotated past the center line of the arm in the counterclockwise direction, while in FIG. 62 the magnet 18 has traveled past the center line of the arm 80 in the clockwise direction.

Thus, with this embodiment, the magnet 18 is not directly magnetically coupled with the valve member 9. Rather, it is magnetically coupled with the pole piece 79, which is connected to the arm 80 which is relatively fixed with the cam 81 holding the valve member 9. In this embodiment, thus, a valve member support 11 as in the previous embodiments can be omitted. Also note the use of position sensors 22 and 23 in this embodiment.

FIGS. 63–66 show an electromagnetic on and off control for a valve similar to that of FIGS. 59–62. This discussion will focus on the differences between this embodiment and the previous embodiment.

First, a spring 88 is connected between a base support 90 and an offset cam 89. As can be seen from FIGS. 63 and 65, stops 82 are provided at either end of the range of travel of the offset cam 89. The offset cam 89, furthermore, is provided at the end of the shaft 83 opposite to an armature 87 holding a magnetic rotation ball 86 as a variation of the magnet of armature pole-piece 79.

Thus, the spring 88 which is driven over-center to provide a positive pressure on the valve seat 12 when the valve member 9 is in the off position shown at 10. Alternatively, the spring pressure can be against the stop 82 in the on position. That is, either the stop 82 can be used, or the valve seat 12 itself can be used as a stop by the over-center spring. Thus, while the magnet 18 moves the magnetic rotation ball 86 similarly to the previously discussed embodiment, its movement, and the pressure at the end positions, is aided by the spring 90. The over-center spring pressure provides on and of position holding pressure in either position.

Thus, with this embodiment, with the aid of the springs on the shaft 83, the rotation range of the magnet 18 can be limited to about a 90° range, as illustrated. This allows the amount of moving friction to be lowered. As with the previous embodiments, a stepper solenoid can be used, as for example shown in FIG. 25A, or a geared solenoid ratchet such as used with an electronic clock can be used. The position of the valve member 9 between its on and off positions can be in line, at the same angular axis, as with the magnet 18 and the armature 79 and 80. The offset cam ball support 81 can be used to make the design smaller, while only using a 90° area for the handle 14, for overall reduced size and simplicity.

Figure 67:
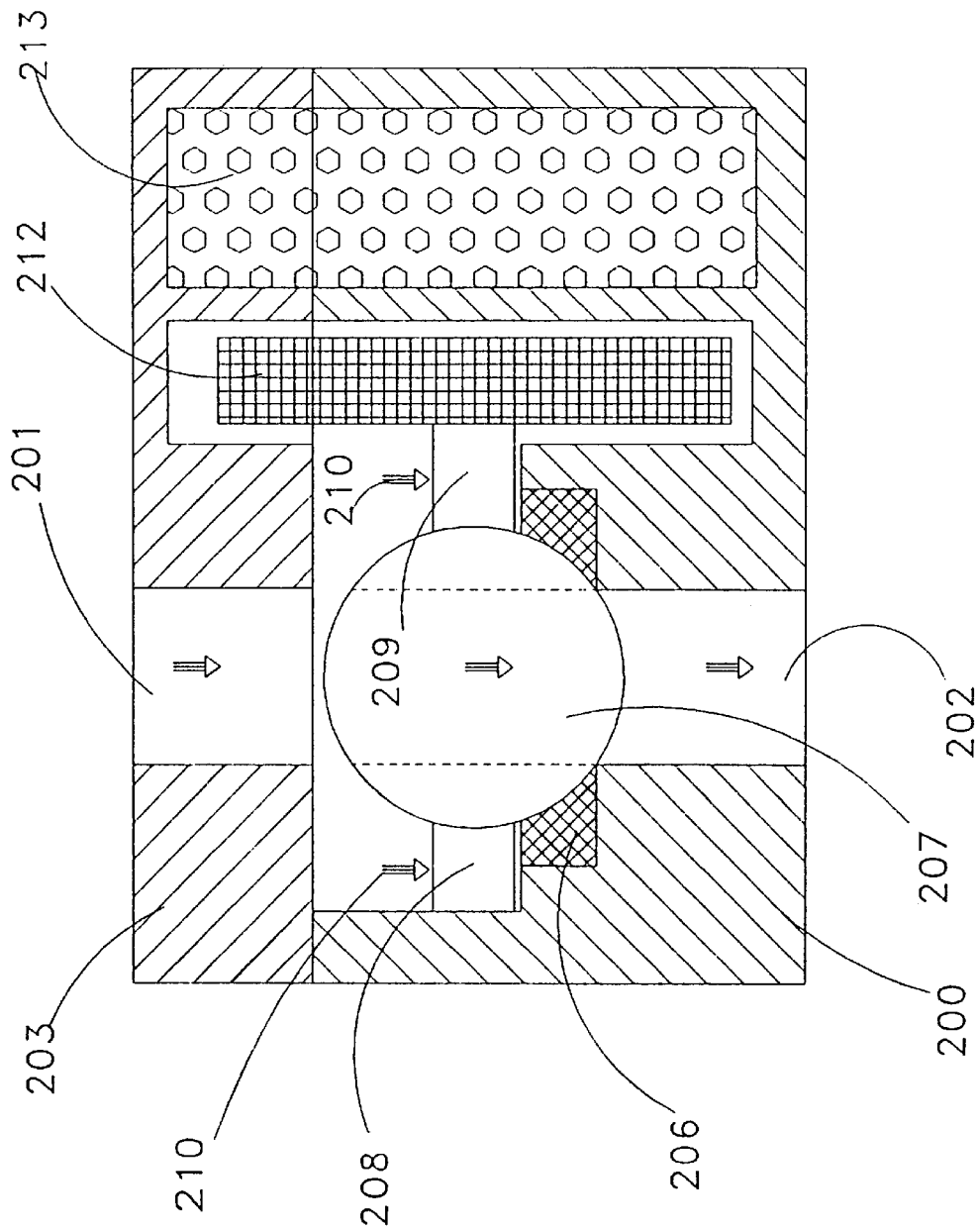
FIGS. 67 and 68 illustrate a twenty-first embodiment of the present invention, with FIG. 67 showing the valve in the on position, and FIG. 68 showing the valve in the off position.
Figure 68:
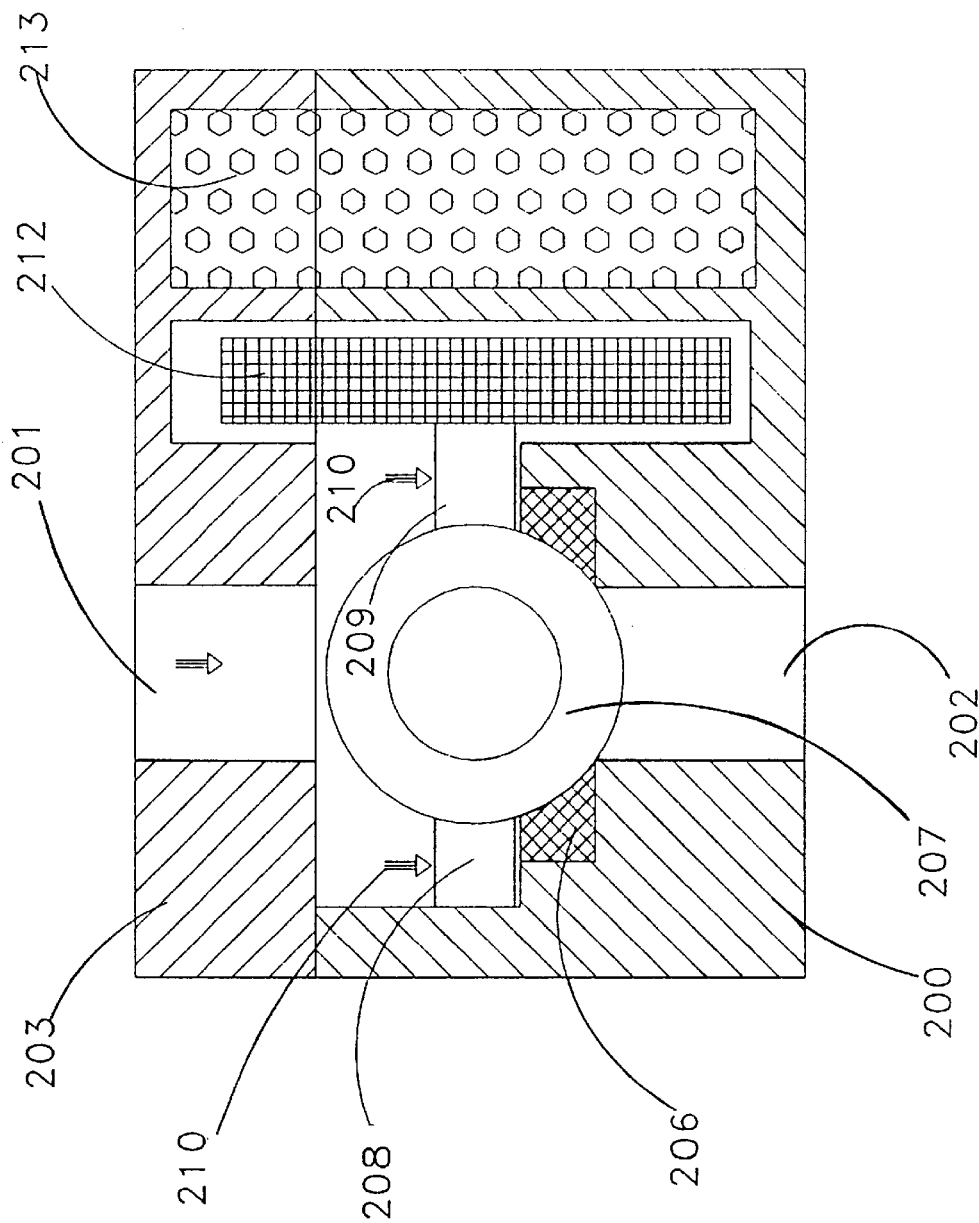
Figure 69:
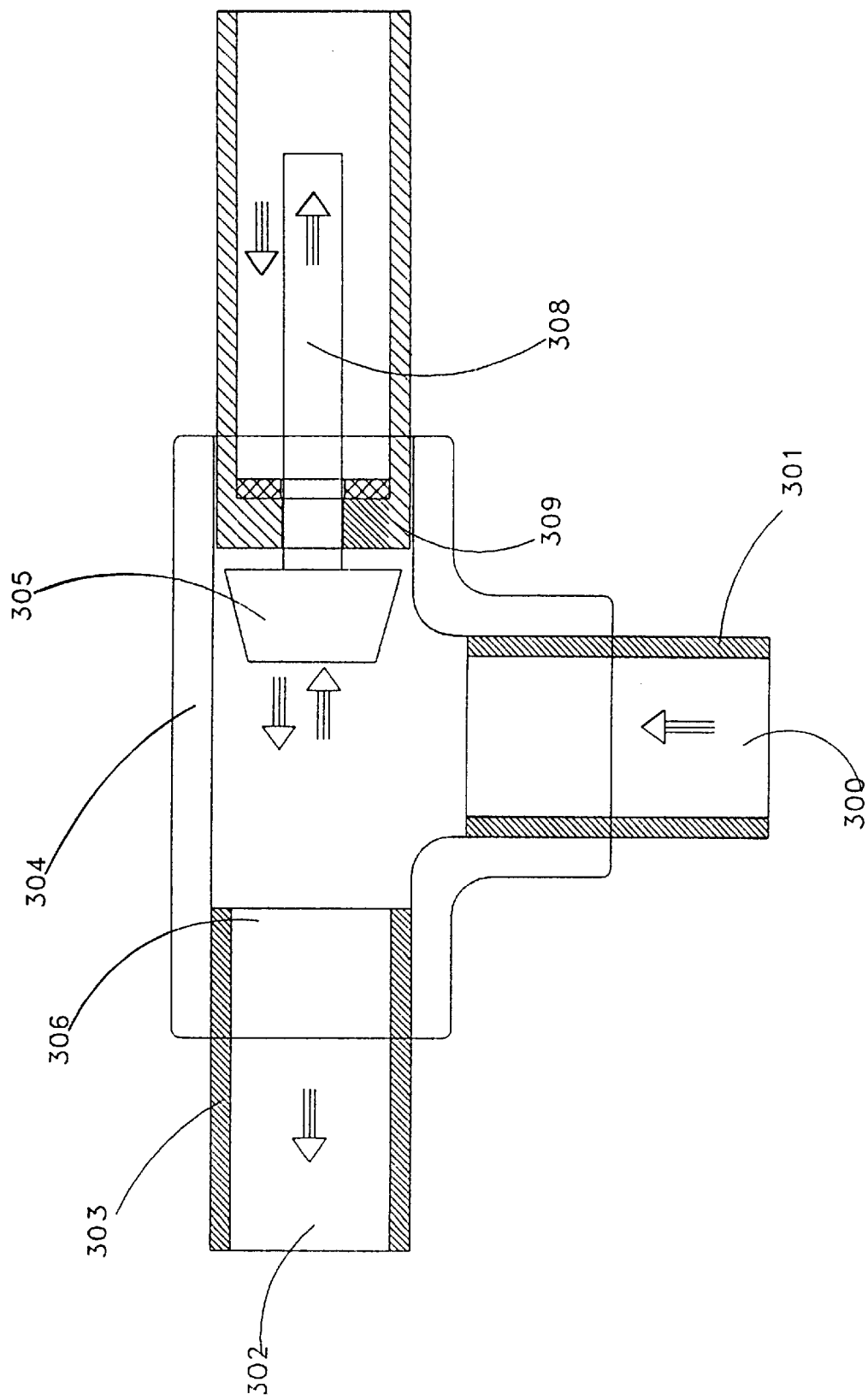
FIGS. 69–72 illustrate a twenty-second embodiment according to the present invention, each figure representing a partial cross-sectional view of a valve, and FIGS. 70–72 demonstrating the operation of the valve.

FIGS. 67 and 68 relate to another embodiment according to the present invention. Here a valve includes a lower half 200 and an upper half 203 having an inlet 201 and an outlet 202. A low friction valve seat 206 is provided in the lower half 200. This low friction valve seat 206 is typically of a low friction material formed as an insert in the metal of the lower half 200.

A valve member 207 is illustrated in FIG. 67 as resting on the valve seat 206. The valve member is a rotary ball cock valve and has a flow channel 215 extending therethrough. The valve member 207 includes a shaft 208 forming a part of the overall valve 209. Reference 212 is a magnetic armature that is attached to the shaft 208, which is capable of rotation. Reference number 213 is a permanent moving magnet or stepping electromagnet.

The rotary ball cock valve 209 of this embodiment can have its valve member 207 rotate 90 degrees by rotation of the shaft 208 between an on position as shown in FIG. 67, in which the flow channel 215 communicates with the inlet 201 and the outlet 202, and an off position as shown in FIG. 68 in which the valve member 207 is turned 90 degrees so that the fluid path 215 is out of communication with the inlet 201 and the outlet 202.

It should be noted that the rotating shaft 208 is arranged inside the lower half 200 of the valve 209 so that a pressure force that is illustrated by arrows 210 in the figures will cause the shafts 208 to be biased in the direction of the arrows so as to maintain a seal between the low friction valve seat 206 and the valve member 207. Thus, suitable bearing support is provided for the rotating shaft 208 in the valve 209.

A further embodiment of the present invention is represented by FIGS. 69–72, which shows a basic T-valve design that is partially mechanical and partially electromagnetic. A T-valve body 304 connects an inlet pipe 301 to outlet pipe 303 so as to interconnect inlet 300 with outlet 302. A wedge gate valve or tapered plug plunger type of valve 305 for engagement with a valve seat 306 formed on the end of the pipe 303 is provided to close the valve. The plug 305 can be an elastomer such as teflon, rubber, etc. It is connected to a shaft 308 for movement. The shaft 308 extends through a sealed member 309. Note that the valve seat can either be an end of the pipe 303, or could be a separately formed valve seat.

The opposite end of the shaft 308 is connected to the magnet 310. The magnet 310 is movable in a cylinder 311 of the sealed member 309 at one end. The opposite end of the cylinder 311 is closed by a magnetic target sealed end piece 313. The exterior of the cylinder 311 is surrounded by a coil 312.

Figure 70:
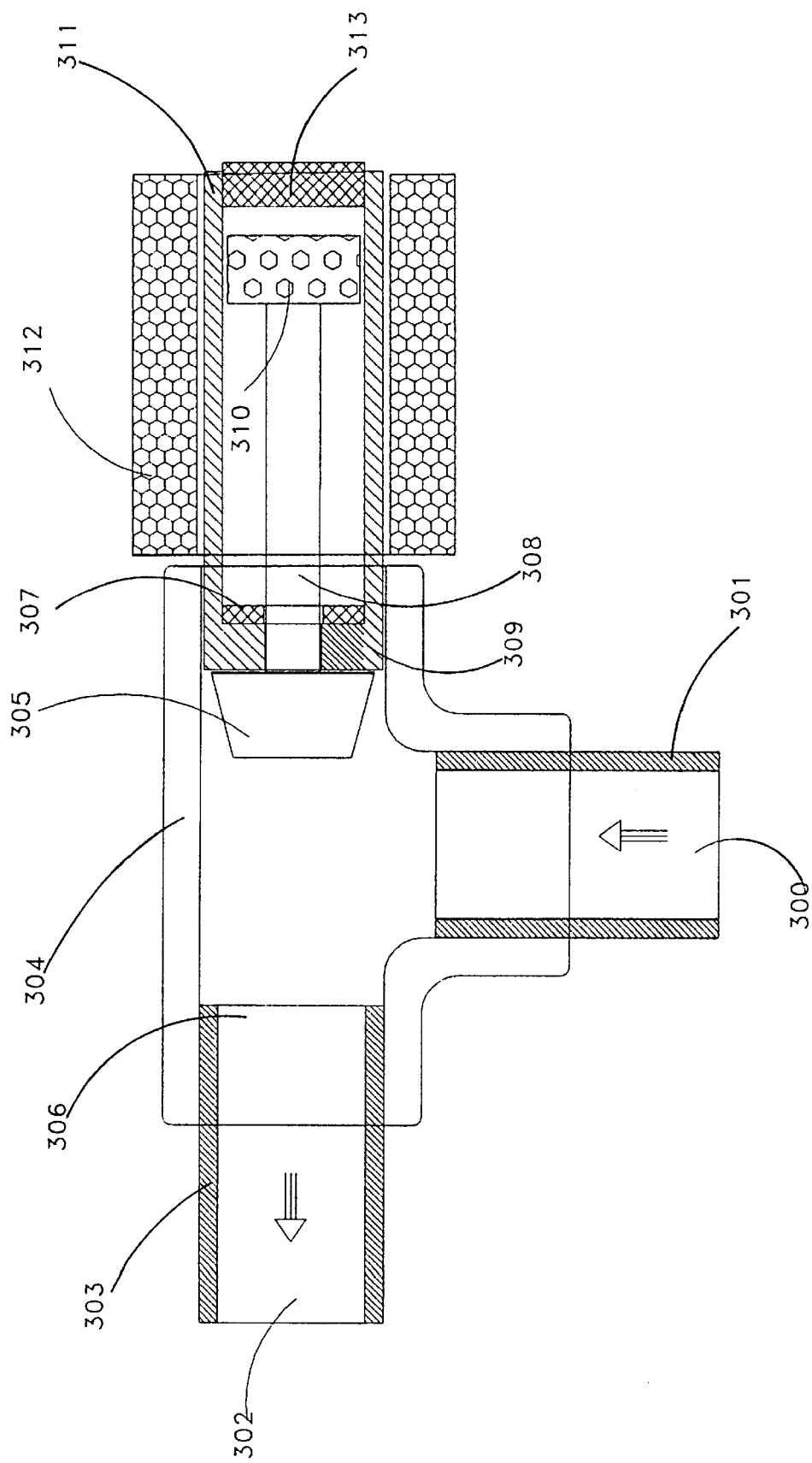
Figure 71:
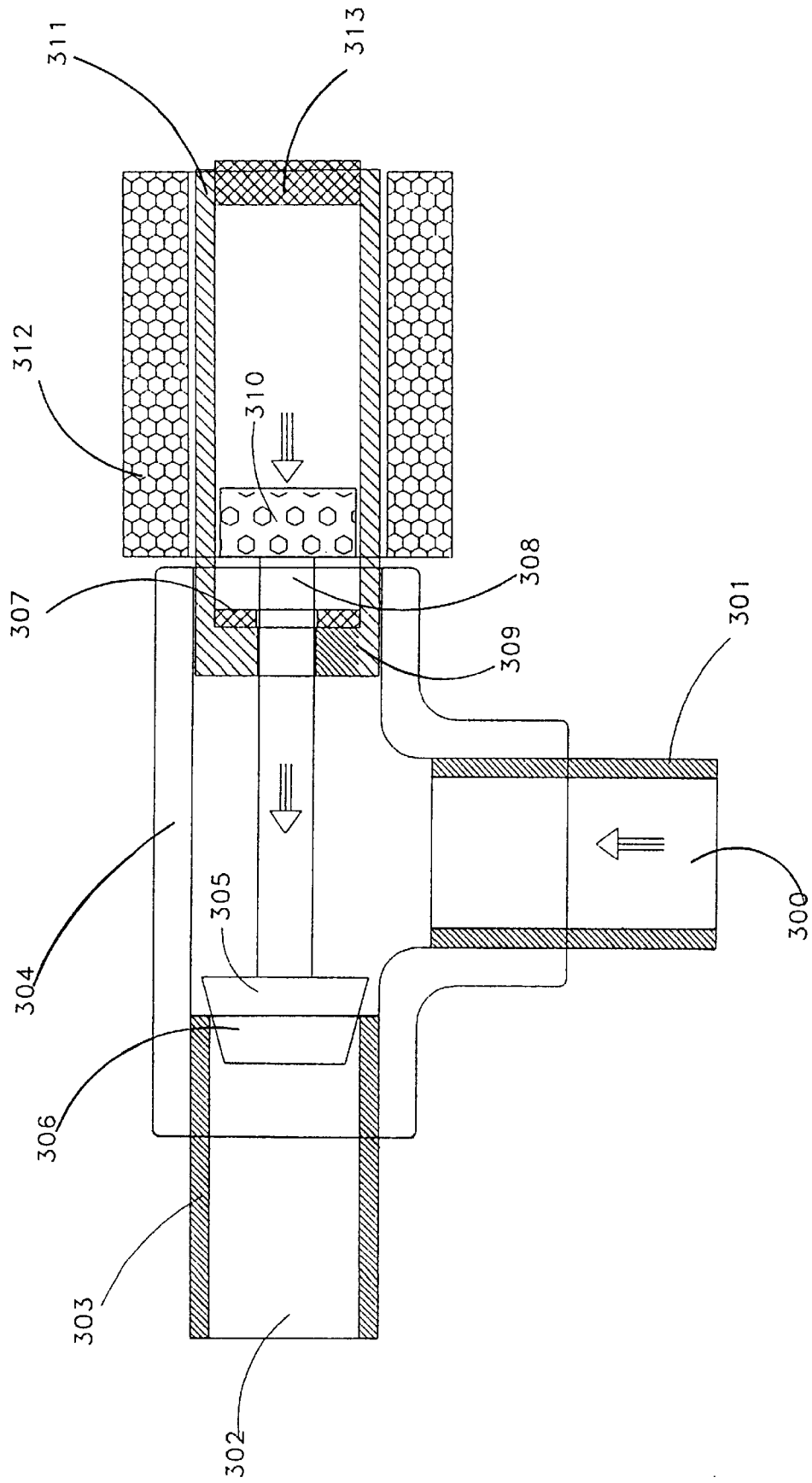
Figure 72:
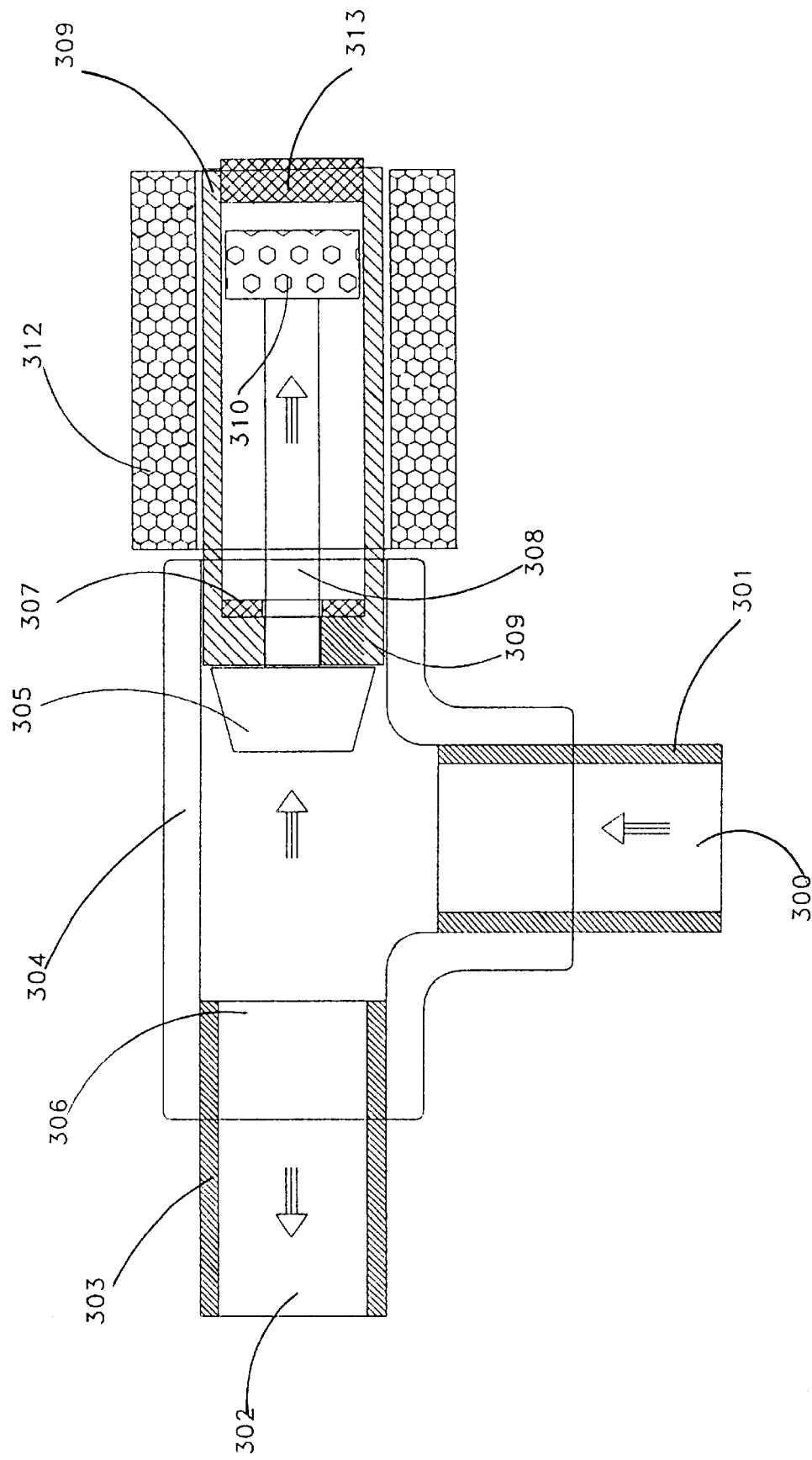

The operation of the valve is demonstrated from FIGS. 70–72. In the position shown in FIG. 70, the valve, clearly, is open, and a fluid can be allowed to flow from inlet 300 to outlet 302 through the T formed by the T-valve body 304. The fluid is prevented from flowing to the outside through the right-hand portion of the T-valve body 304 by the sealed body 309.

On and off control can be remotely performed through electromagnetic coupling through the isolated sealed housing 309 and the cylinder 311 thereof. The coil 312 is driven by a current pulse of the proper polarity from a remote controlled power source. The current pulse will cause the magnet 310 to move from the on position illustrated in FIG. 70 to the off position shown in FIG. 71. The magnet 310 is held in the off or closed position by attraction to a magnetic target washer end piece 307. An appropriate gap is provided between the washer end piece 307 and the permanent magnet 310 to provide a desired magnetic bias for the valve plug 305 against the end of the pipe 306. A current pulse of the proper, opposite polarity, provided to the coil 312, will move the magnet 310 in the opposite direction to the on position. This is demonstrated by FIG. 72. The magnet 310 can be held in the on position or open position by attraction to the magnetic target sealed end piece 313, with a gap provided as desired for holding the position with a magnetic bias or force.

Not only does the valve of this embodiment provide an externally operable or remotely controlled T-valve design, the design can also be a modification for existing gas utility service pipe Tees, or indeed a replacement for such Tees. The T-valve preferably duplicates the size of a utility pipe T or elbow for easy replacement in existing systems or designs, resulting in the feature of simple installation into existing equipment. Also, the valve 305 and the body 309, along with their associated parts, could actually be added as a simple modification to existing gas utility service-Tees, without the interruption of gas service, as an improvement and upgrade. For example, if the standard service T was represented by valve body 304, with incoming pipe 301 and outgoing pipe 303, a plug at the right-hand portion of the T could be easily replaced by the valve unit by removing the plug and installing the sealed body 309 in its place. The plug 305 might be adapted to operate with the end of the pipe in existence, for example. The device could also be adapted to other standard fittings, such as a cross.

Figure 73:
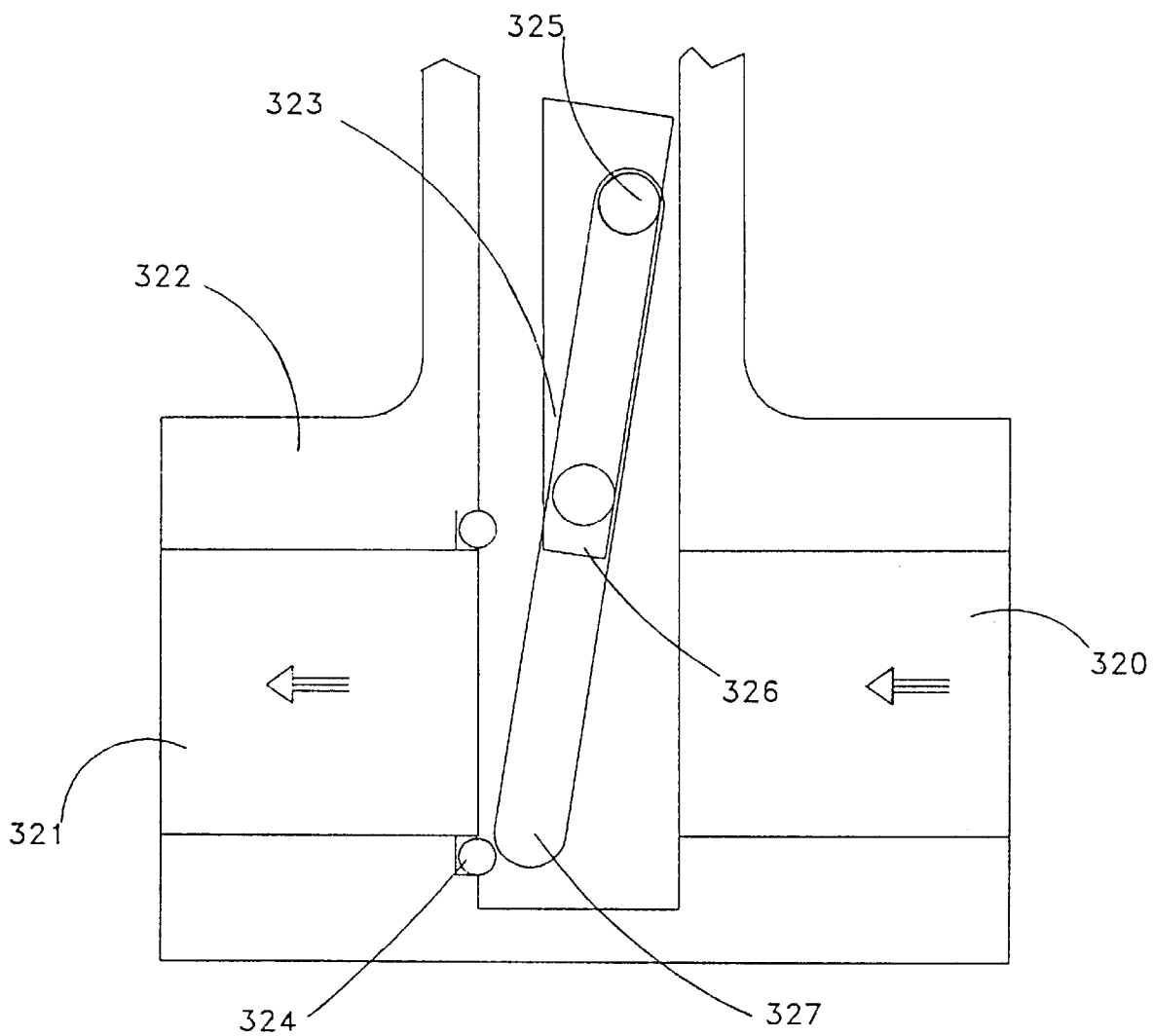
FIGS. 73–76 illustrate a twenty-third embodiment of the valve according to the present invention, including on positions of the valve as shown in FIGS. 73 and 75 and off positions of the valve as shown in FIGS. 74 and 76.
Figure 74:
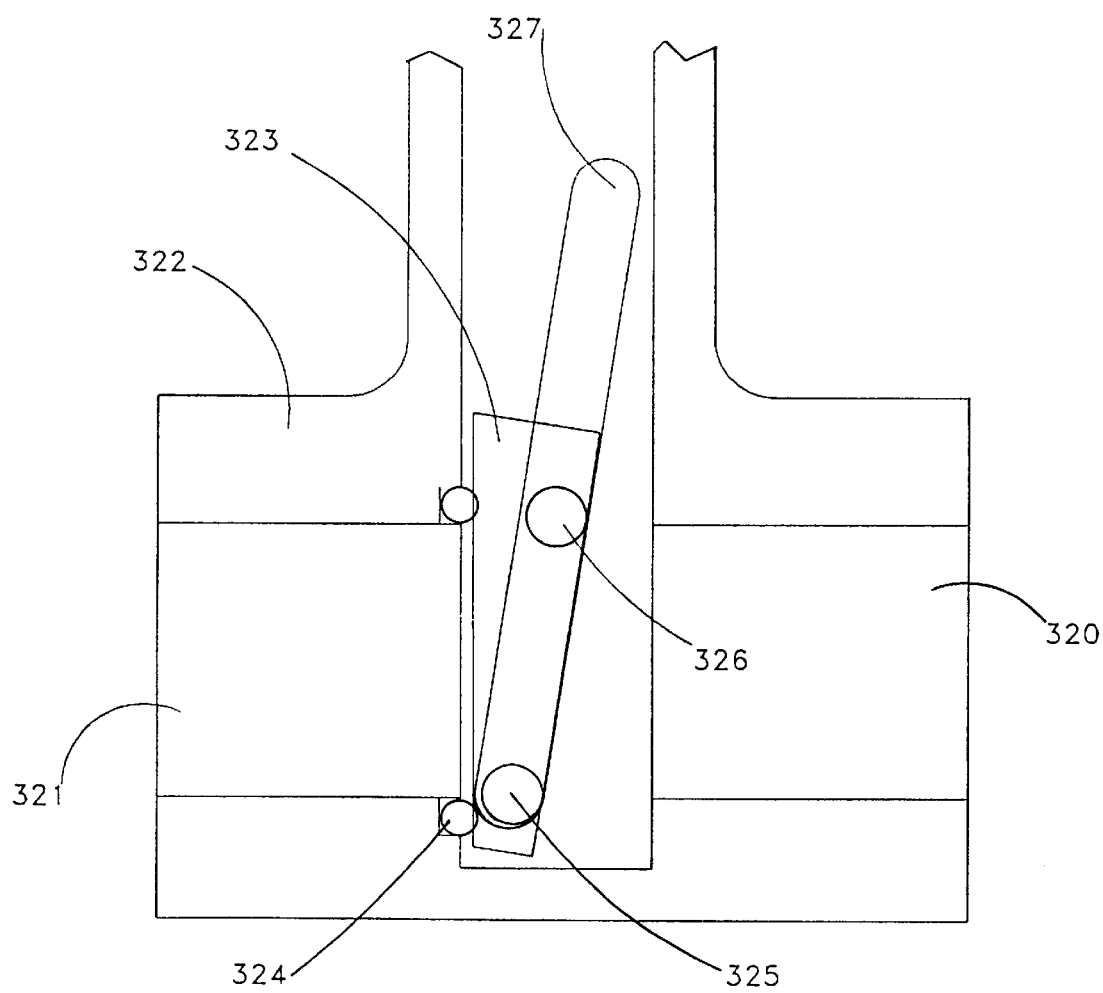

FIGS. 73–76 represent a further embodiment according to the present invention. This embodiment contemplates a wedge type of gate valve. FIGS. 73 and 74 show a general concept of a wedge gate valve 323 that can easily be adapted for electromagnetic remote control, resulting in intrinsic safety isolation. Note FIGS. 75 and 76, for example.

A valve body 322 has an inlet 320 and an outlet 321. A central portion extends upwardly between the inlet 320 and the outlet 321, as shown in the figures. In the valve body, on opposite sides, are formed raceways 327, one of which is shown in the cross section of FIGS. 73 and 74. The wedge gate valve 323 is provided with guide pins or bearings 325 and 326 for engagement with the raceways 327 on either side thereof. Thus, the valve body 323 is slidable along the raceway 327 from an upper, open position, to a lower, closed position. In the off or closed position, the valve body 323 contacts a suitable valve seat, shown in the example as an O-ring 324.

Figure 75:
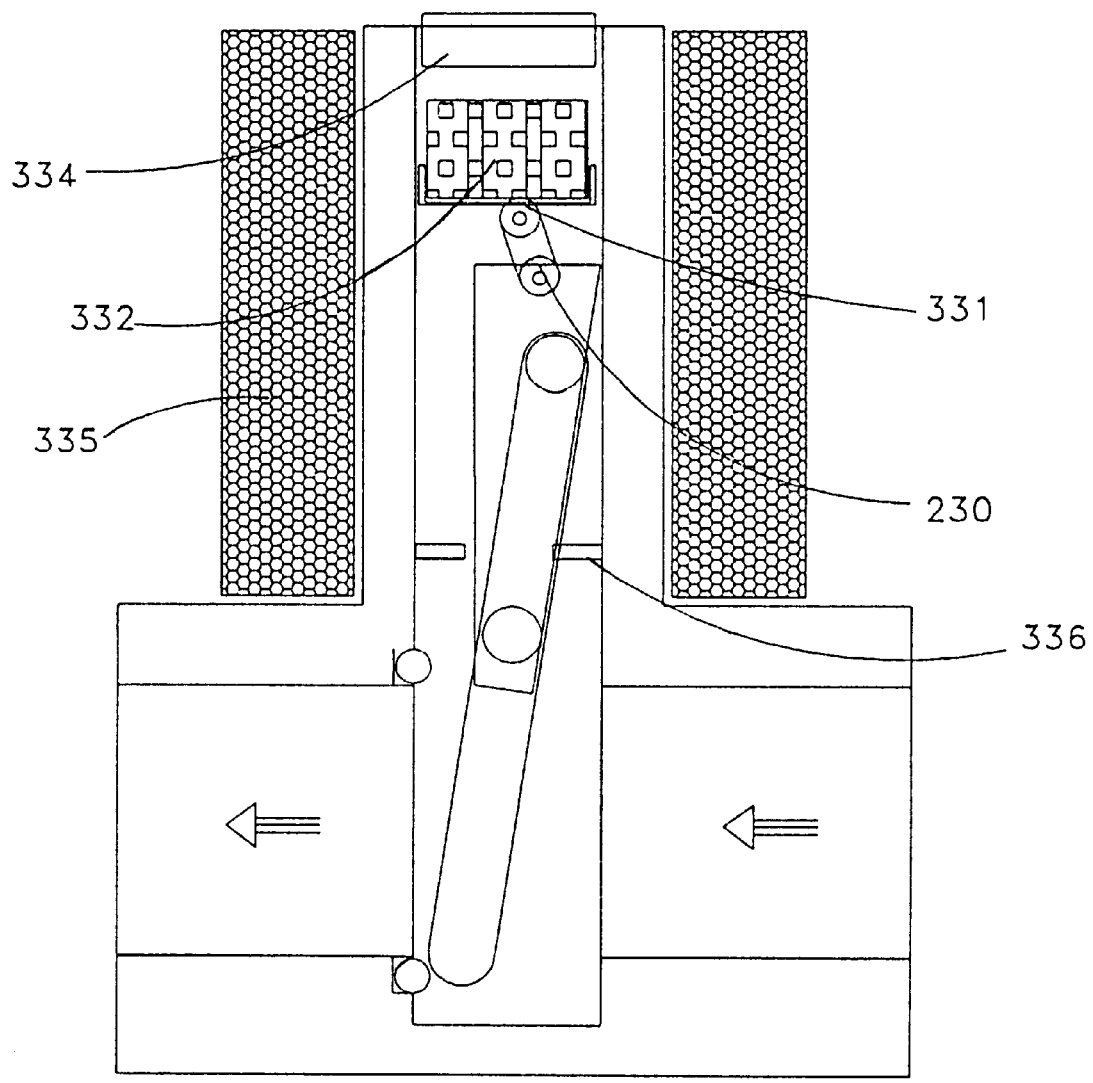
Figure 76:
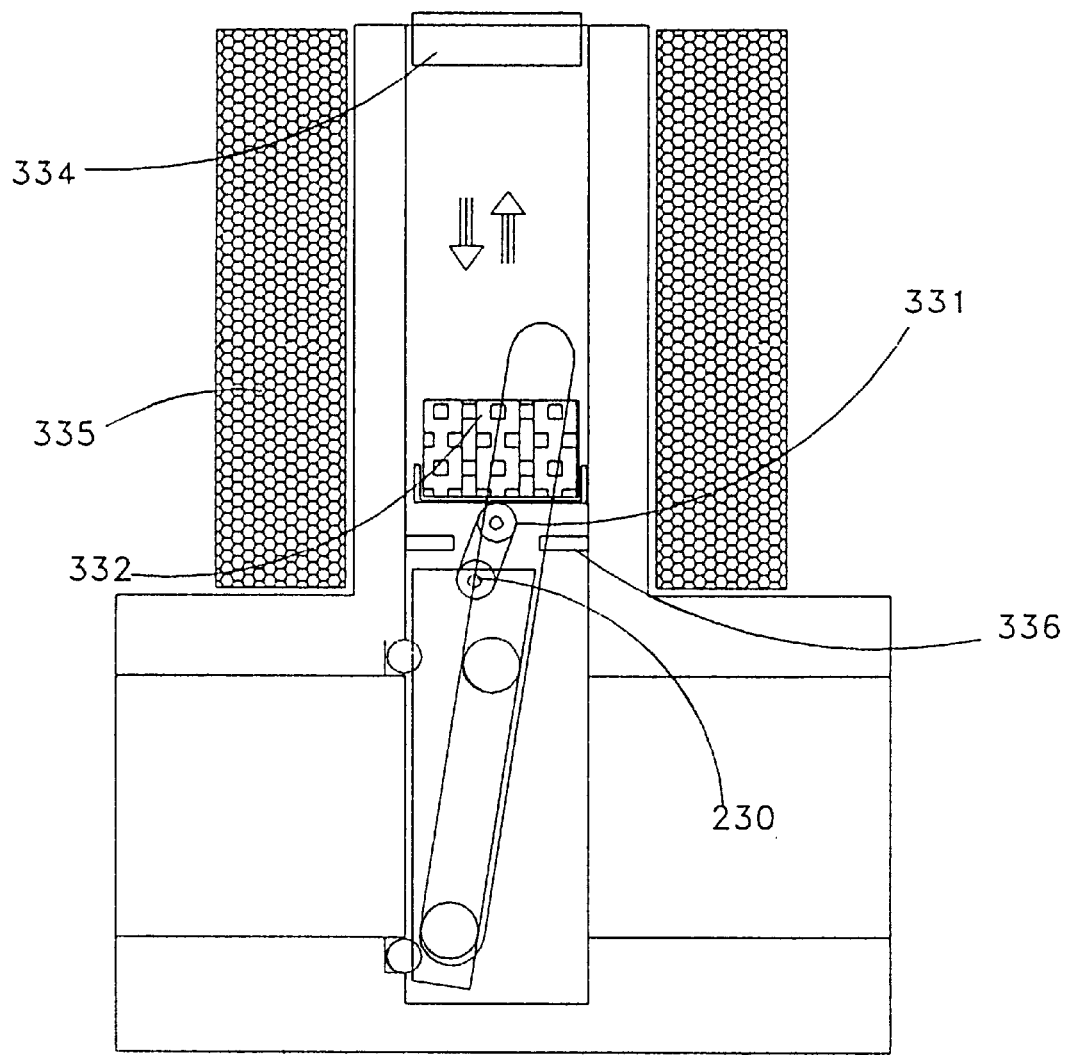

Referring now to FIGS. 75 and 76, an electromagnetic actuation feature will be explained. An electromagnetic coil 335 surrounds the upper end of the valve body 322. The upper end, further, is closed by a sealed magnetic target end piece 334. A magnet 332 is movably disposed in the upper extension of the valve body 322 for movement between an upper position shown in FIG. 75 and a lower position shown in FIG. 76, moving along with the valve body 323. A further magnetic target washer 336 is provided at a lower position in the upper extension of the valve body 322. A flexible pin cam connecting assembly 321 is connected to a pin 230 mounted on the valve wedge gate 323 and to the permanent magnet 332. The operation of this valve will now be explained.

In the position shown in FIG. 75, the permanent magnet 332 is attracted to the sealed magnetic target end piece 334 so as to maintain the wedge gate valve 323 in the open or on position through the connection made by the flexible pin cam connection assembly 331. When the electromagnetic coil 335 is driven by a current pulse from a remote control power source, the current pulse being of a proper polarity relative to the polarity of the magnet 332, the magnet is moved toward the off position, i.e. from the position of FIG. 75 to the position of FIG. 76. In the off position, a magnetic coupling attraction holding force is provided by the magnetism between the magnet 332 and the magnetic target washer 336. The force is controlled by the gap distance between the magnet 332 and the washer 336.

When the valve is open, the electromagnetic coil 335 is driven by a current pulse of the opposite polarity to move the magnet back up toward the sealed magnetic target end piece 334. A suitable gap can also be provided between the end piece 334 and a magnet 332. In FIG. 75, it can be seen as a gap as controlled by the extent to which the wedge gate valve 323 can slide along its raceway 327. The spacing could be further controlled by adjusting the position of the end piece 334 in the end of the upper extension of the valve body 322. For example, the end piece 334 could be threaded into the end of the upper extension of the valve body 322, and changed in separation distance from the magnet 332 by changing the degree to which it is threaded into the upper end.

The design of the valve of FIGS. 73–76 provides an advantage in providing a short displacement distance between the inlet and outlet. That is, the distance between the inlet and outlet is reduced by having the valve member move in a direction perpendicular to the path between the inlet and outlet. This also reduces the overall size of the valve, which is advantageous with larger pipe sizes and higher pressures.

Figure 77:
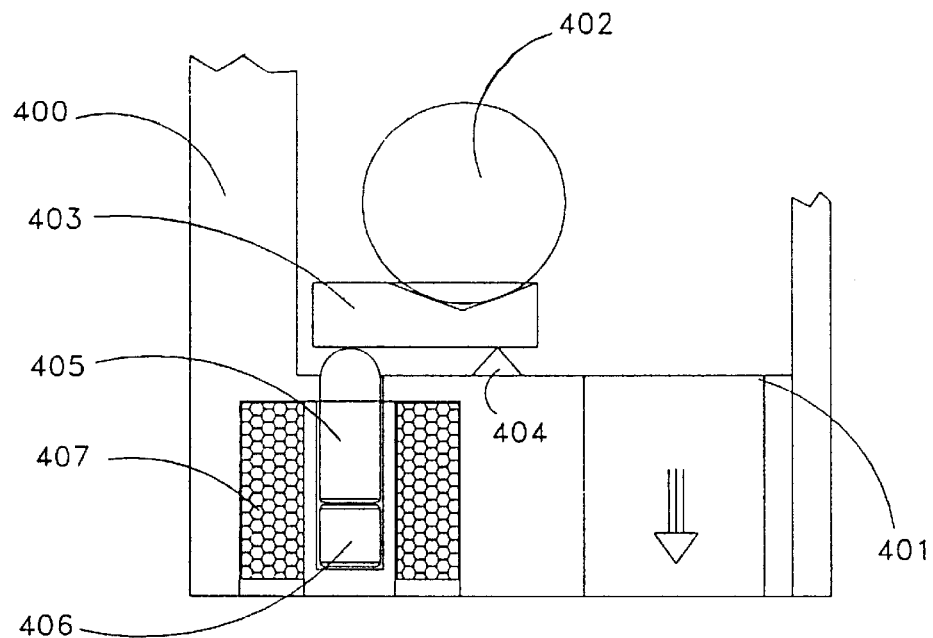
Figure 78:
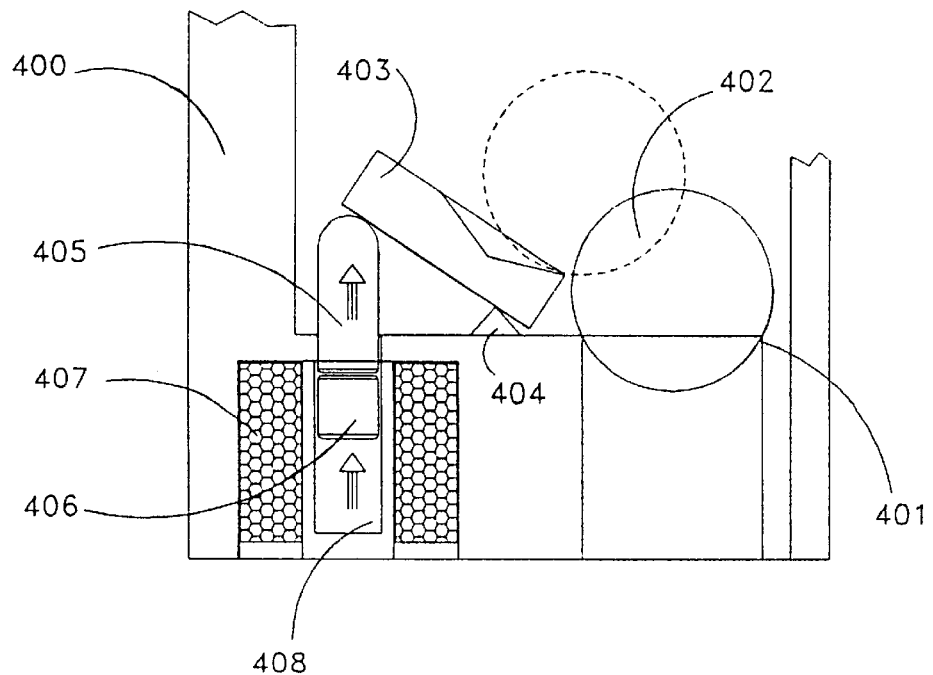
Figure 79:
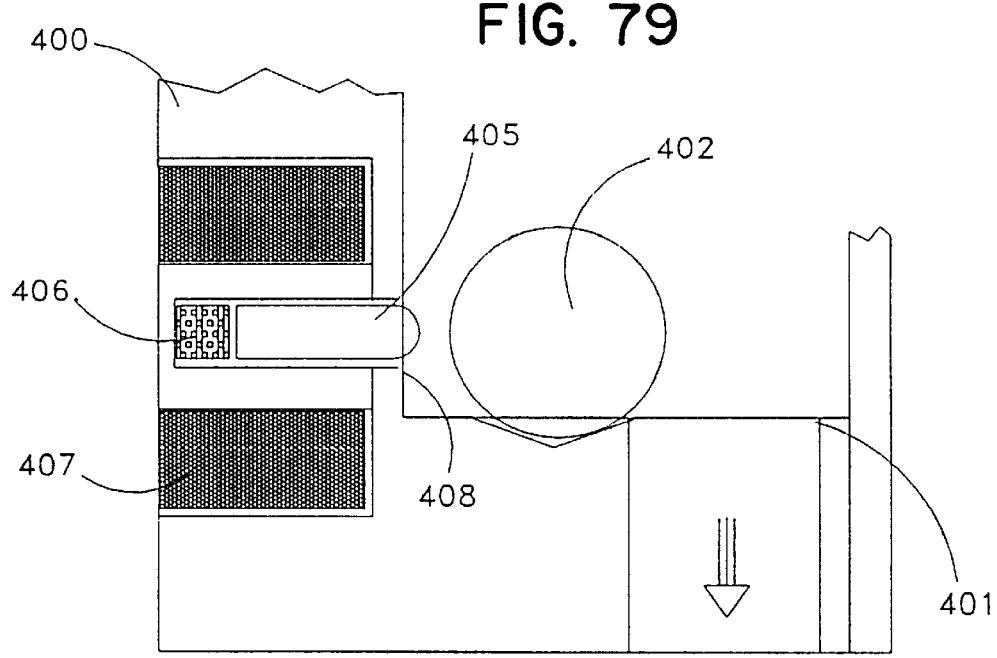
FIGS. 79 and 80 illustrate a twenty-fifth embodiment of the valve according to the present invention, which represents a variation of the twenty-fourth embodiment.
Figure 80:
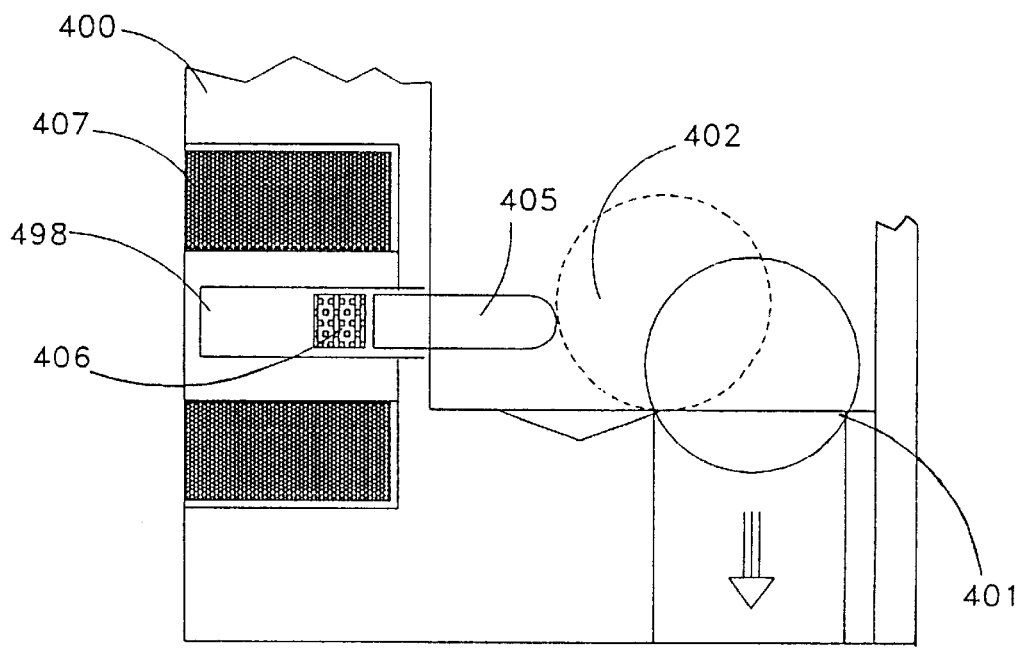

FIGS. 77–80 disclose a further embodiment of the invention, with FIGS. 77 and 78 describing a first variation and FIGS. 79 and 80 describing a second variation.

In FIG. 77, a valve body 402, such as a valve ball, rests on a moveable pedestal 403. The pedestal 403 is pivoted on a bearing ring assembly 404 so that the assembly 404 serves as a pivot point. The pivoting motion can be seen in FIG. 78, demonstrating the tripping of the valve. The valve body 400 includes an outlet that can be closed by the valve member 402 engaging a valve seat 401, and a recess in which a solenoid coil 407 is provided together with a magnet 406 connected to a solenoid shaft 405. As shown in the Figures, a housing 408 is formed for the solenoid shaft 405 and the magnet 406, the housing extending vertically. An opening is formed in the interior surface of the valve body 400 to allow the solenoid shaft 405 to extend therethrough. The opening is positioned below the left-hand end of the pedestal 403 such that the solenoid shaft 405 can engage the pedestal 403 to pivot the pedestal 403 about the pivot point at assembly 404 for actuation of the valve.

Thus, the solenoid coil 407 is driven by a current pulse from a remote control power source so as to have a proper polarity relative to the polarity of the magnet 406 so as to move the magnet 406 along with the solenoid shaft 405. Actuation as shown in FIG. 78 is a bottom actuation which provides a vertical piston or push rod of valve actuation or tripping device method, tilting or tipping the moving pedestal 403. This type of actuation provides a mechanical leverage advantage which allows for a longer stroke and lower lifting energy to overcome the weight of the valve member 402.

FIGS. 79 and 80 show a more direct method. A cavity 408 is provided inside of the remote electromagnetically controlled solenoid coil 407. The coil 407 is provided on the side of the valve member 402, rather than below a pedestal. The pedestal 403 is in this case removed, and replaced by a simple valve member support, which may be as previously described with respect to earlier embodiments. By providing a current pulse of suitable polarity to the coil 407, the magnet 406 is driven along with the shaft 405 so as to move horizontally toward the valve member 402 and push the valve member 402 from the valve member support onto the valve seat 401.

Variations of this embodiment will occur to those of ordinary skill in the art. For example, with the embodiments of FIGS. 79 and 80, the solenoid coil 407, magnet 406 and horizontal piston 405 could be mounted low, near the bottom of valve member 402. A mechanically rigid or flexible linkage to a vertical piston similar to the piston 405 is then provided to lift the tilting pedestal 403, shown in FIGS. 77 and 78. In other words, horizontal actuation could be converted into a vertical actuation by a suitable mechanical linkage. Alternatively, with the same variation the tilting pedestal 403 could be eliminated, and the vertical piston similar to the piston 405 could extend directly under the valve member 402 so as to push the ball directly up and out of the pedestal. Other variations will occur to those of skill in the art.

In accordance with the present invention, a particular advantage is that by use of magnetic coupling between an external actuator and an internal valve member, isolation is provided between the inside and the outside of the valve, without requiring any moving parts or seals between the outside and the inside of the valve that might be due to such moving parts. This provides intrinsic safety for personnel, from explosive gases or fluids, and improved the life and cost of the valve overall. It also allows the valve itself to be reduced in size.

Additional features of the use of a electromagnetic actuator/deactuator according to the present invention and as discussed in the various embodiments described above, include the ability to use only low pulsed power for control between the on and off positions from a small primary (non-rechargeable) or secondary (rechargeable) battery power (for example able to operate from a nine volt lithium ion battery for a ten year life) vs. requiring continuous power in order to maintain a position, or high power in order to control a position, such as typically used with 110 volt AC or 220 volt AC line power.

Figure 81:
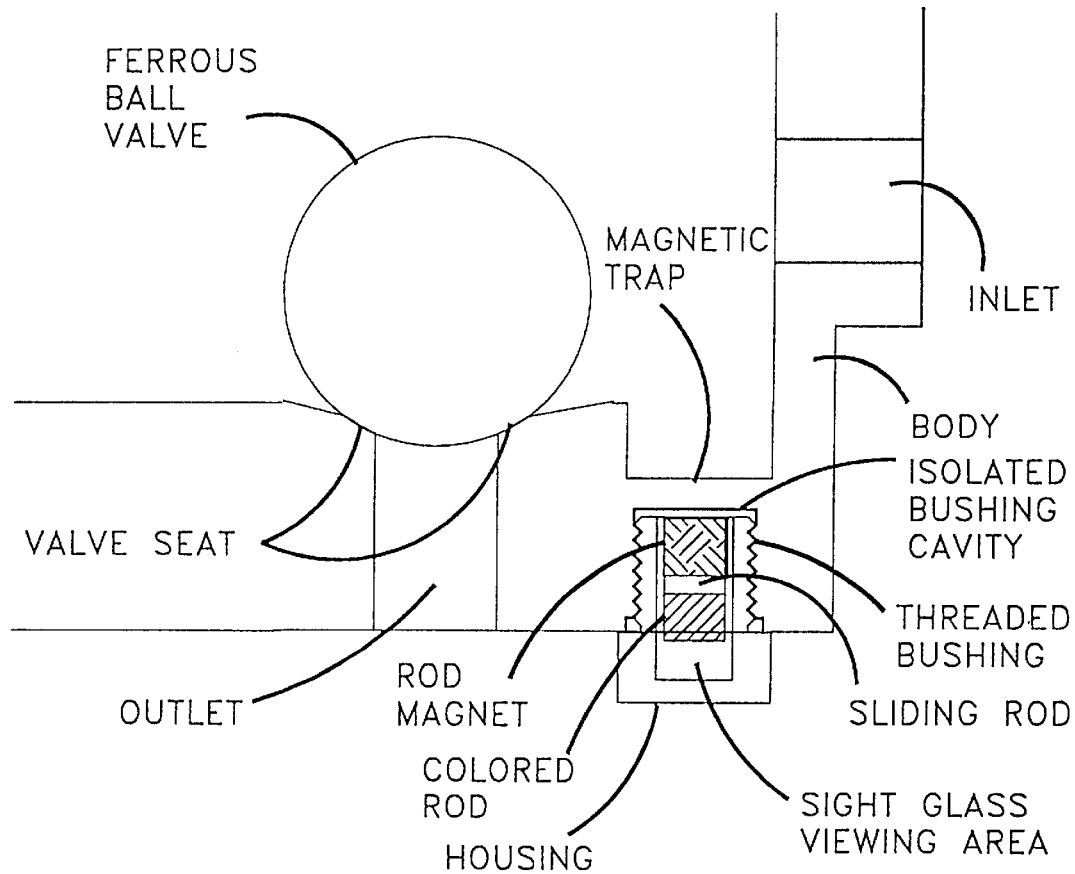
FIG. 81 is a schematic illustration of a magnetic trap useful with the safety valves described with the present application.

An additional feature that results in improvement in a number of the embodiments described above is that of a magnetic trap. FIG. 81 illustrates such a magnetic trap. In this figure, a valve member located on its valve seat is illustrated. Adjacent to the valve member is illustrated a recess in the bottom of the floor of the housing, labeled as a magnetic trap. A magnet is provided inside the housing below the magnetic trap. Thus, magnetic particles or impurities present inside of the housing can be trapped by the presence of the magnet so that such impurities can be collected and removed from the area of the valve seat. In an advantageous arrangement as illustrated in FIG. 81, the same magnet can be used as part of a visual or remotely detected positioned sensor, and also to help hold the valve member in place.

Figure 82:
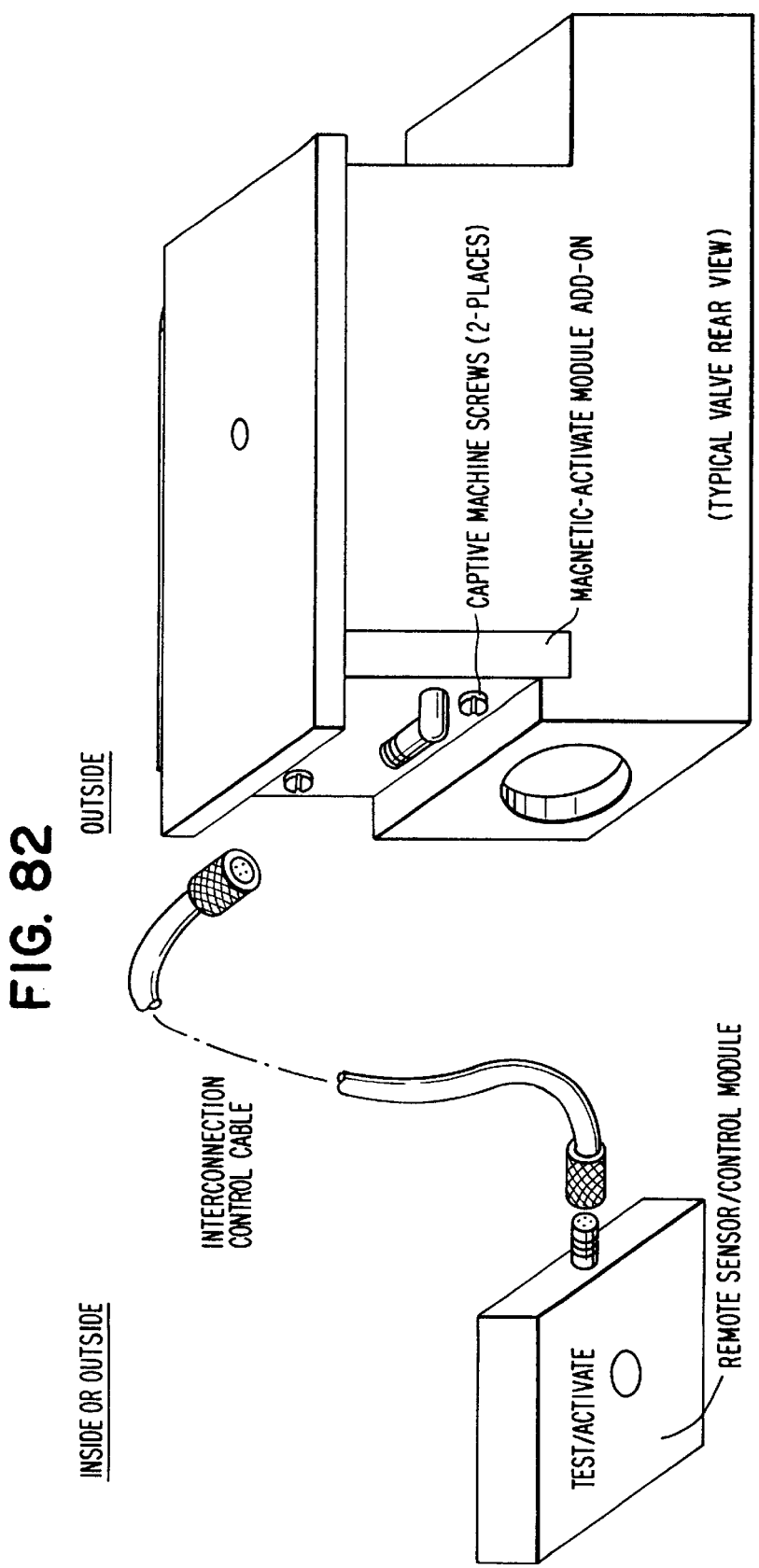
Figure 83:
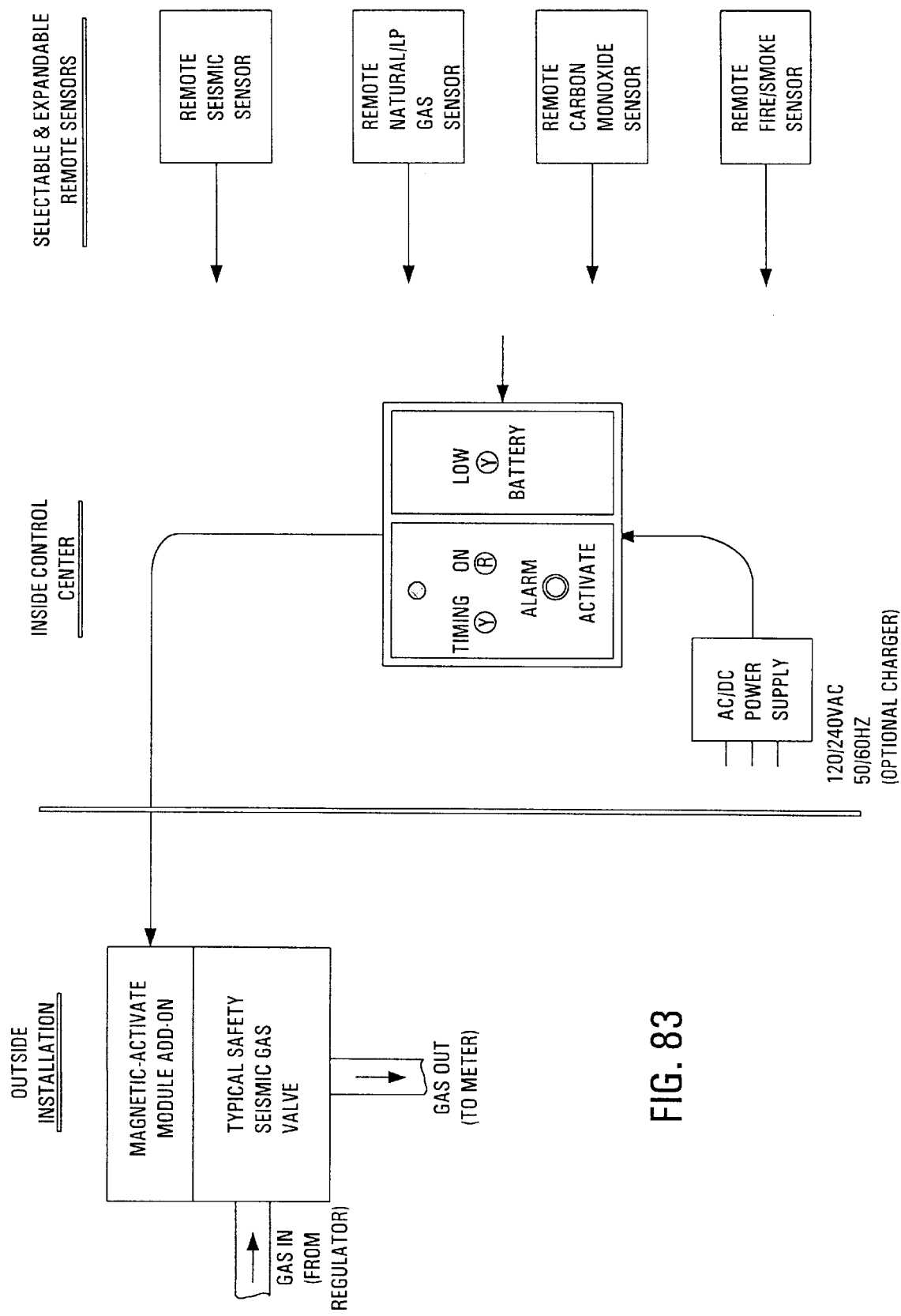
FIG. 83 is a schematic illustration of a smart safety system for a smart safety valve.
Figure 84:
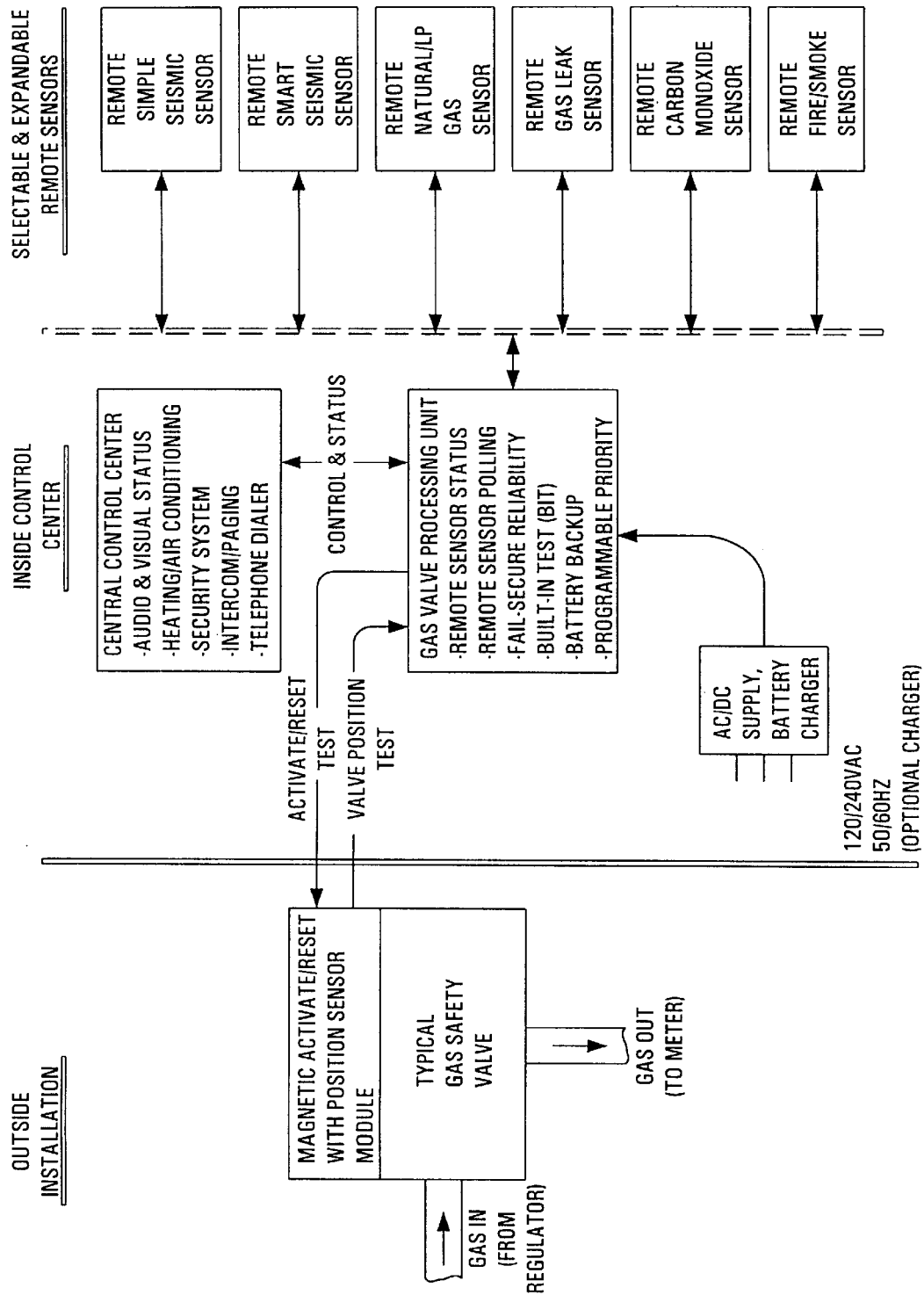
FIG. 84 is another schematic view of a smart safety system.
Figure 85:
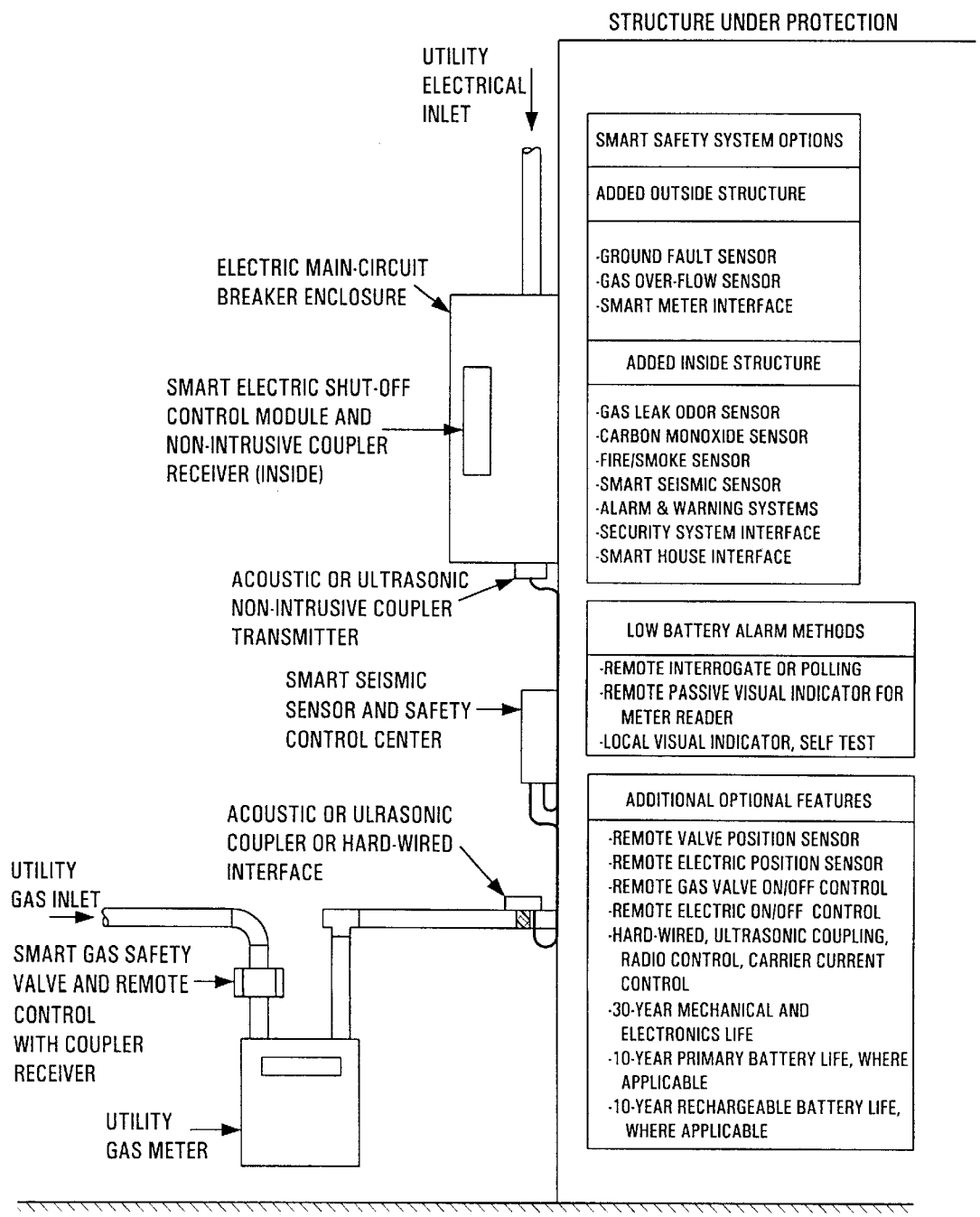
FIG. 85 is a schematic view of a smart safety system.

FIGS. 82–85 are largely self explanatory figures of the use of a valve in accordance with a number of the embodiments described above in a smart safety system for protecting a structure, such as a dwelling. FIG. 82 demonstrates how a remote sensor control module can be controlled to activate the valve from a remote location, such as inside a structure, with a valve located outside the structure. FIG. 83 illustrates a more advanced form of a similar concept, in the context of the gas valve for a structure. Thus, there is a magnetic activate module as an add on to a seismic gas valve that is controlled by an inside control center. The control center receives signals from selectable and expandable remote sensors. Practically any appropriate condition could be sensed and used to control the valve. FIG. 84 illustrates a further refinement of this same concept. FIG. 85 demonstrates the arrangement of an overall smart safety system for the control of a gas valve, such as any of the above-discussed valves, located between a utility gas inlet and a gas meter for a structure.

It should be further noted that all embodiments described above can include manual operation for on and off override. Furthermore, it will be clear that various of the above-discussed features can be interchanged with other various embodiments. While the present invention has been described above with reference to specific embodiments thereof, these embodiments should be considered merely exemplary and not in a limiting fashion.

What is claimed is:

1. A seismic safety valve comprising:
    a housing having a fluid inlet and a fluid outlet and a fluid flow path extending between said fluid inlet and said fluid outlet;
    a valve seat in said housing along said fluid flow path;
    a valve member support in said housing adjacent to said valve seat;
    a valve member movable between a first position on said valve member support in which fluid flow along said fluid flow path is not cut off and a second position on said valve seat in which fluid flow is cut off between said fluid inlet and said fluid outlet, wherein said valve seat and said valve member support are positioned relative to each other such that the application of a seismic disturbance to said housing can cause said valve member to be dislodged from said valve member support and fall by gravity on to said valve seat; and
    an electromagnetic actuator that is positioned at a location relative to said valve member support such that when said valve member is in said first position and a current pulse is applied to said electromagnetic actuator said valve member is moved from said first position to a degree sufficient to allow said valve member to move to said second position.

2. The valve of claim 1, wherein said housing comprises a lid and said electromagnetic actuator is positioned on said lid.

3. The valve of claim 1, wherein said housing comprises a top, a bottom and sides extending between said top and said bottom, said valve member is made of a magnetic material, and said electromagnetic actuator is located on an exterior surface of one of said sides.

4. The valve of claim 1, and further comprising a means for sending a current pulse to said electromagnetic actuator.

5. The valve of claim 4, wherein said means comprises a capacitor providing the current pulse by capacitor discharge.

6. The valve of claim 4, wherein said means comprises a timed circuit.

7. The valve of claim 4, wherein said means provides a current pulse of ½ second or less.

8. The valve of claim 1, wherein said valve member is made of a magnetic material, and said electromagnetic actuator comprises at least two electromagnets, including one of said at least two electromagnets that is positioned adjacent to said valve support member and another of said at least two electromagnets that is positioned adjacent to said valve seat.

9. The valve of claim 8, and further comprising means for sequentially energizing and deenergizing said at least two electromagnets such that said valve member is first attracted to a first of said at least two electromagnets and then attracted to a second of said at least two electromagnets such that said valve member is sequentially moved from one of said first and second positions, toward the first of said at least two electromagnets, toward the second of said at least two electromagnets and then to the other of said first and second positions.

10. The valve of claim 1, and further comprising means for energizing said electromagnetic actuator in response to detection of a predetermined condition external to said housing.

11. The valve of claim 10, wherein said means for energizing comprises a detection device selected from the group consisting of a gas leak detector and a seismic event detector.

12. The valve of claim 11, wherein said gas leak detector is selected from the group consisting of a carbon monoxide detector and a natural gas detector.

13. The valve of claim 11, wherein said valve member support defines a means for causing said valve member to close said valve upon a first predetermined level of seismic activity, and said detection device is a seismic event detection device that is set to a second predetermined level of seismic activity that is different than said first predetermined level of seismic activity.

14. The seismic safety valve of claim 1, wherein
    said electromagnetic actuator is also an electromagnetic deactuator and positioned at a location relative to said valve member support and said valve seat such that:

when said valve member is in said first position and a current pulse is applied to said electromagnetic actuator and deactuator, said valve member is moved from said first position toward said electromagnetic actuator and deactuator to a degree sufficient to allow said valve member to move to said second position; and when said valve member is in said second position and a current pulse is applied to said electromagnetic actuator and deactuator, said valve member is moved from said second position toward said electromagnetic actuator and deactuator to a degree sufficient to allow said valve member to move to said first position.

15. The valve of claim 14, wherein said electromagnetic actuator and deactuator is a single electromagnet positioned on said housing between said first and second positions.

16. The valve of claim 1, wherein said electromagnetic actuator comprises a module containing an electromagnetic coil and a core mounted on said housing.

17. The valve of claim 16, wherein said module further comprises a fail-safe circuit connected between said coil and a battery in said module and an external control circuit.

18. The valve of claim 16, wherein said housing comprises an exterior surface member, said core is mounted on an interior side of said exterior surface member, and said module is mountable on an external side of said exterior surface member.

19. The valve of claim 18, wherein said module has an opening therein surrounded by said coil, and said exterior surface member has a protrusion thereon adapted to house at least part of said core, said opening being mountable on said protrusion.

20. The valve of claim 19, wherein said core is fixed in said protrusion.

21. The valve of claim 19, wherein said core is mounted on a flapper that is pivotally mounted inside said housing.

22. The valve of claim 21, wherein said flapper comprises a rigid member having a valve member engaging portion movable into contact with said valve member when said valve member is in said second position upon said electromagnetic actuator being energized and a core support portion that has said core mounted thereon that is movable toward or away from said coil when said electromagnetic actuator is energized.

23. The valve of claim 1, wherein said electromagnetic actuator comprises a flapper pivotally mounted in said housing, said flapper comprising one part that is movable in response to energization of said electromagnetic actuator, and a second part that is movable into contact with said valve member when said valve member is in said second position.

24. The valve of claim 23, wherein said electromagnetic actuator comprises an electromagnet having a core, said one part of said flapper comprising a magnetic material and positioned adjacent to said core.

25. A seismic safety valve comprising:
a housing having a fluid inlet and a fluid outlet and a fluid flow path extending between said fluid inlet and said fluid outlet;
a valve seat in said housing along said fluid flow path;
a valve member support in said housing adjacent to said valve seat;
a valve member made of a magnetic material and movable between a first position on said valve member support in which fluid flow along said fluid flow path is not cut off between said fluid inlet and said fluid outlet and a second position in which said valve member is on said valve seat and fluid flow is cut off between said fluid inlet and said fluid outlet,
wherein said valve seat and said valve member support are positioned relative to each other such that the application of a seismic disturbance to said housing can cause said valve member to be dislodged from said valve member support and fall by gravity on to said valve seat, and
wherein said valve member support has a predetermined mechanical seismic trip level such that said valve member falls from said valve member support onto said valve seat upon the application of a seismic activity to said housing greater than said predetermined mechanical seismic trip level in the absence of forces other than gravity; and
a magnet below said valve member support applying a magnetic force to said valve member when said valve member is on said valve member support.

26. The seismic safety device of claim 25, wherein said magnet is movable between a first magnet position associated with said valve member being located on said valve member support and a second magnet position remote from said first position associated with said valve member being located on said valve seat, and wherein said magnet being in one of said first and second positions is detectable from outside of said housing.

27. The seismic safety device of claim 26, wherein said magnet is disposed in a vertical shaft in said housing and movable from said first magnet position to said second magnet position thereof under gravity when said valve member falls from said valve member support to said valve seat.

28. The seismic safety device of claim 27, wherein a sight glass is provided on said housing such that said shaft is visible from outside of said housing.

29. The seismic safety device of claim 28, wherein said magnet is mounted on a colored stem visible through said sight glass.

30. The seismic safety valve of claim 25, wherein said magnet dampens movement of said valve member on said valve member support, said valve member being spherical.

31. The seismic safety valve of claim 25, wherein total seismic trip level is established from the predetermined mechanical trip level of said valve member support and the magnetic force.

32. A seismic safety valve comprising:
a housing having a fluid inlet and a fluid outlet and a fluid flow path extending between said fluid inlet and said fluid outlet;
a valve seat in said housing along said fluid flow path;
a valve member support in said housing adjacent to said valve seat;
a valve member made of a magnetic material and movable between a first position on said valve member support in which fluid flow along said fluid flow path is not cut off between said fluid inlet and said fluid outlet and a second position in which said valve member is on said valve seat and fluid flow is cut off between said fluid inlet and said fluid outlet, wherein said valve seat and said valve member support are positioned relative to each other such that the application of a seismic disturbance to said housing can cause said valve member to be dislodged from said valve member support and fall by gravity on to said valve seat; and
a magnet below said valve member support magnetically attracted to said valve member when said valve member is on said valve member support, wherein said magnet is movable between a first position associated with said valve member being located on said valve member support and a second position remote from said first position associated with said valve member being located on said valve seat, and wherein said magnet being in one of said first and second positions is detectable from outside of said housing.

33. The seismic safety device of claim 32, wherein said magnet is disposed in a vertical shaft in said housing and movable from said first position to said second position thereof under gravity when said valve member falls from said valve member support to said valve seat.

34. The seismic safety device of claim 33, wherein a sight glass is provided on said housing such that said shaft is visible from outside of said housing.

35. The seismic safety device of claim 34, wherein said magnet is mounted on a colored stem visible through said sight glass.

36. A seismic safety valve comprising:
   a housing having a fluid inlet and a fluid outlet and a fluid flow path extending between said fluid inlet and said fluid outlet;
   a valve seat in said housing along said fluid flow path;
   a valve member support in said housing adjacent to said valve seat;
   a valve member movable between a first position on said valve member support in which fluid flow along said fluid flow path is not cut off between said fluid inlet and said fluid outlet and a second position in which said valve member is on said valve seat and fluid flow is cut off between said fluid inlet and said fluid outlet, wherein said valve seat and said valve member support are positioned relative to each other such that the application of a seismic disturbance to said housing can cause said valve member to be dislodged from said valve member support and fall by gravity on to said valve seat; and
   a magnetic actuator comprising one selected from the group consisting of at least one electromagnet and at least one permanent magnet, and further comprising a pivotal flapper comprising a magnetic material that is pivotally mounted in said housing for contact with said valve member in at least one of said first and second positions thereof and capable of being pivoted by magnetic force and positioned at a location relative to said valve member support and said valve seat such that:
      when said valve member is in said first position and magnetic force is applied to said flapper, said valve member can be moved by said flapper from said first position to said second position.

37. The seismic safety valve of claim 36, wherein said magnetic actuator is a magnetic actuator and deactuator, and said flapper is pivotally mounted in said housing for contact with said valve member in both said first and second positions and capable of moving said valve member from said second position to said first position.

38. The seismic safety valve of claim 37, wherein said one selected from the group consisting of at least one electromagnet and at least one permanent magnet comprises two electromagnets positioned on opposite sides of said flapper.

39. The seismic safety valve of claim 37, wherein said one selected from the group consisting of at least one electromagnet and at least one permanent magnet comprises a permanent magnet movable between positions on opposite sides of said flapper.

40. The seismic safety valve of claim 37, wherein said flapper comprises first and second members capable of engaging said valve member at said valve member support and said valve seat, respectively.

41. A safety valve comprising:
   a housing having a fluid inlet and a fluid outlet and a fluid flow path extending between said fluid inlet and said fluid outlet;
   a valve seat in said housing along said fluid flow path;
   a valve member made of a magnetic material and movable between a first position in which said fluid flow path is not cut off between said fluid inlet and said fluid outlet and a second position in which said valve member is on said valve seat and fluid flow is cut off between said fluid inlet and said fluid outlet;
   a magnet associated with said valve member such that said magnet is movable between a first magnet position associated with said valve member being in said first position and a second magnet position remote from said first position associated with said valve member being located on said valve seat; and
   an indicator that is detectable externally of said housing for indicating the position of said magnet and thus the position of said valve member such that said magnet being in one of said first and second magnet positions, and thus said valve member being in one of said first and second positions, is detectable from outside of said housing.

42. The seismic safety valve of claim 41, wherein said magnet is a permanent magnet movably mounted in a raceway on a side of said housing.

43. The seismic safety valve of claim 42, wherein said raceway is deeper at a position along said raceway that is adjacent to said valve seat than at a position along said raceway adjacent to said valve member support.

44. The seismic safety valve of claim 41, wherein said magnet is mounted so as to be movable from a position away from said valve seat to a position close to said valve seat upon said valve member moving to said valve seat from said valve member support.

45. The seismic safety valve of claim 41, wherein said housing comprises a magnetic trap adjacent to said magnet and said valve seat for capturing impurities.

46. A safety valve comprising
   a housing having a fluid inlet and a fluid outlet and a fluid flow path extending between said fluid inlet and said fluid outlet;
   a valve seat in said housing along said fluid flow path;
   a valve member movable between an on position in which fluid flow along said fluid flow path is not cut off and an off position on said valve seat in which fluid flow is cut off between said fluid inlet and said fluid outlet; and
   an electromagnetic actuator that is arranged such that when said valve member is in said on position and a current pulse is applied to said electromagnetic actuator said valve member is moved from said on position to a degree sufficient to allow said valve member to move to said off position;
   wherein said electromagnetic actuator comprises a mechanical actuating mechanism and an electromagnetic motor operable with said mechanical actuating mechanism for moving said mechanical actuating mechanism; and
   wherein said mechanical actuating mechanism comprises a flapper movably mounted in said housing and engageable with said valve member.

47. The safety valve of claim 46, wherein said flapper is vertically pivoted.

48. The safety valve of claim 46, wherein said flapper is horizontally pivoted.

49. The safety valve of claim 48, wherein said flapper comprises at least one spring finger for holding said valve member in one of said off and on positions.

50. A safety valve comprising:

a housing having a fluid inlet and a fluid outlet and a fluid flow path extending between said fluid inlet and said fluid outlet;

a valve seat in said housing along said fluid flow path;

a valve member movable between an on position in which fluid flow along said fluid flow path is not cut off and an off position on said valve seat in which fluid flow is cut off between said fluid inlet and said fluid outlet; and an electromagnetic actuator that is arranged such that when said valve member is in said on position and a current pulse is applied to said electromagnetic actuator said valve member is moved from said on position to a degree sufficient to allow said valve member to move to said off position;

wherein said electromagnetic actuator comprises a mechanical actuating mechanism and an electromagnetic motor operable with said mechanical actuating mechanism for moving said mechanical actuating mechanism; and further comprising a detection device selected from the group consisting of a gas leak detector and a seismic event detector connected with said electromagnetic actuator for energizing said electromagnetic actuator in response to detection of a predetermined condition external to said housing.

51. The valve of claim 50, wherein said gas leak detector is selected from the group consisting of a carbon monoxide detector and a natural gas detector.

52. The valve of claim 50, wherein said valve member support defines a means for causing said valve member to close said valve upon a first predetermined level of seismic activity, and said detection device is a seismic event detection device that is set to a second predetermined level of seismic activity that is different than said first predetermined level of seismic activity.

* * * * *